Jan. 22, 1935.  H. R. BRAND  1,988,936
AUTOMATIC COMMODITY HANDLING SYSTEM
Filed Dec. 10, 1930   37 Sheets-Sheet 1
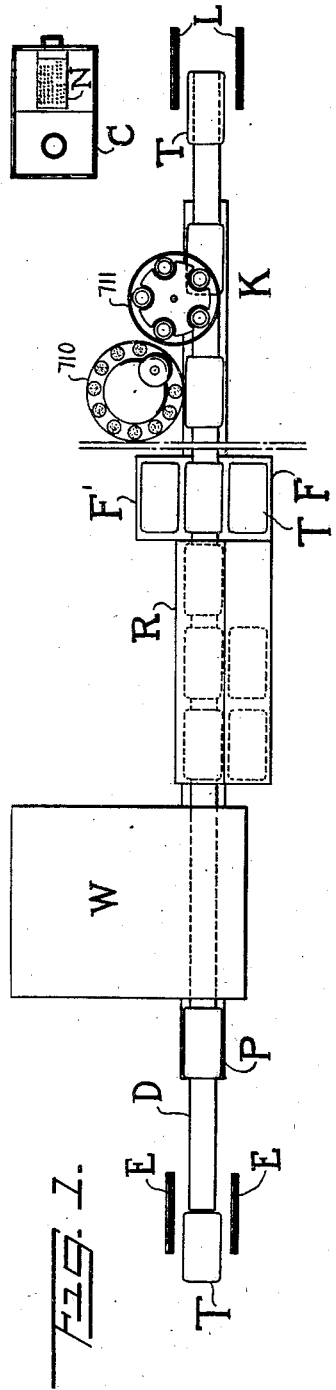
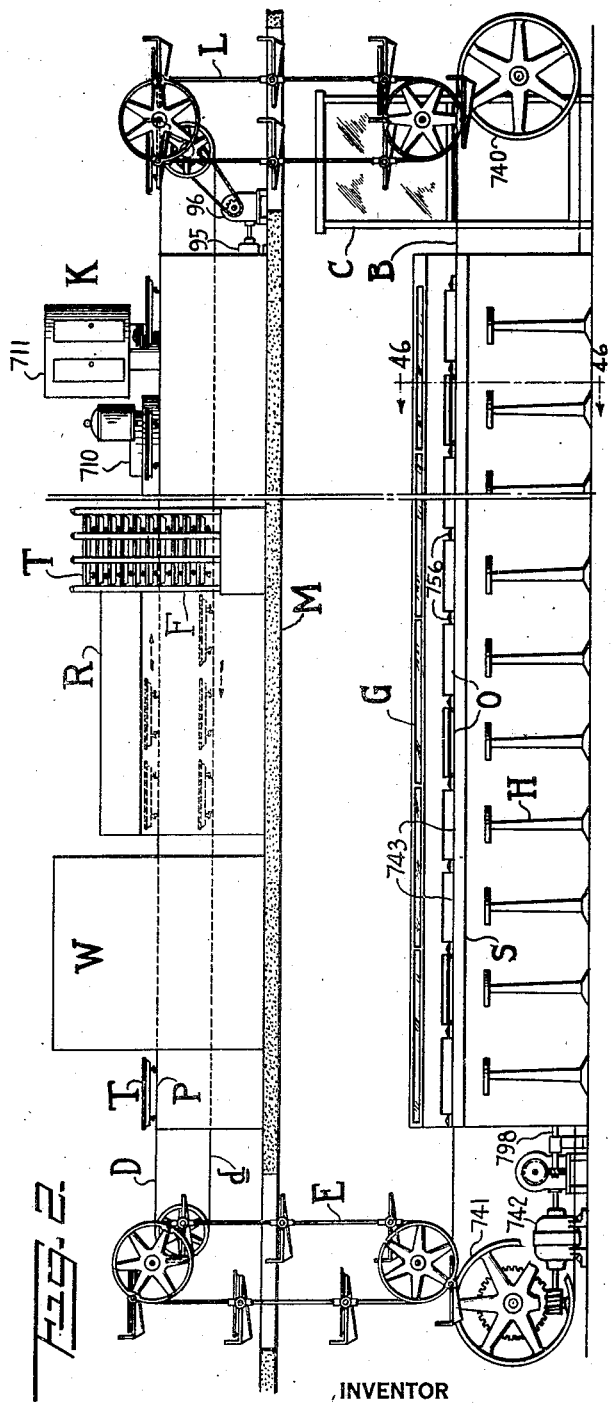
INVENTOR
*H. R. BRAND.*
BY
ATTORNEY

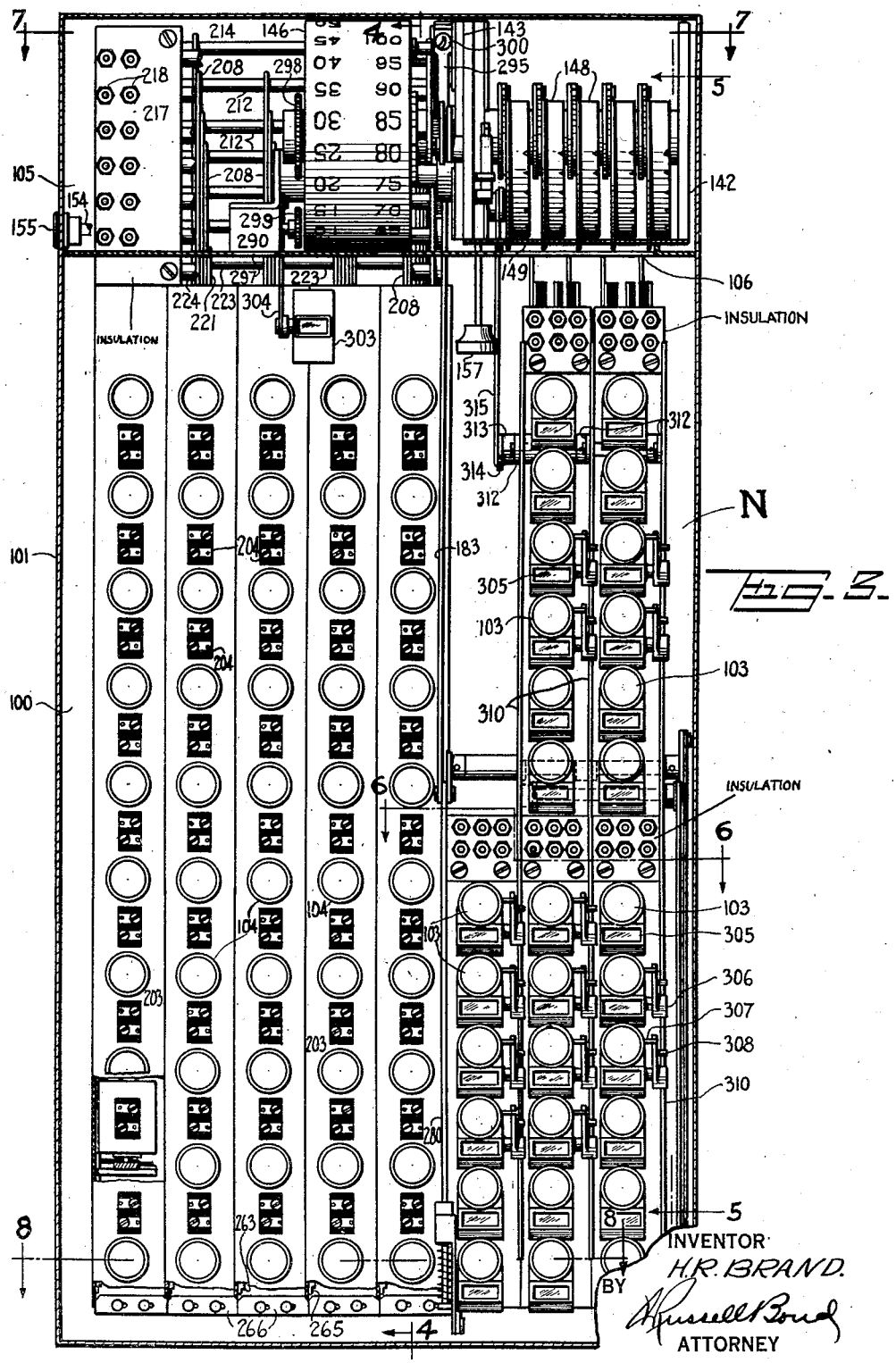

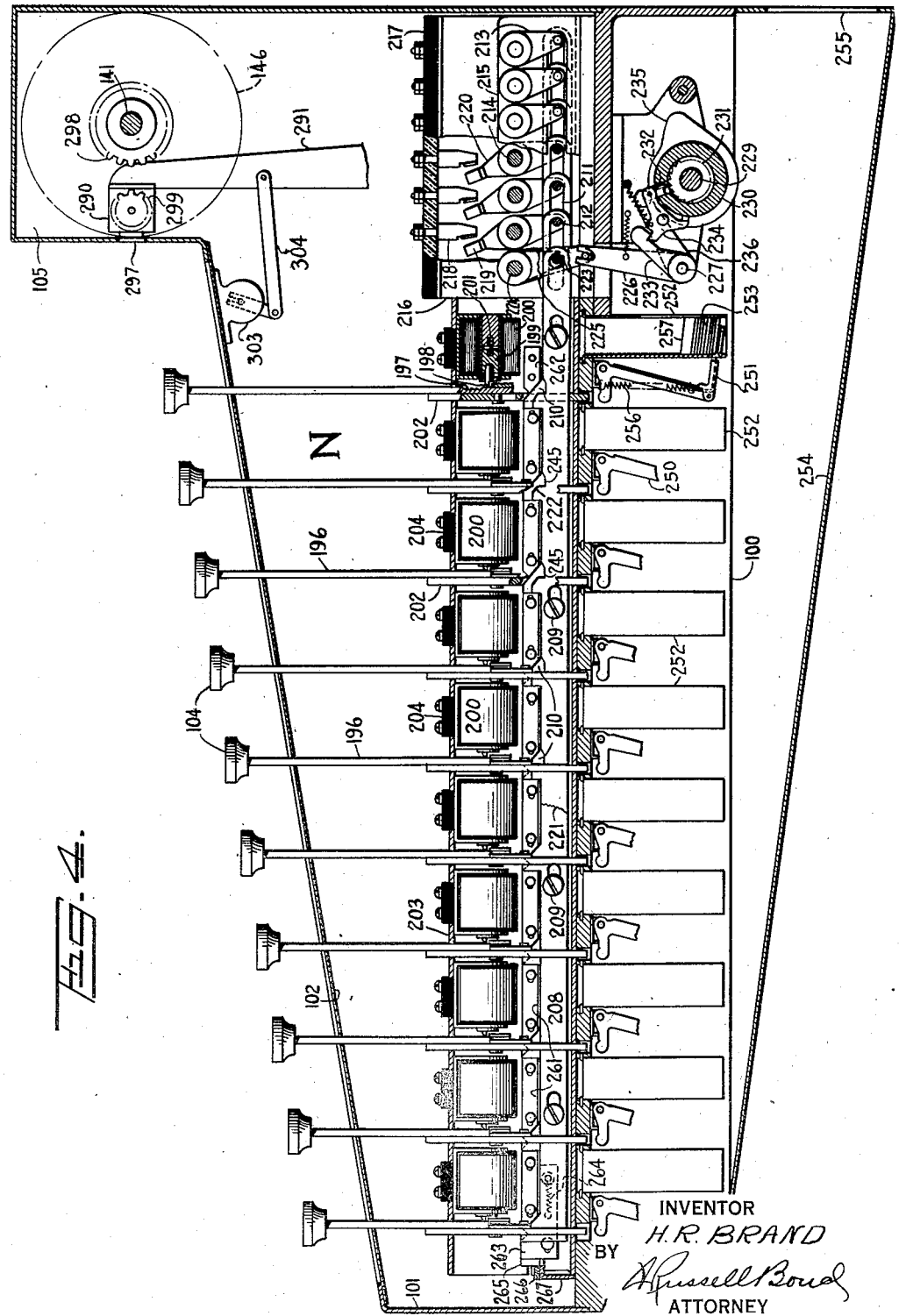

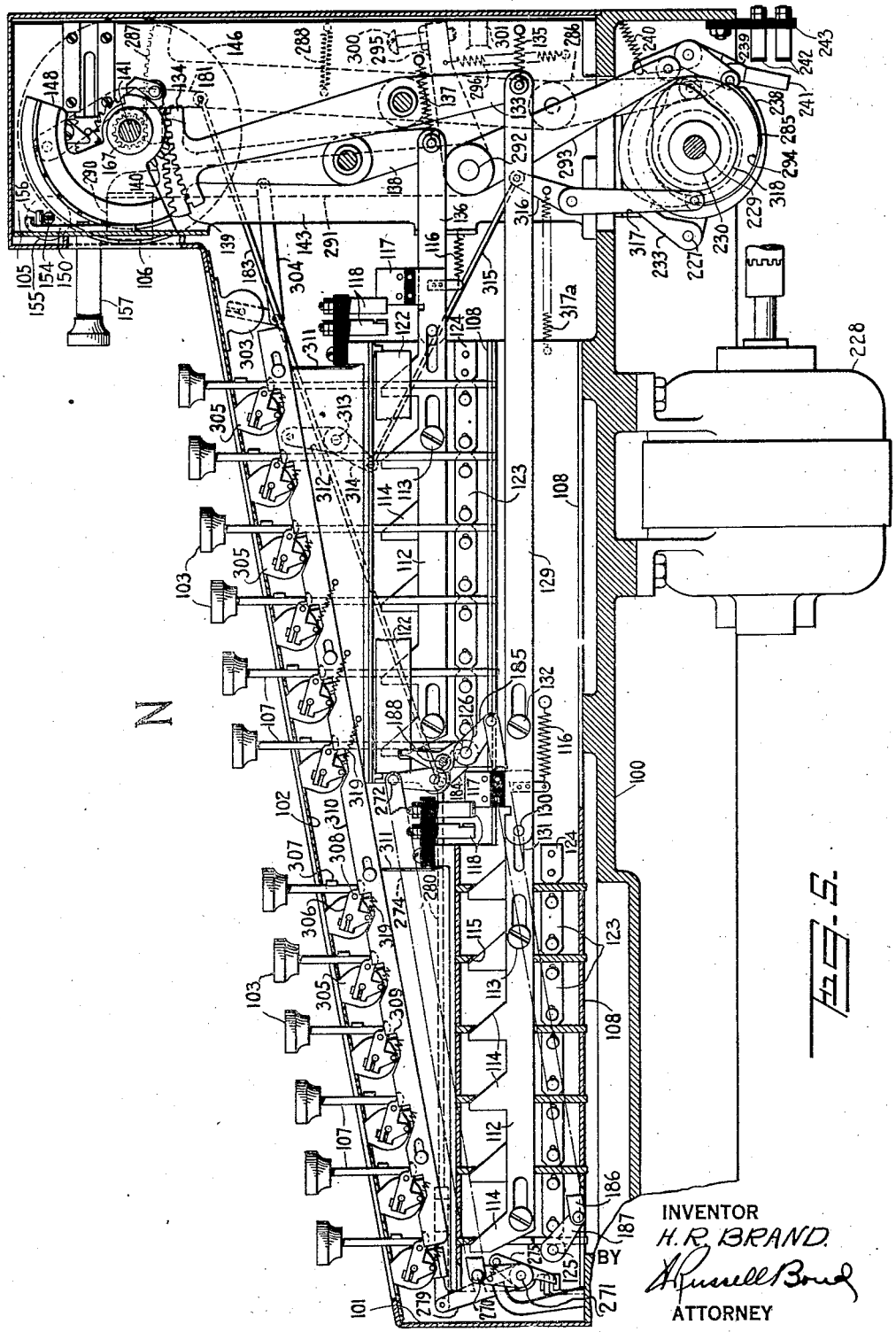

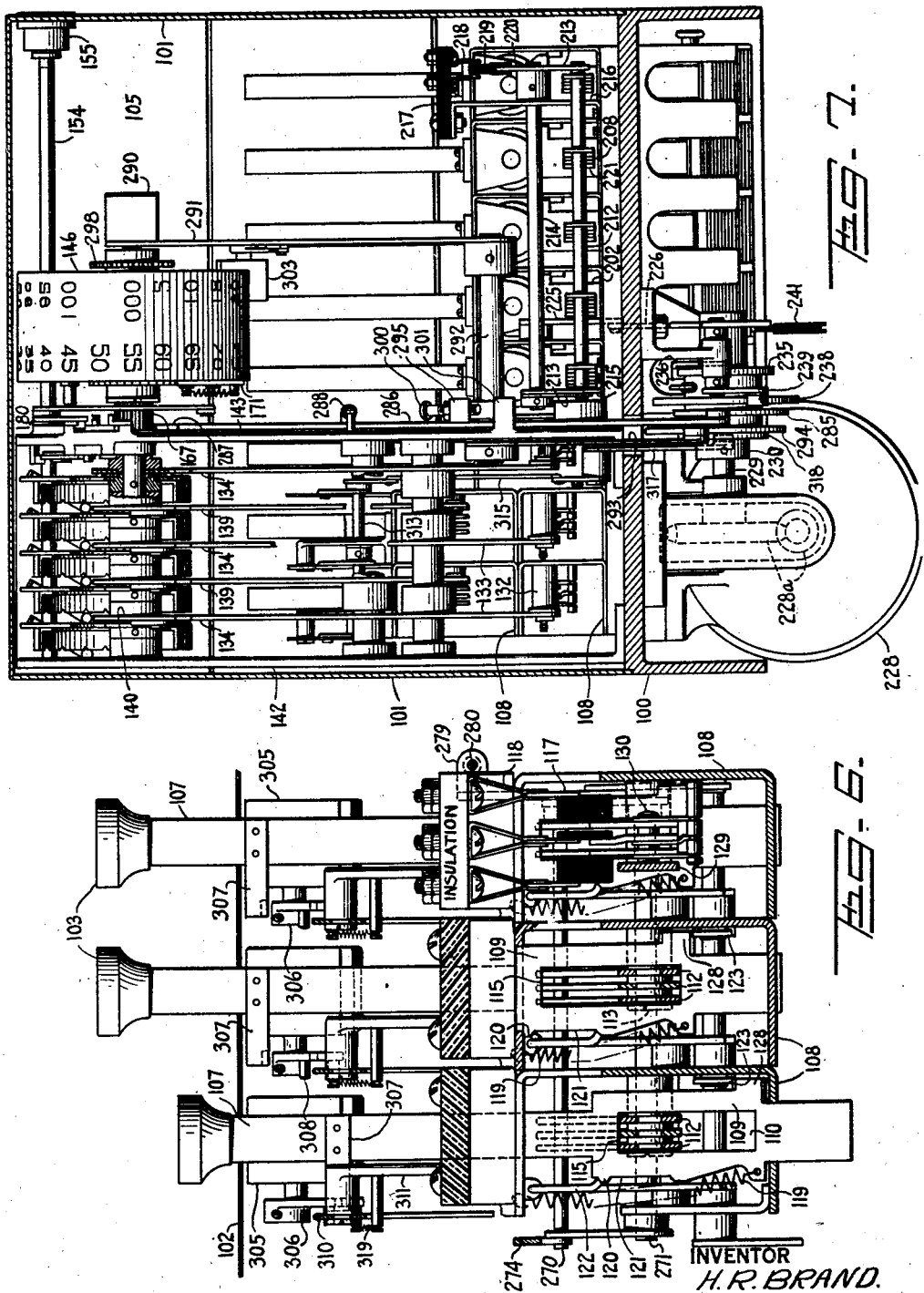

Jan. 22, 1935.  H. R. BRAND  1,988,936
AUTOMATIC COMMODITY HANDLING SYSTEM
Filed Dec. 10, 1930  37 Sheets-Sheet 6
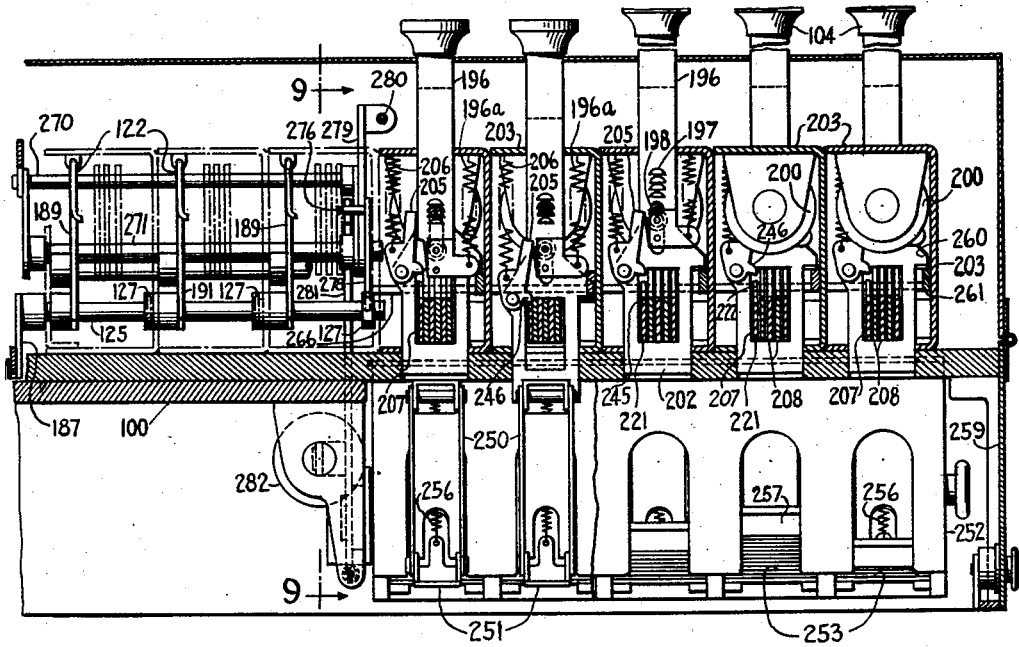
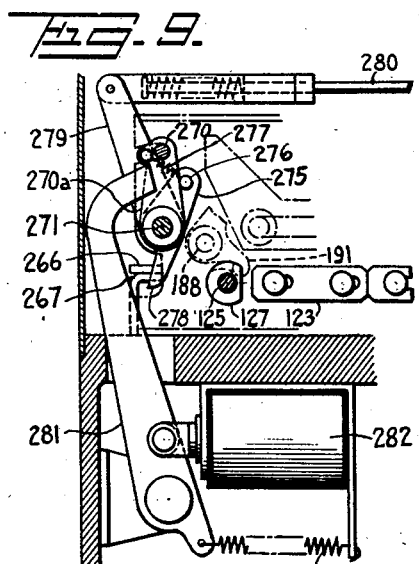
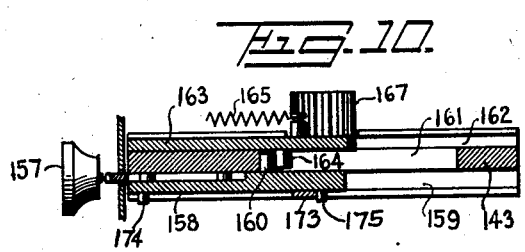
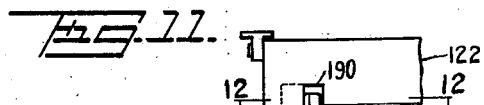
INVENTOR
*H. R. BRAND.*
BY
ATTORNEY Jan. 22, 1935.  H. R. BRAND  1,988,936
AUTOMATIC COMMODITY HANDLING SYSTEM
Filed Dec. 10, 1930  37 Sheets-Sheet 7
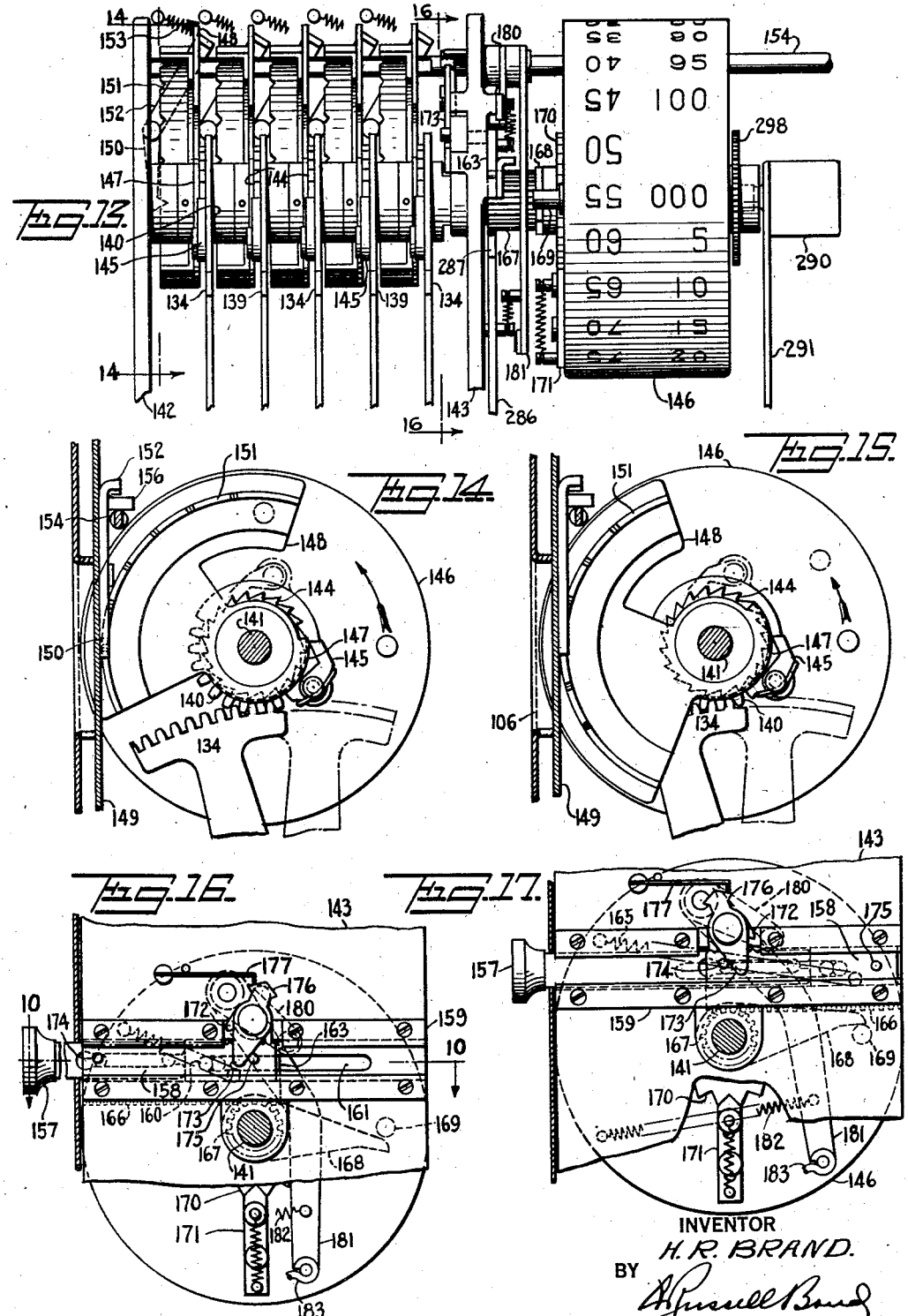
INVENTOR
*H. R. BRAND.*
BY
ATTORNEY

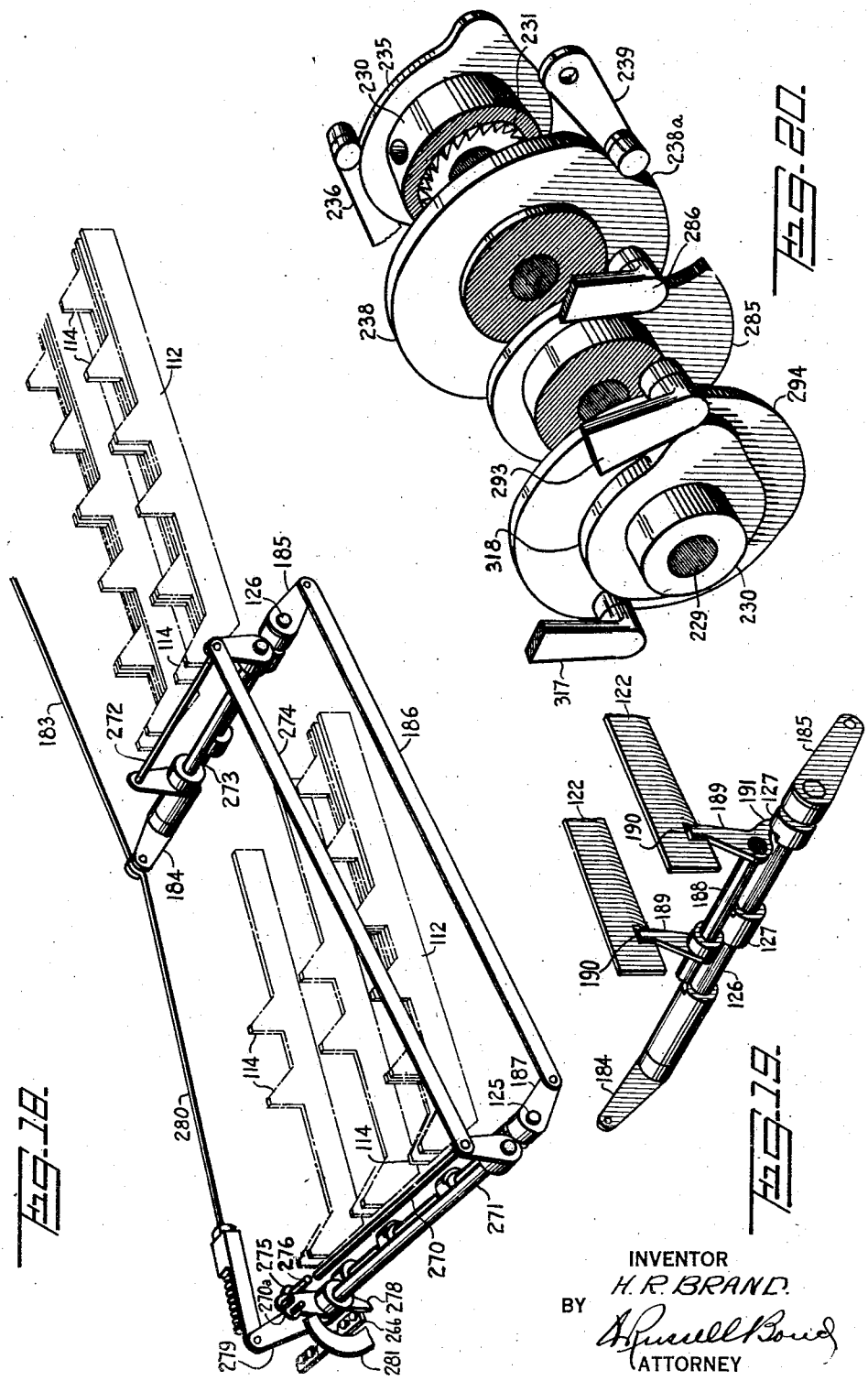

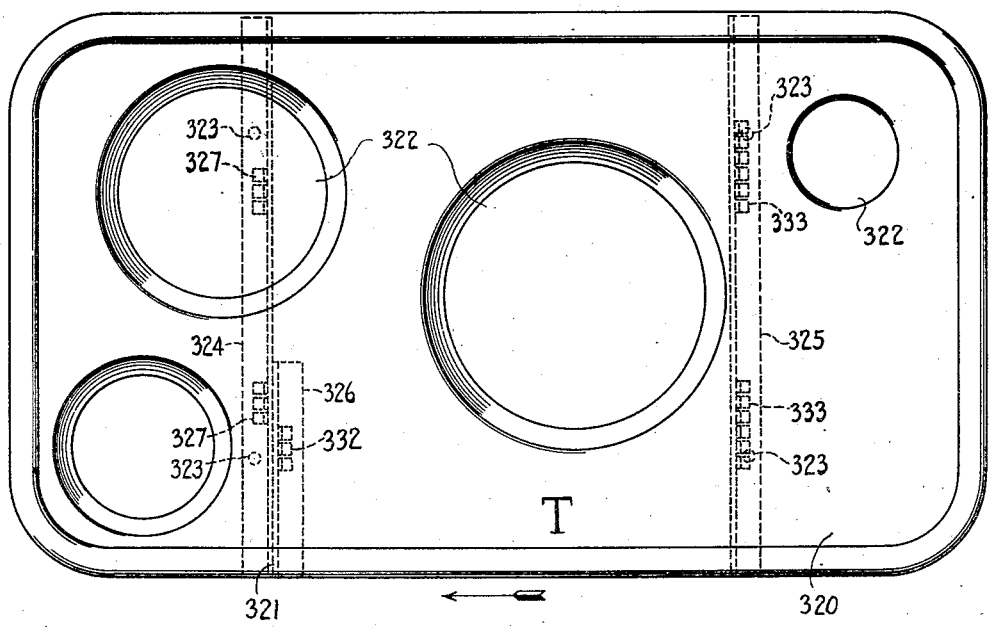
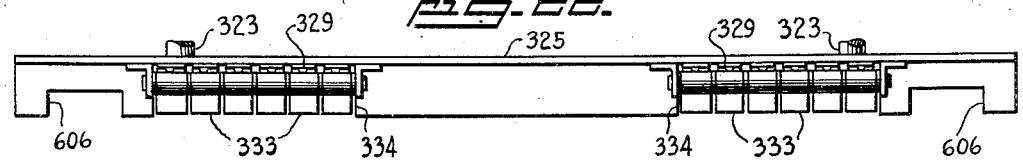
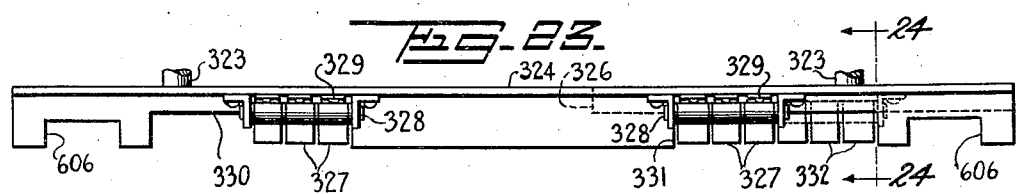
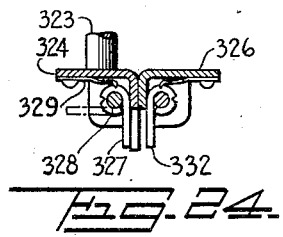

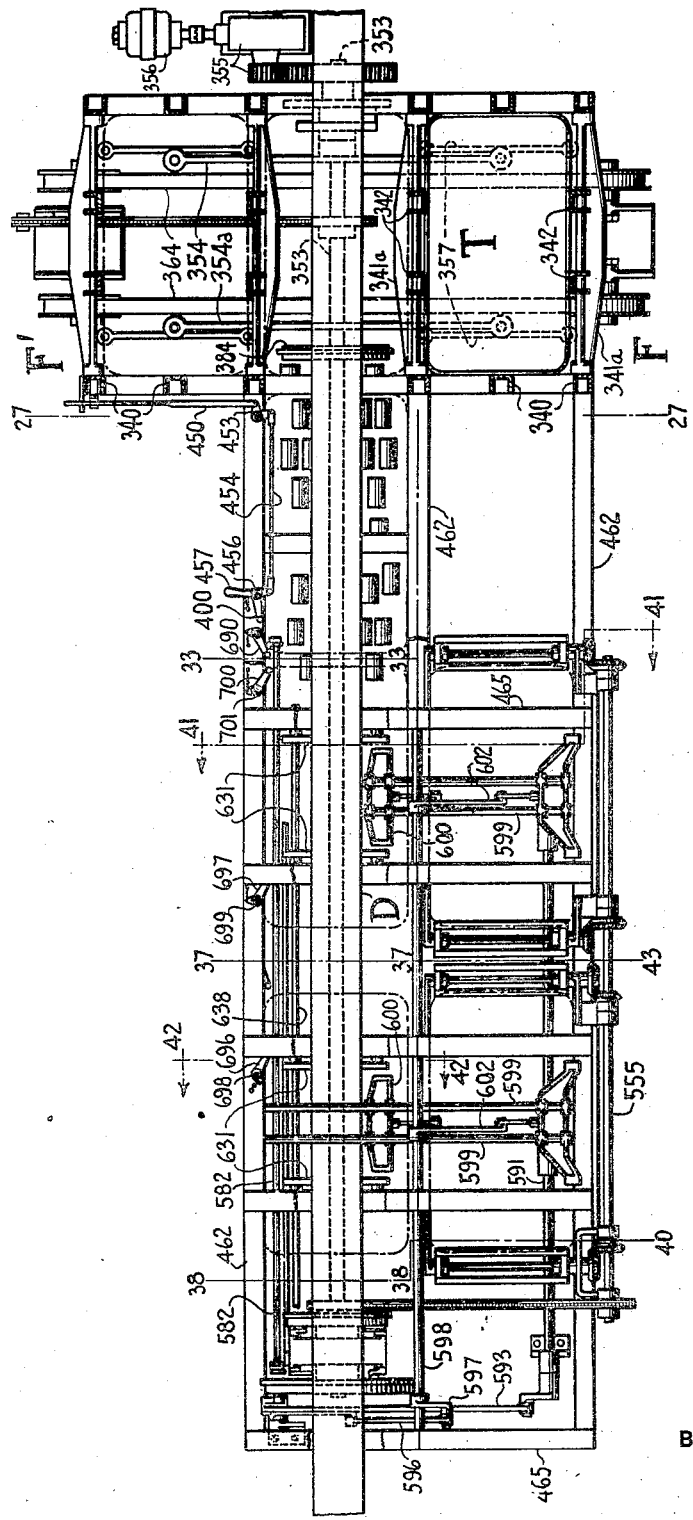

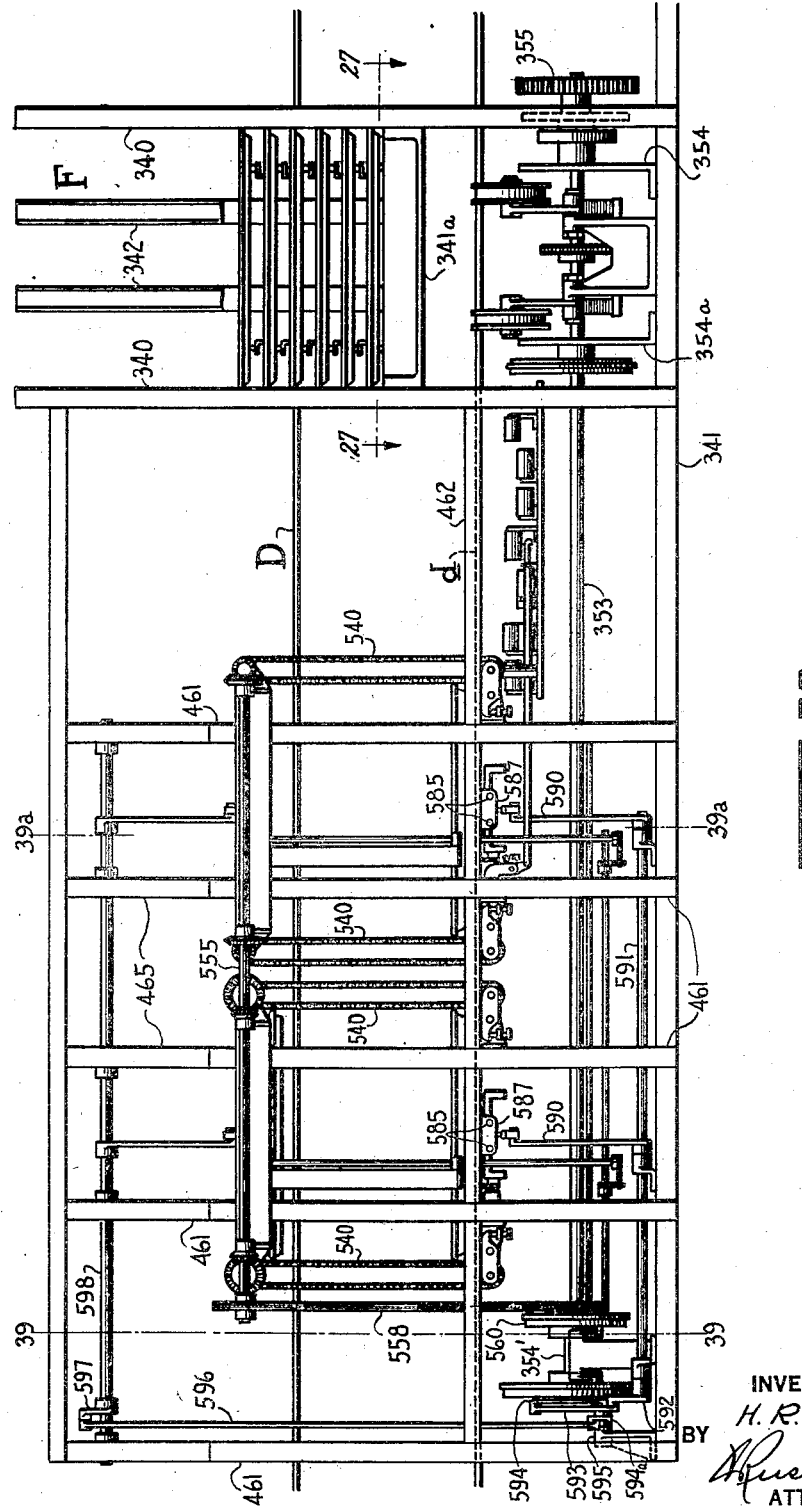

Jan. 22, 1935.　　　H. R. BRAND　　　1,988,936
AUTOMATIC COMMODITY HANDLING SYSTEM
Filed Dec. 10, 1930　　37 Sheets-Sheet 12
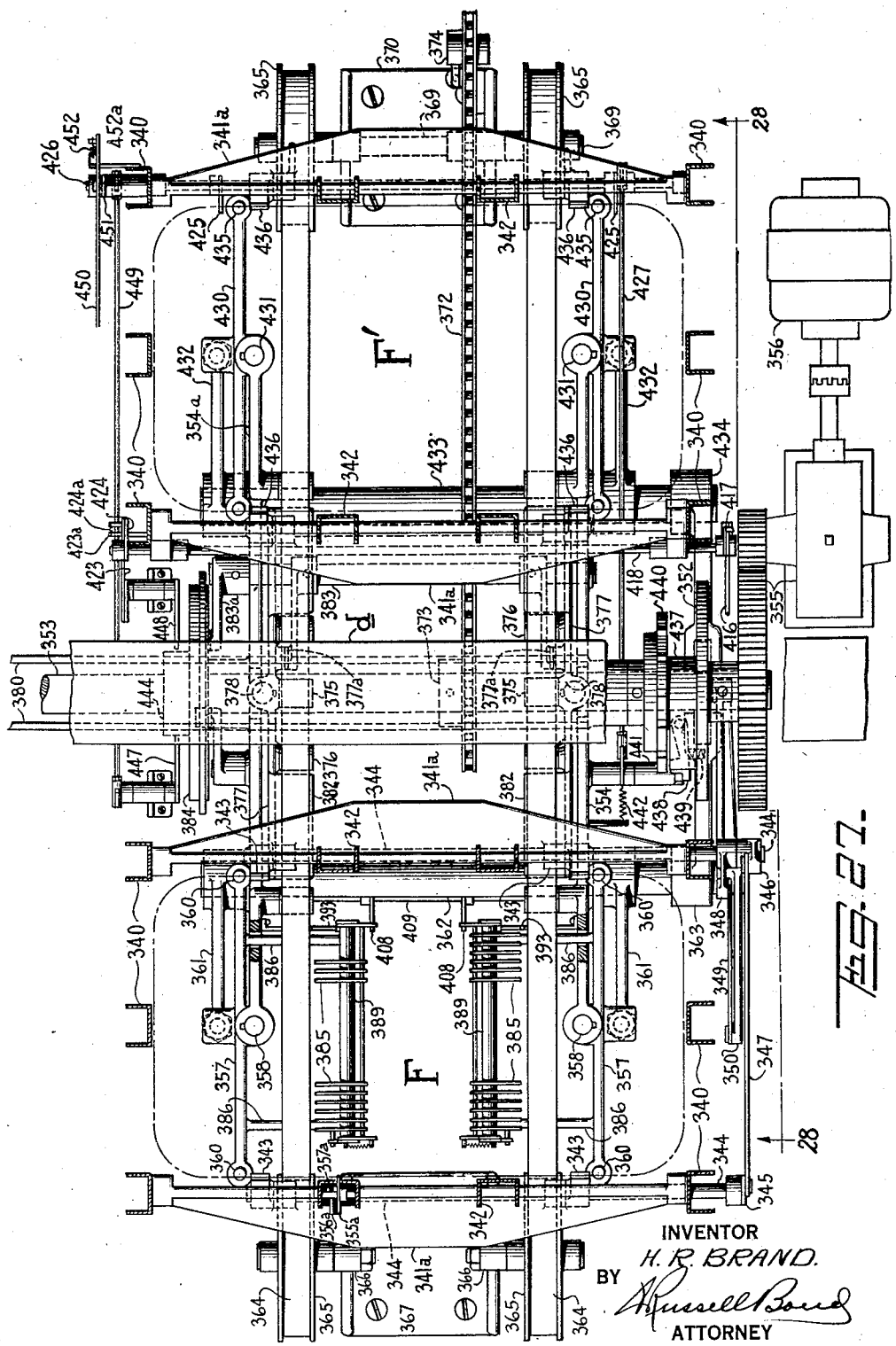

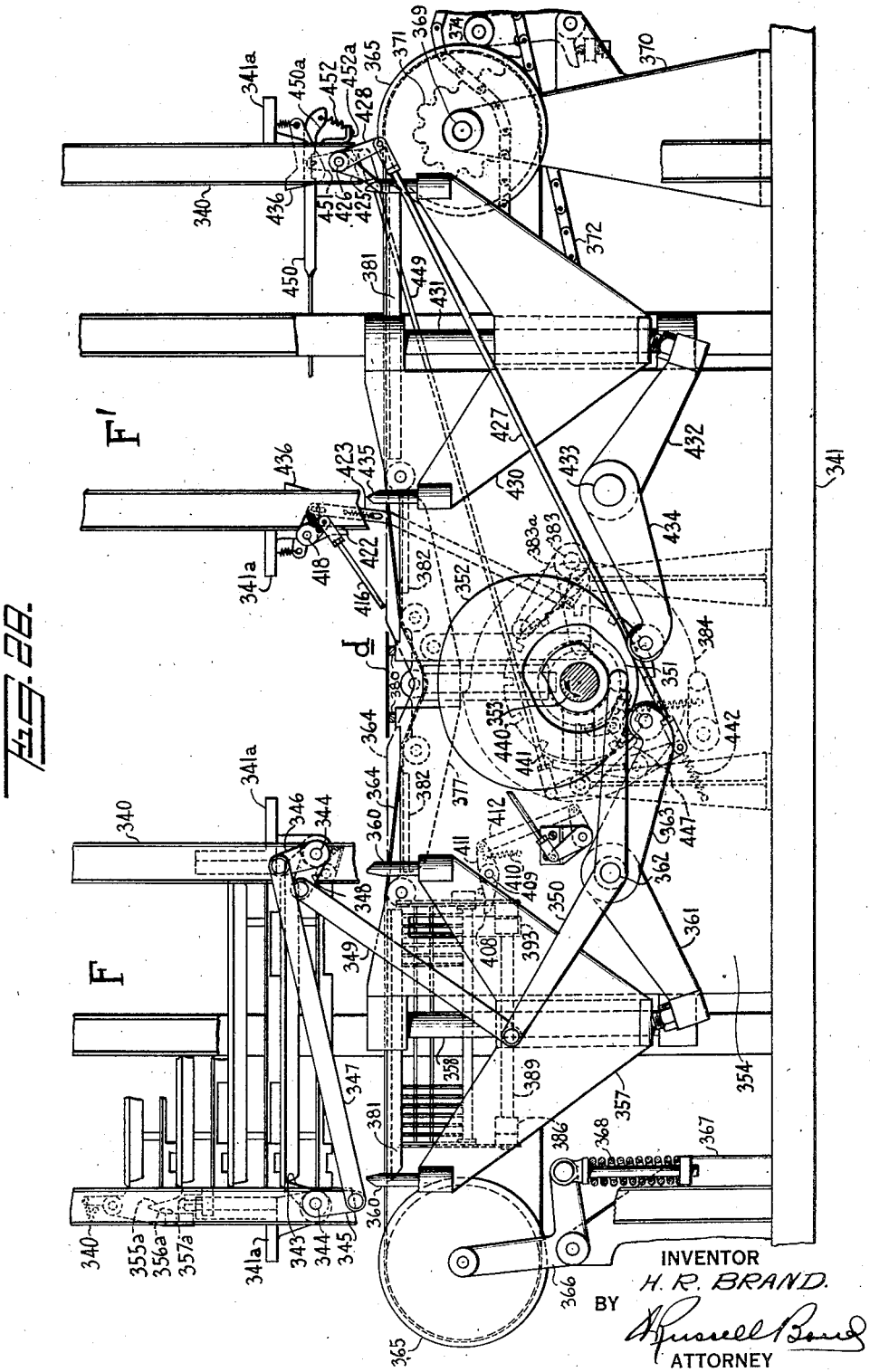

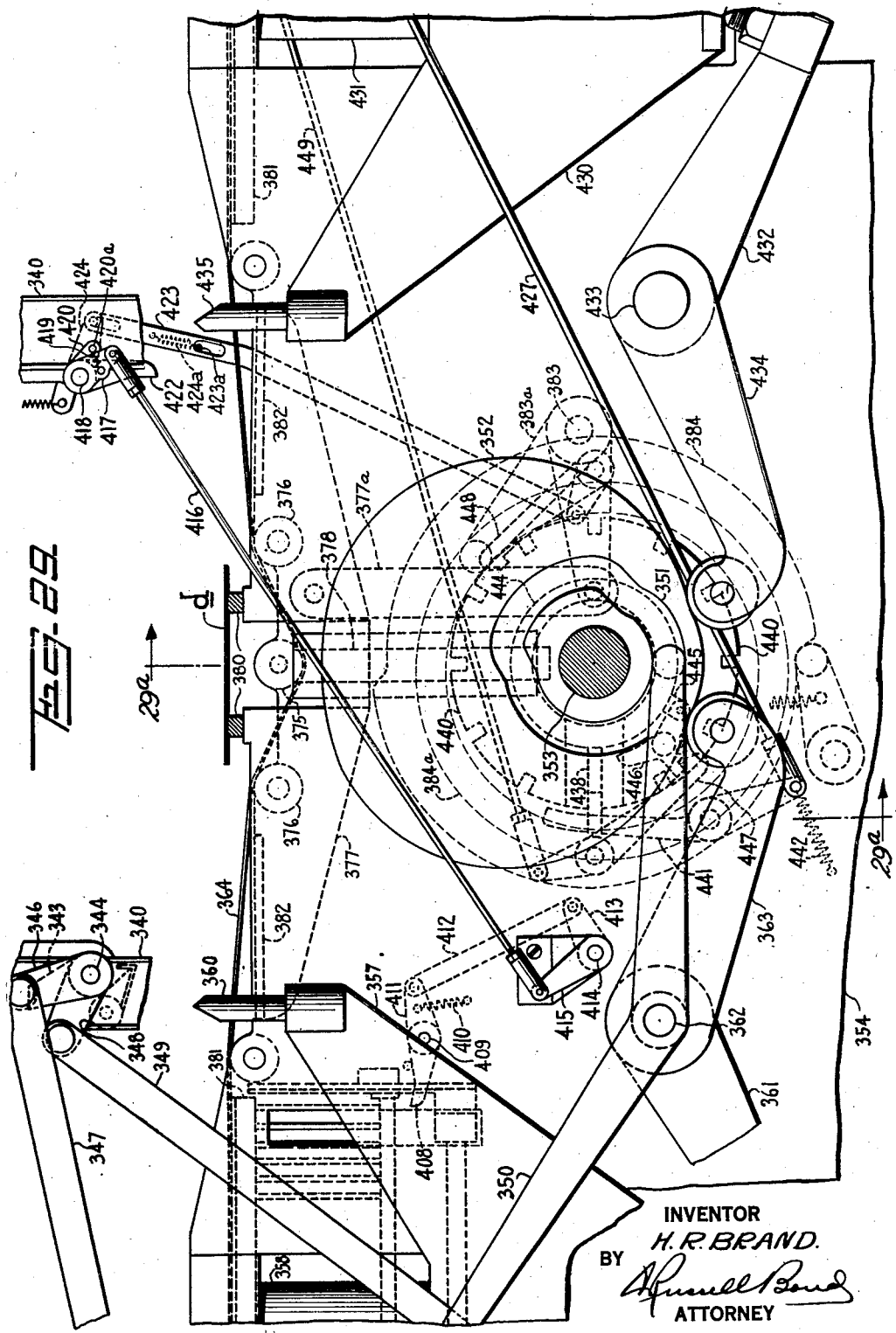

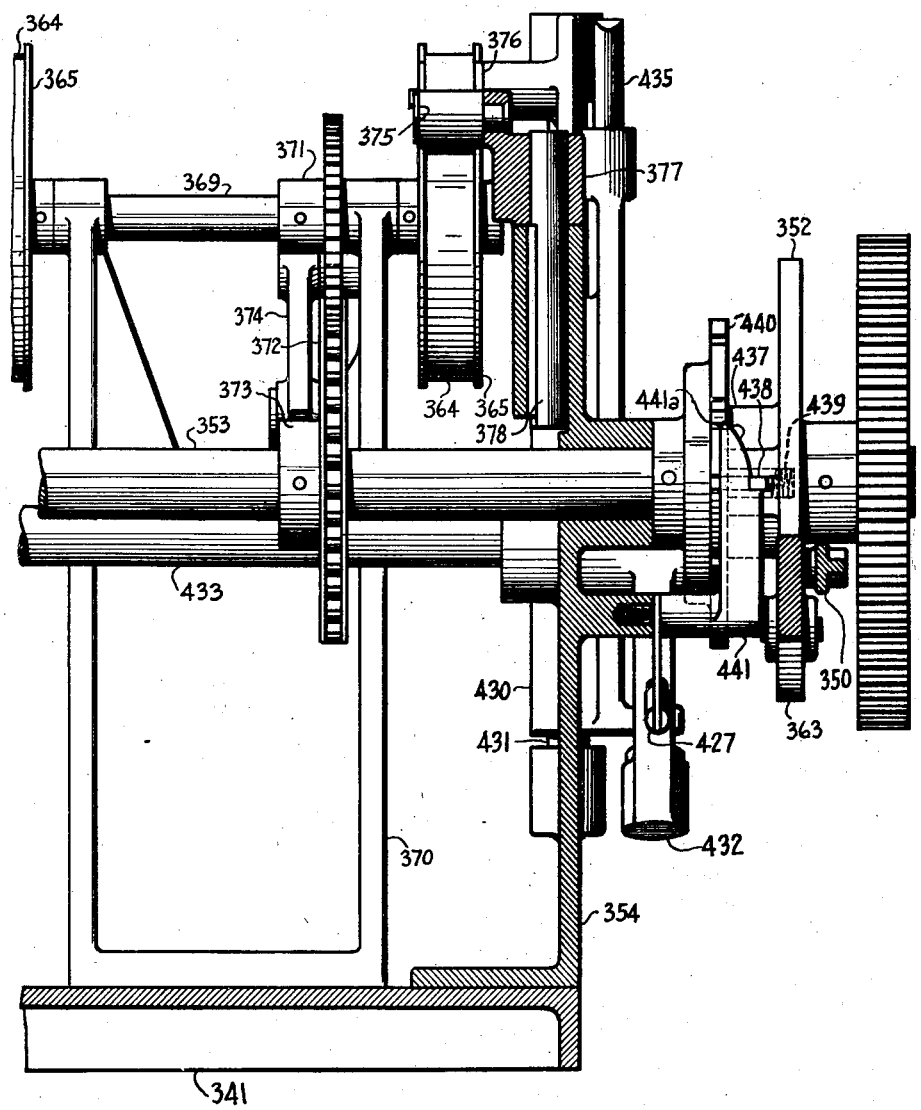

Jan. 22, 1935.  H. R. BRAND  1,988,936
AUTOMATIC COMMODITY HANDLING SYSTEM
Filed Dec. 10, 1930  37 Sheets-Sheet 16
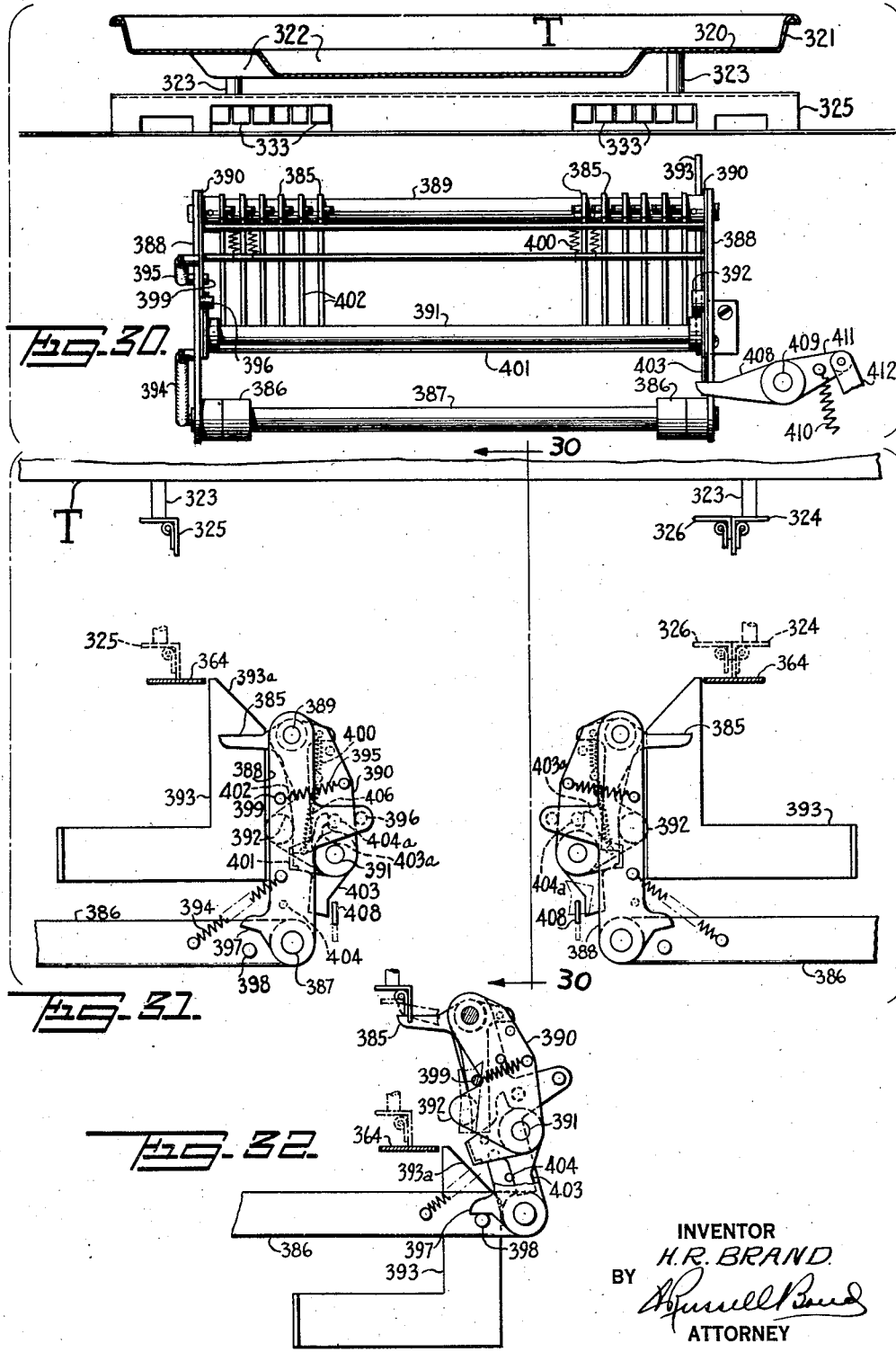
INVENTOR
H. R. BRAND.
BY
ATTORNEY Jan. 22, 1935.  H. R. BRAND  1,988,936
AUTOMATIC COMMODITY HANDLING SYSTEM
Filed Dec. 10, 1930  37 Sheets-Sheet 17

INVENTOR
*H. R. BRAND.*
BY
ATTORNEY

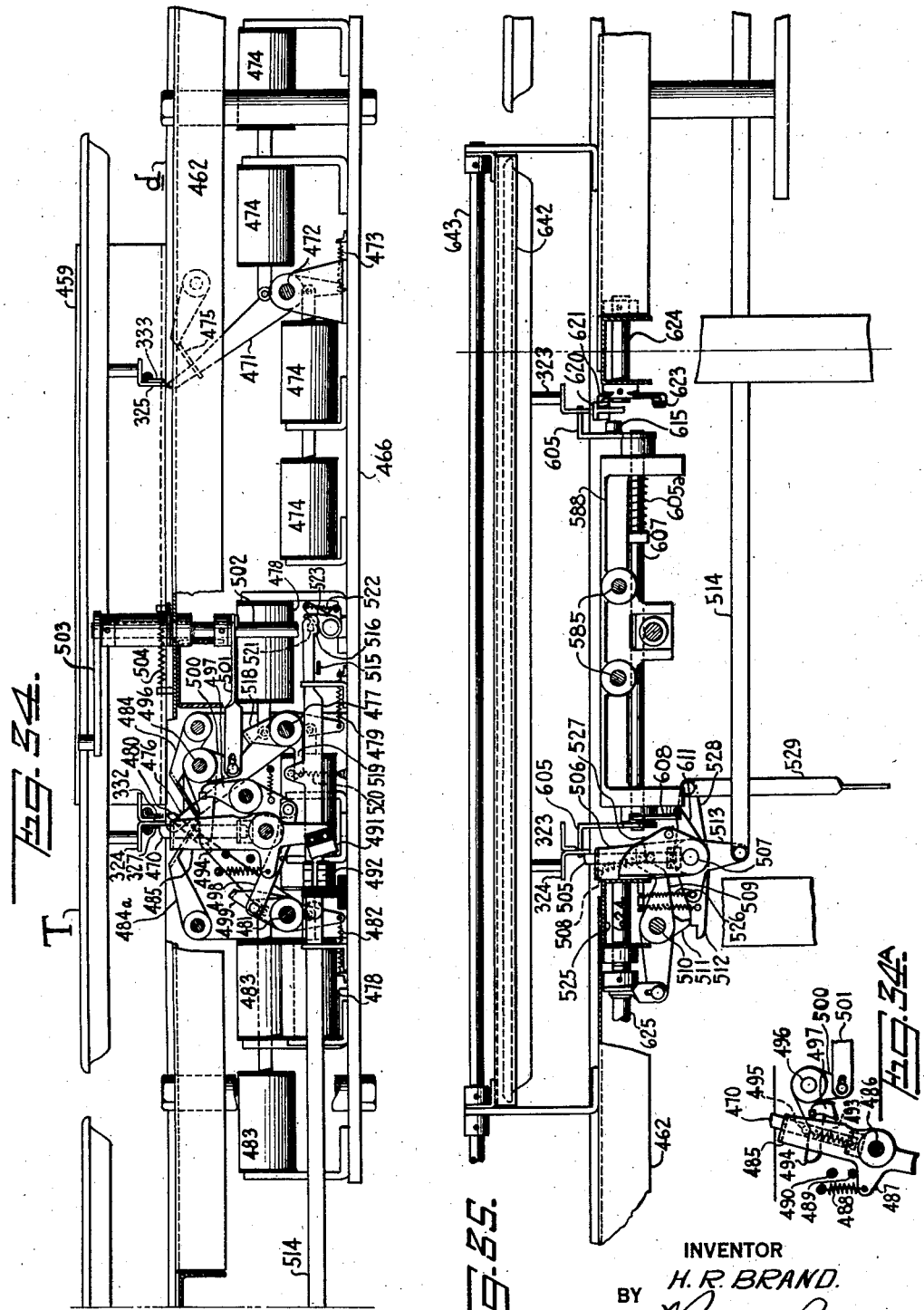

Jan. 22, 1935.  H. R. BRAND  1,988,936
AUTOMATIC COMMODITY HANDLING SYSTEM
Filed Dec. 10, 1930   37 Sheets-Sheet 20

INVENTOR
H. R. BRAND
BY
ATTORNEY

Jan. 22, 1935.                H. R. BRAND                1,988,936
                    AUTOMATIC COMMODITY HANDLING SYSTEM
                    Filed Dec. 10, 1930    37 Sheets-Sheet 21
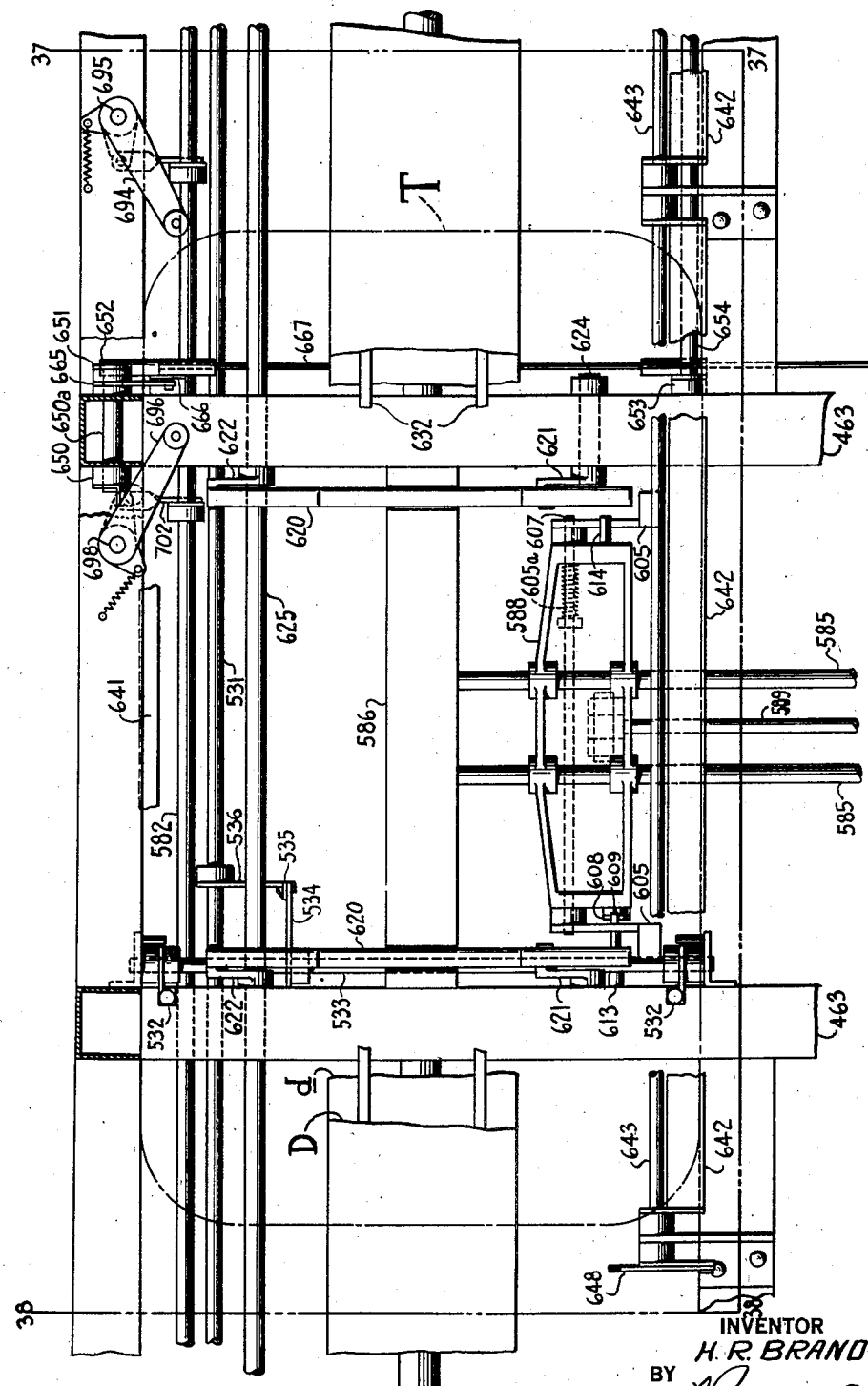
INVENTOR
H. R. BRAND
BY
         ATTORNEY

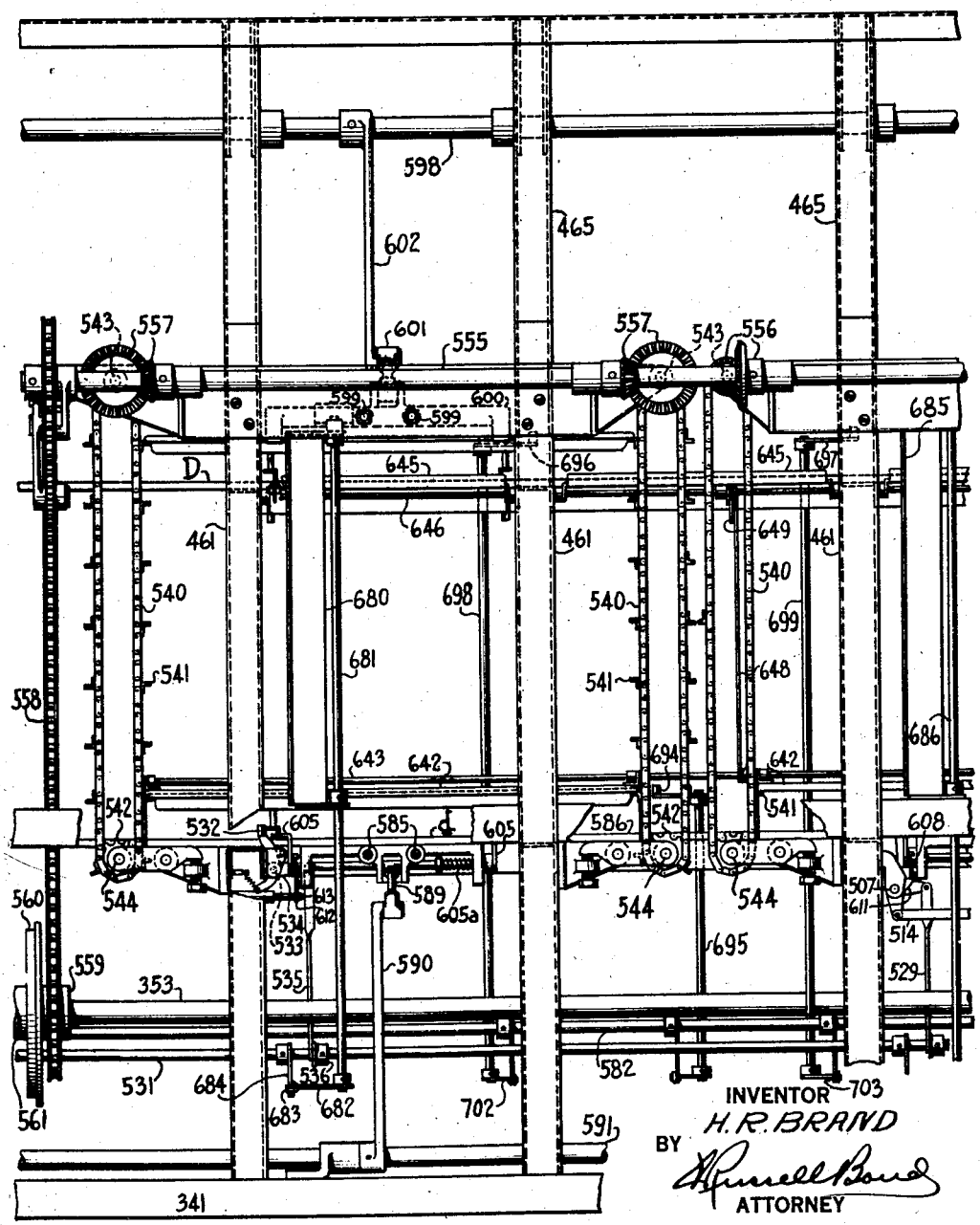

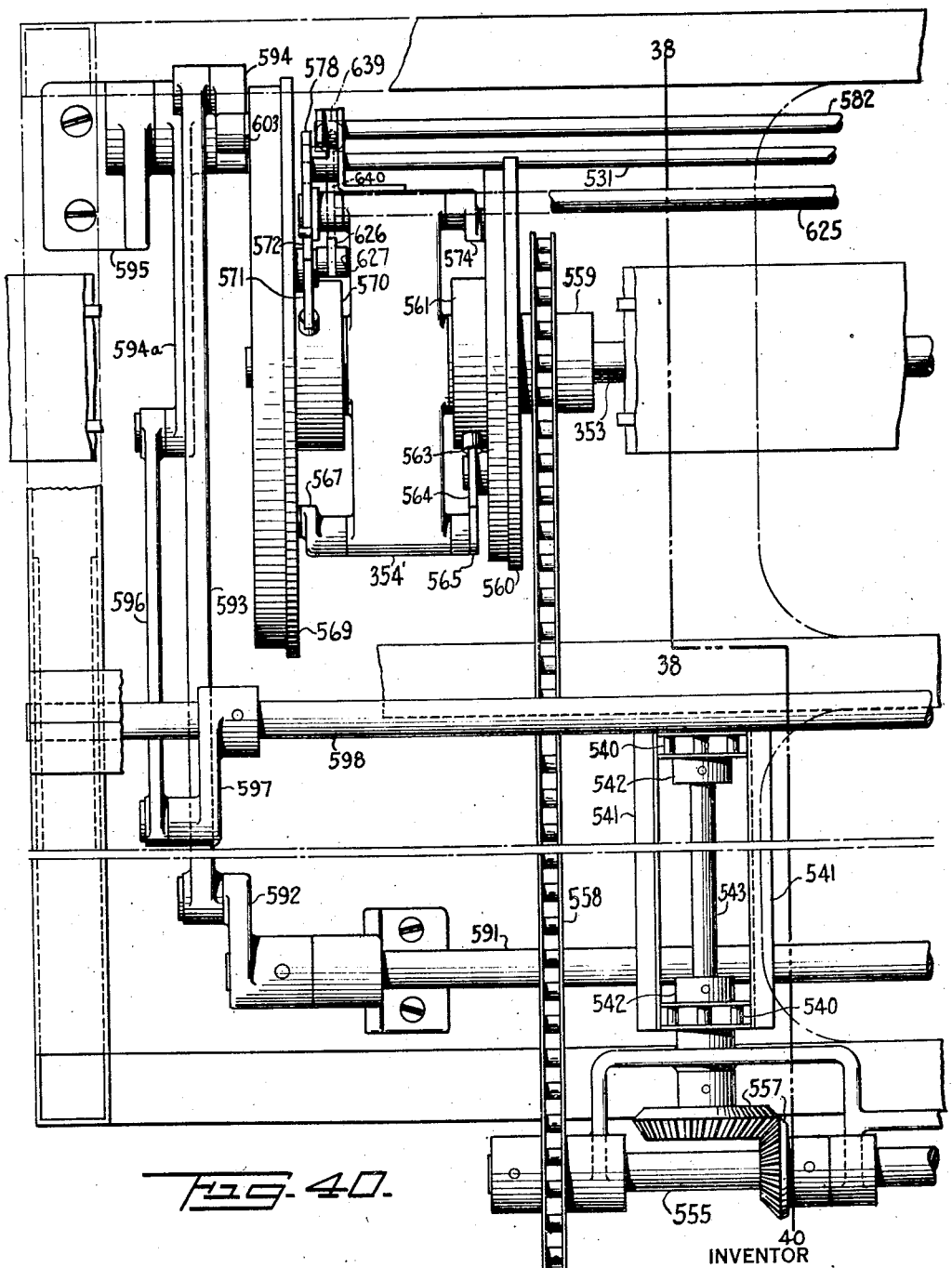

Jan. 22, 1935.  H. R. BRAND  1,988,936
AUTOMATIC COMMODITY HANDLING SYSTEM
Filed Dec. 10, 1930    37 Sheets-Sheet 24
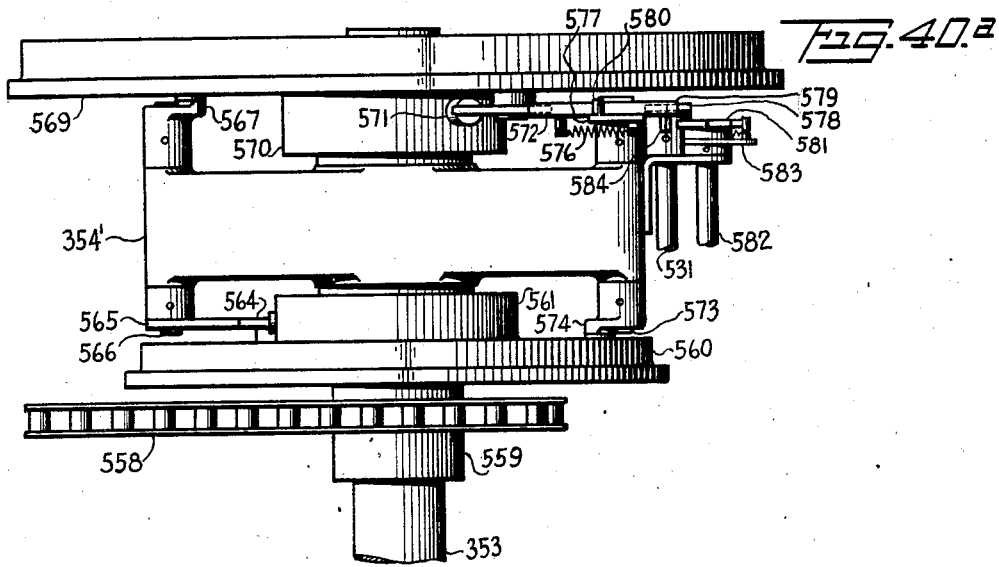
*Fig. 40.a*
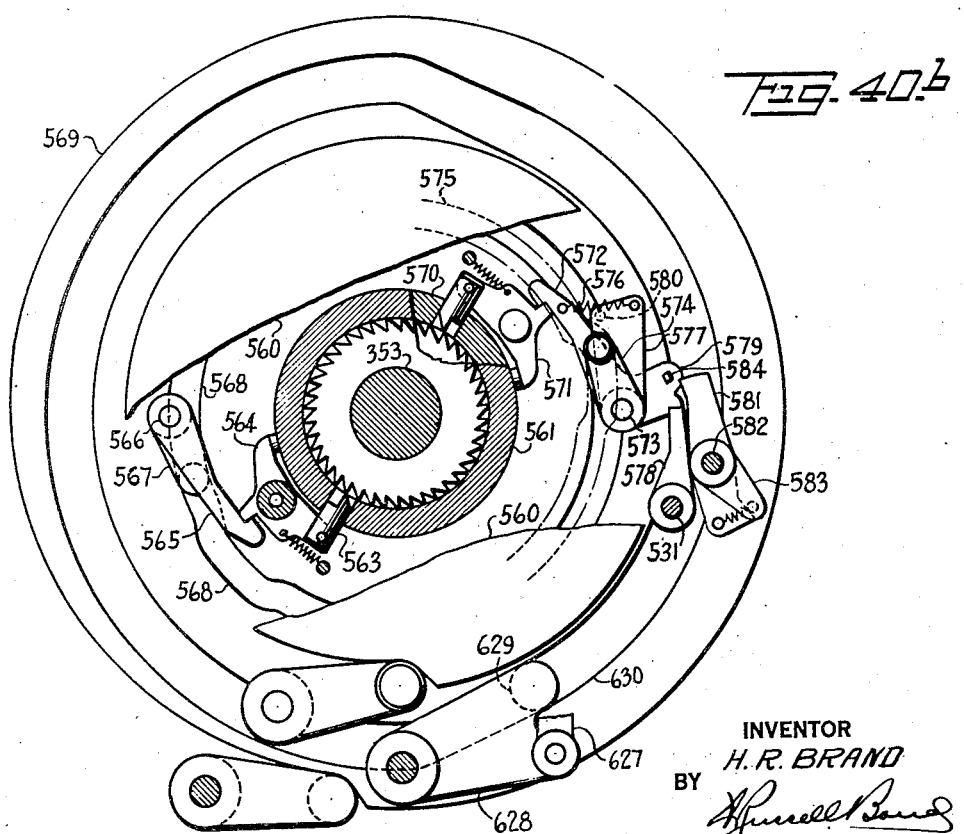
*Fig. 40.b*
INVENTOR
*H. R. BRAND*
BY
*H. Russell Bond*
ATTORNEY

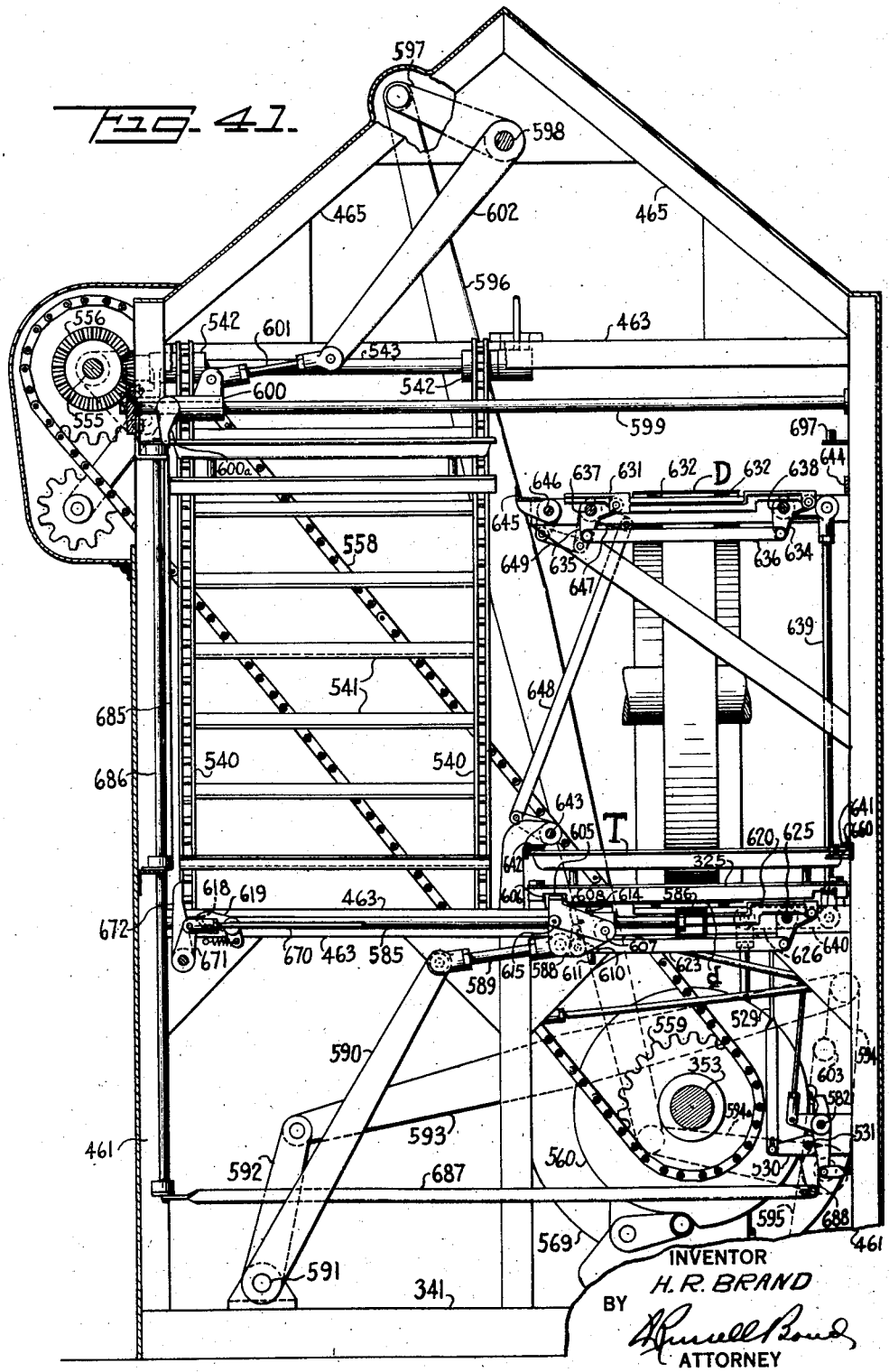

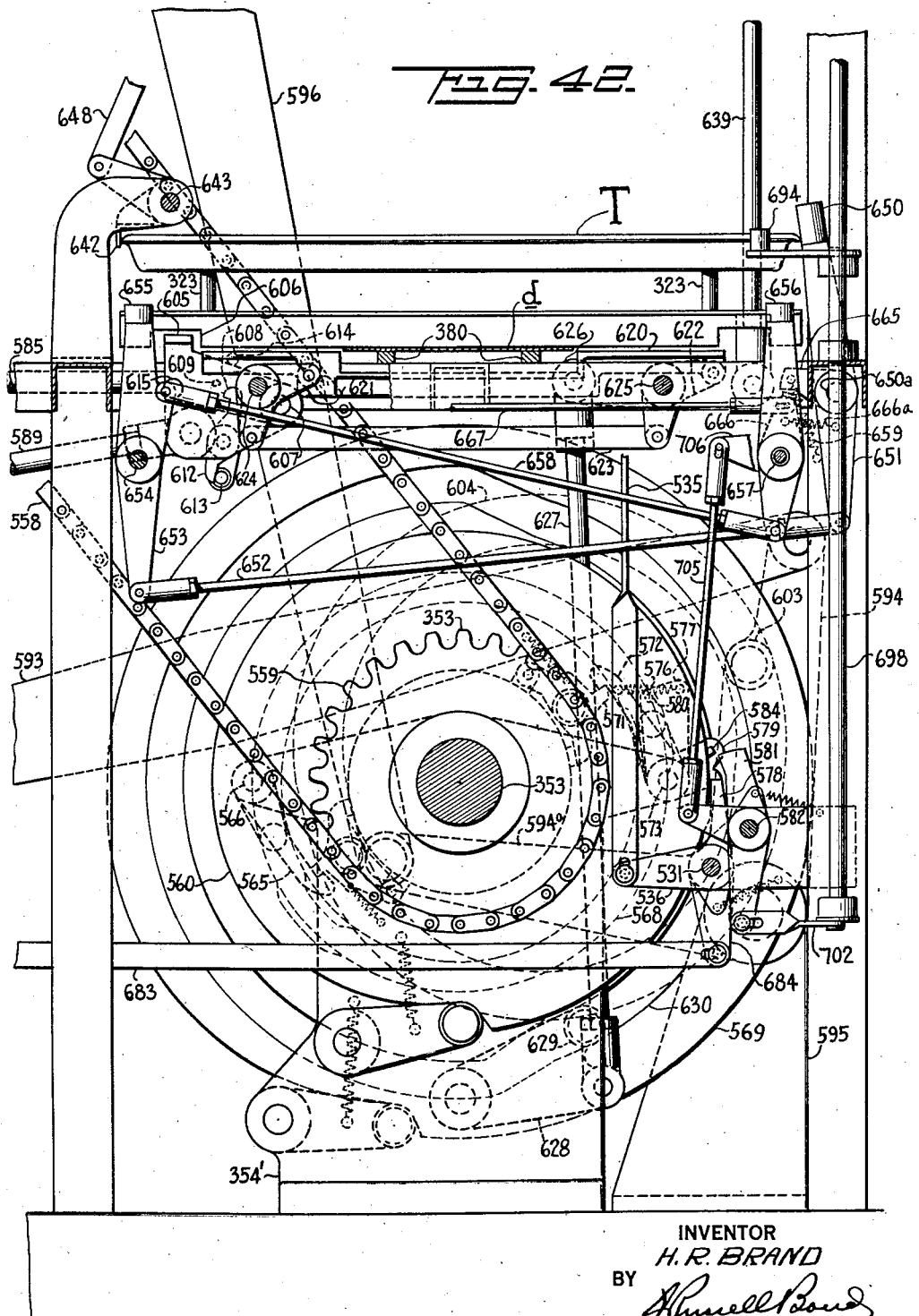

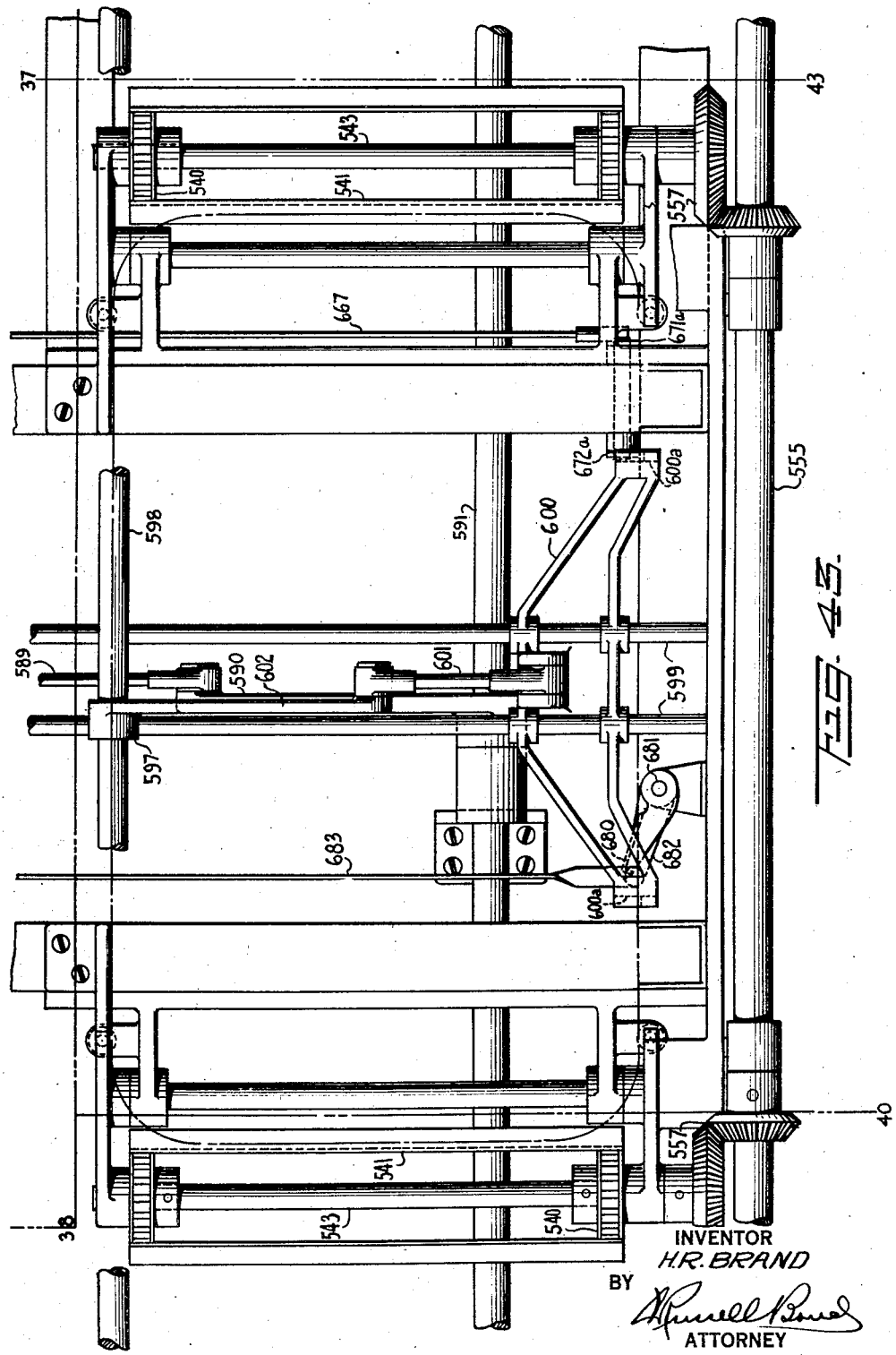

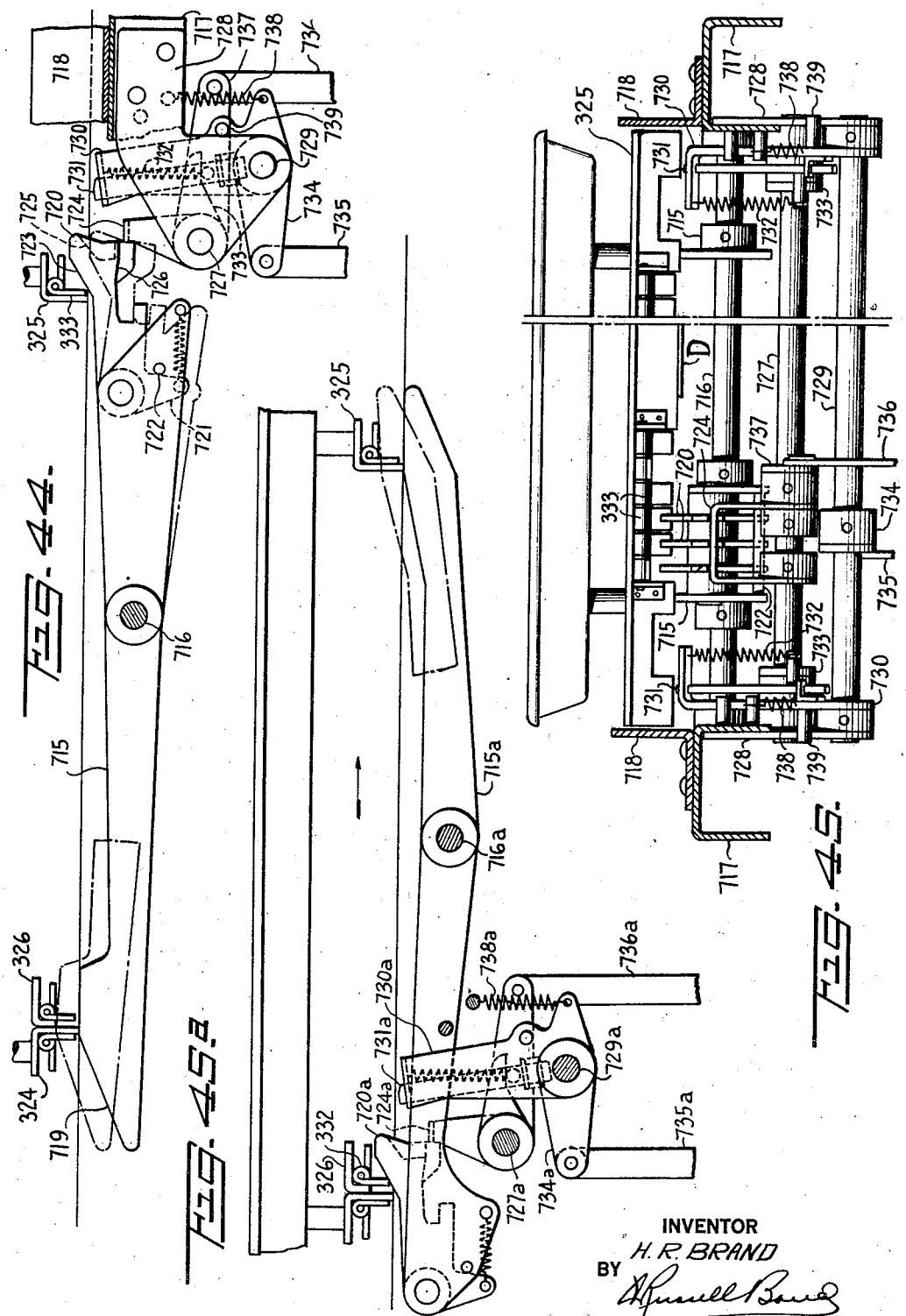

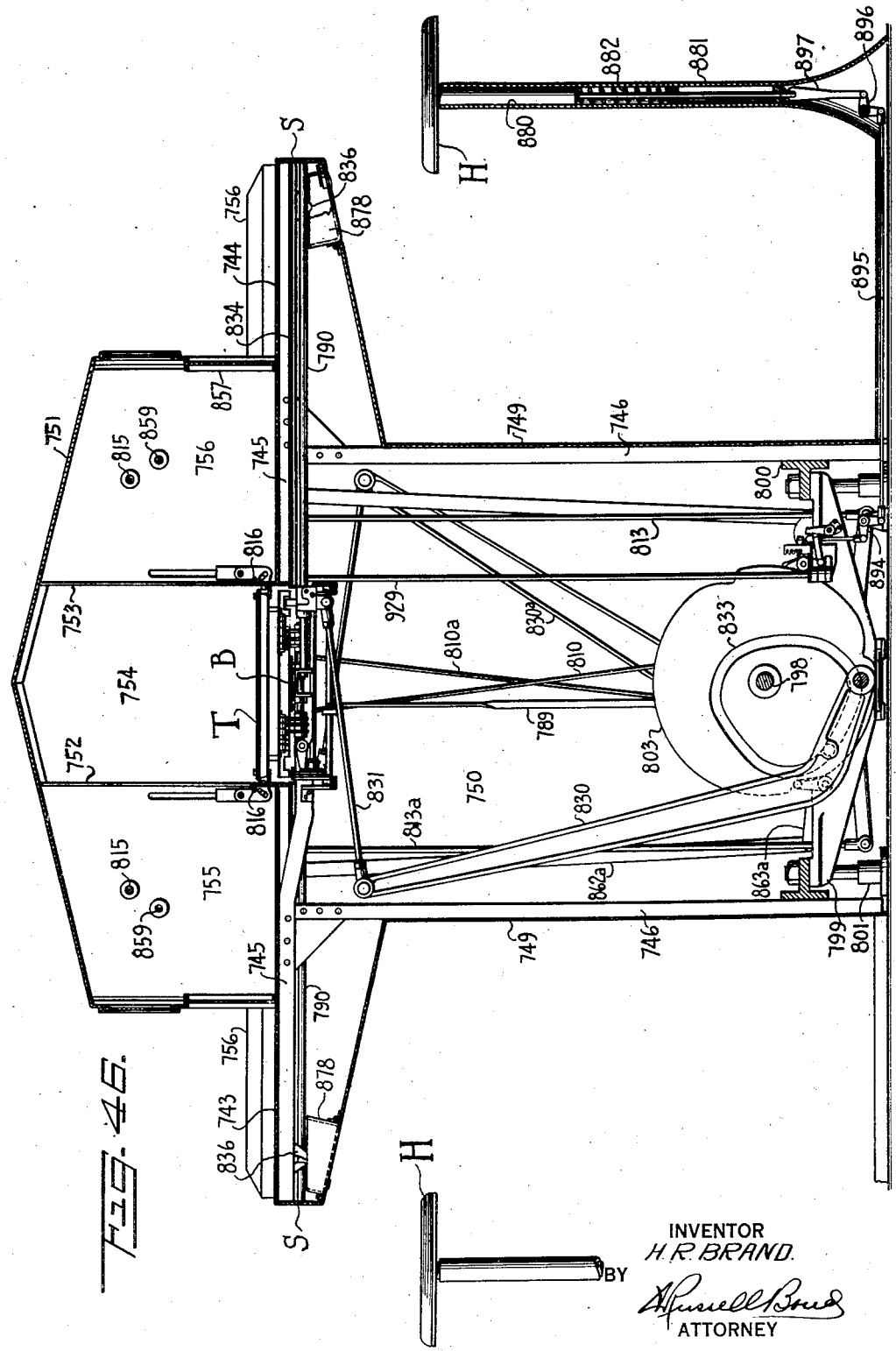

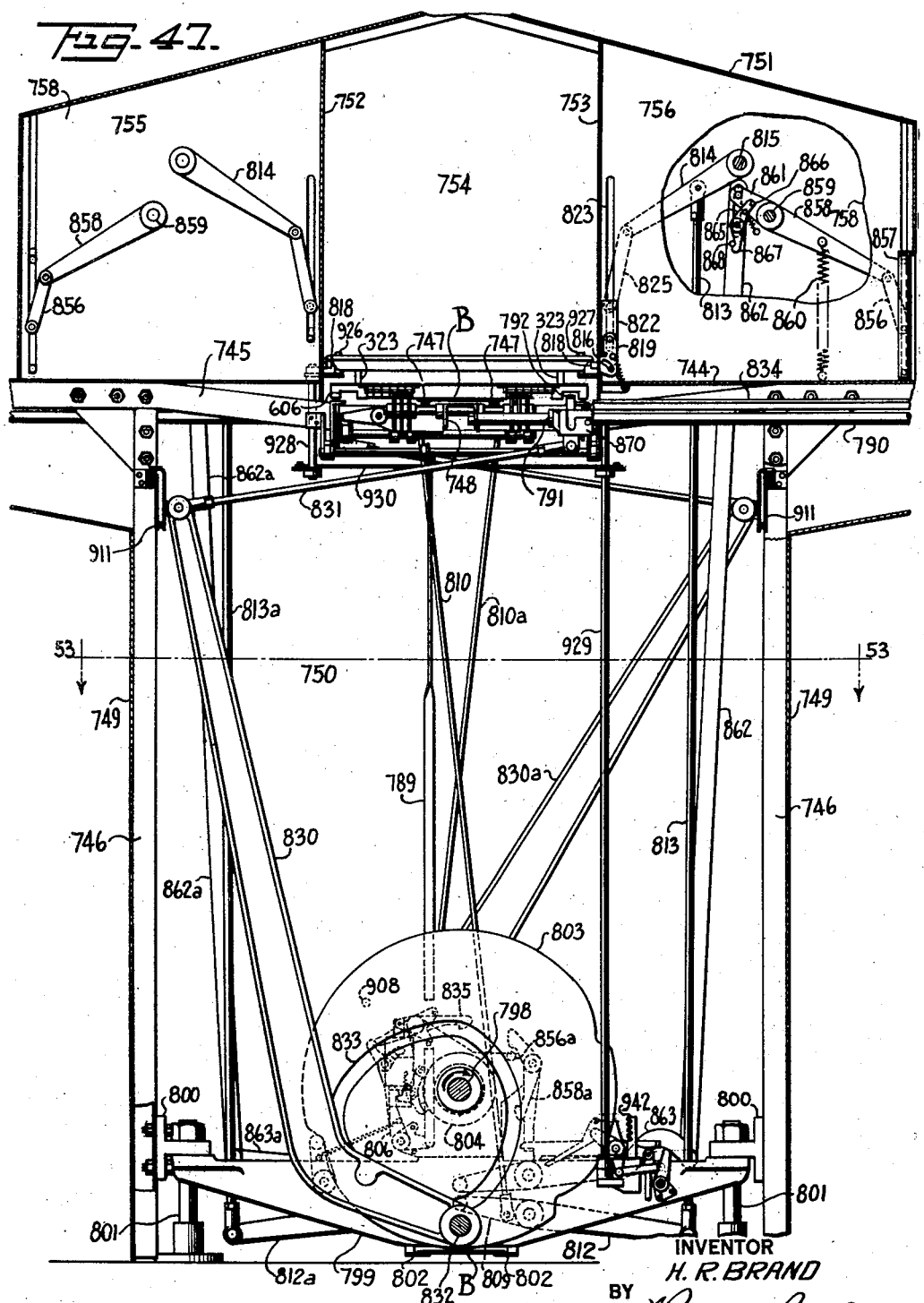

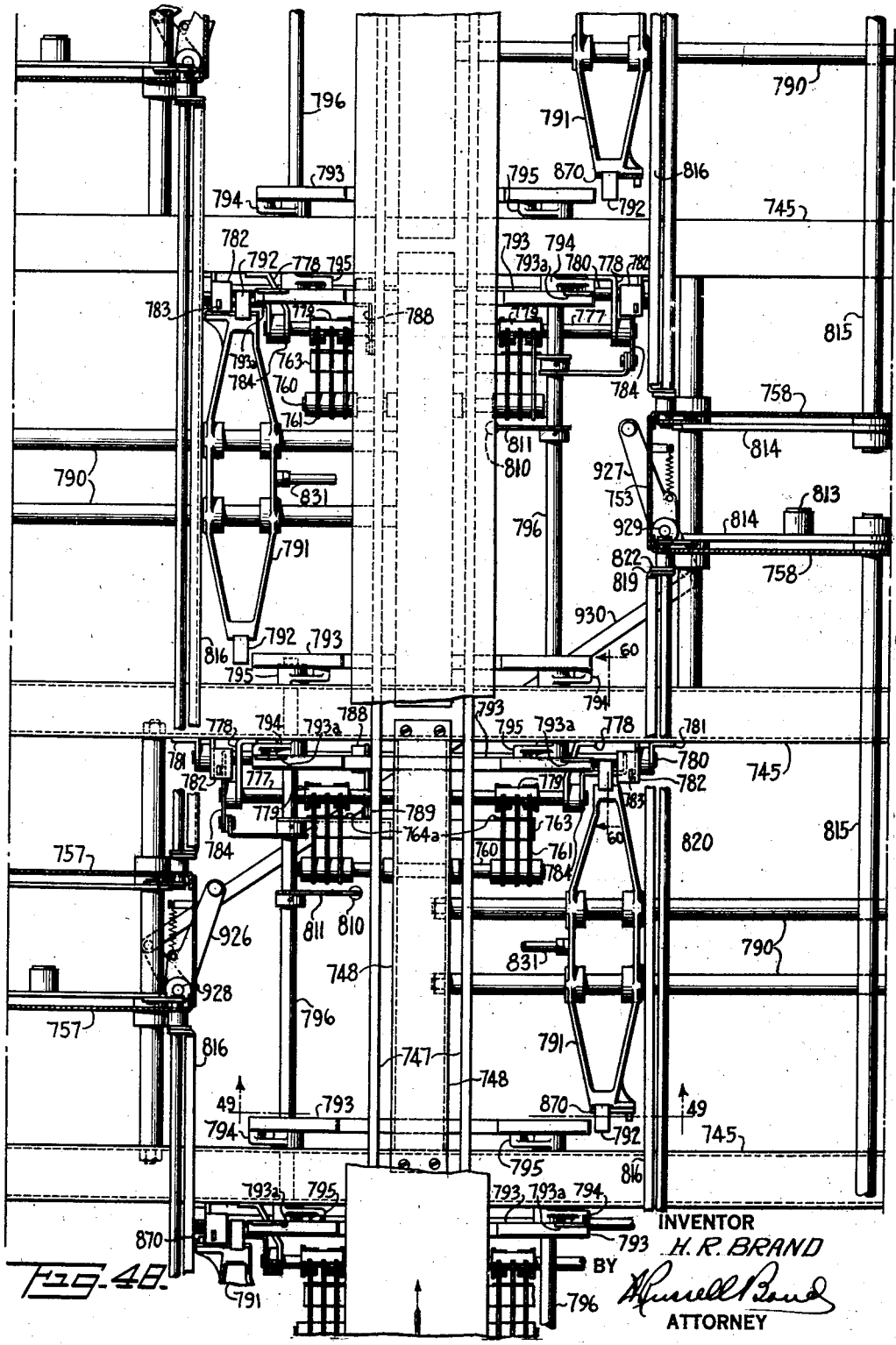

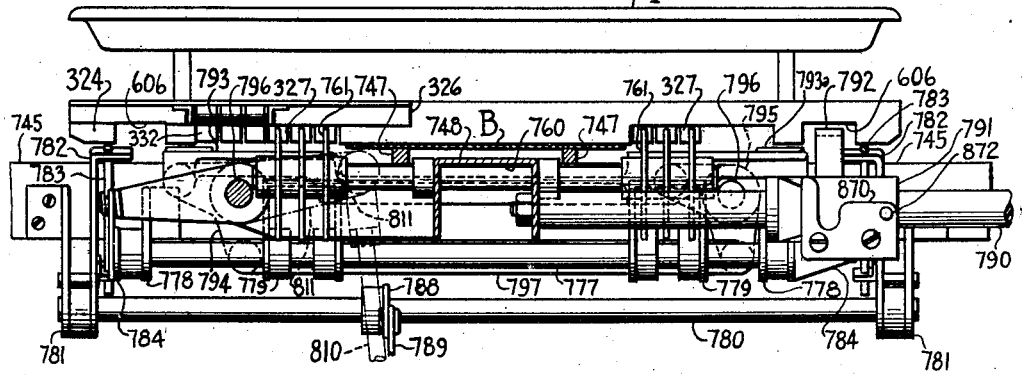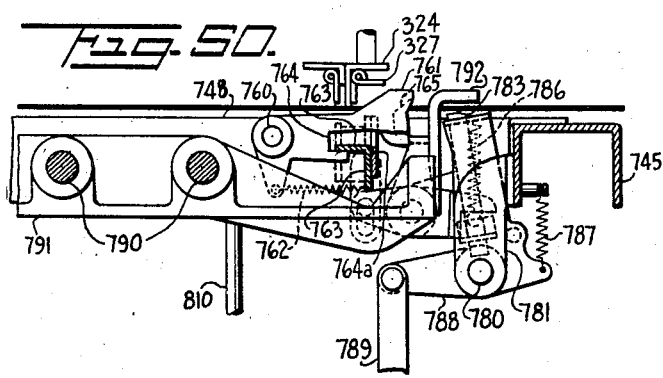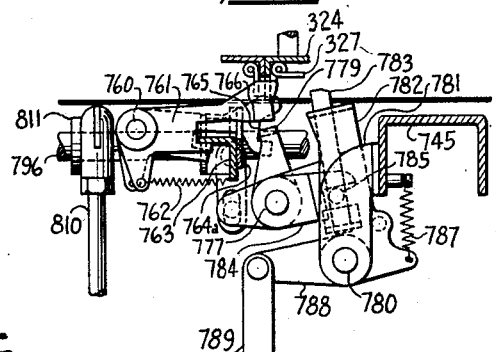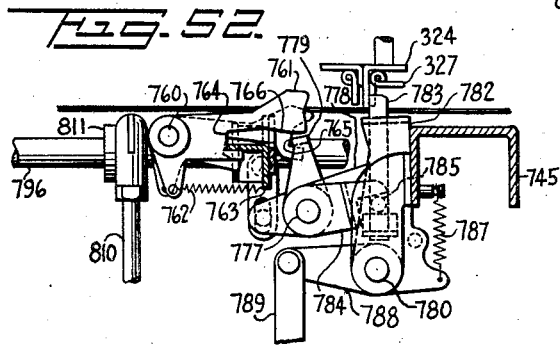

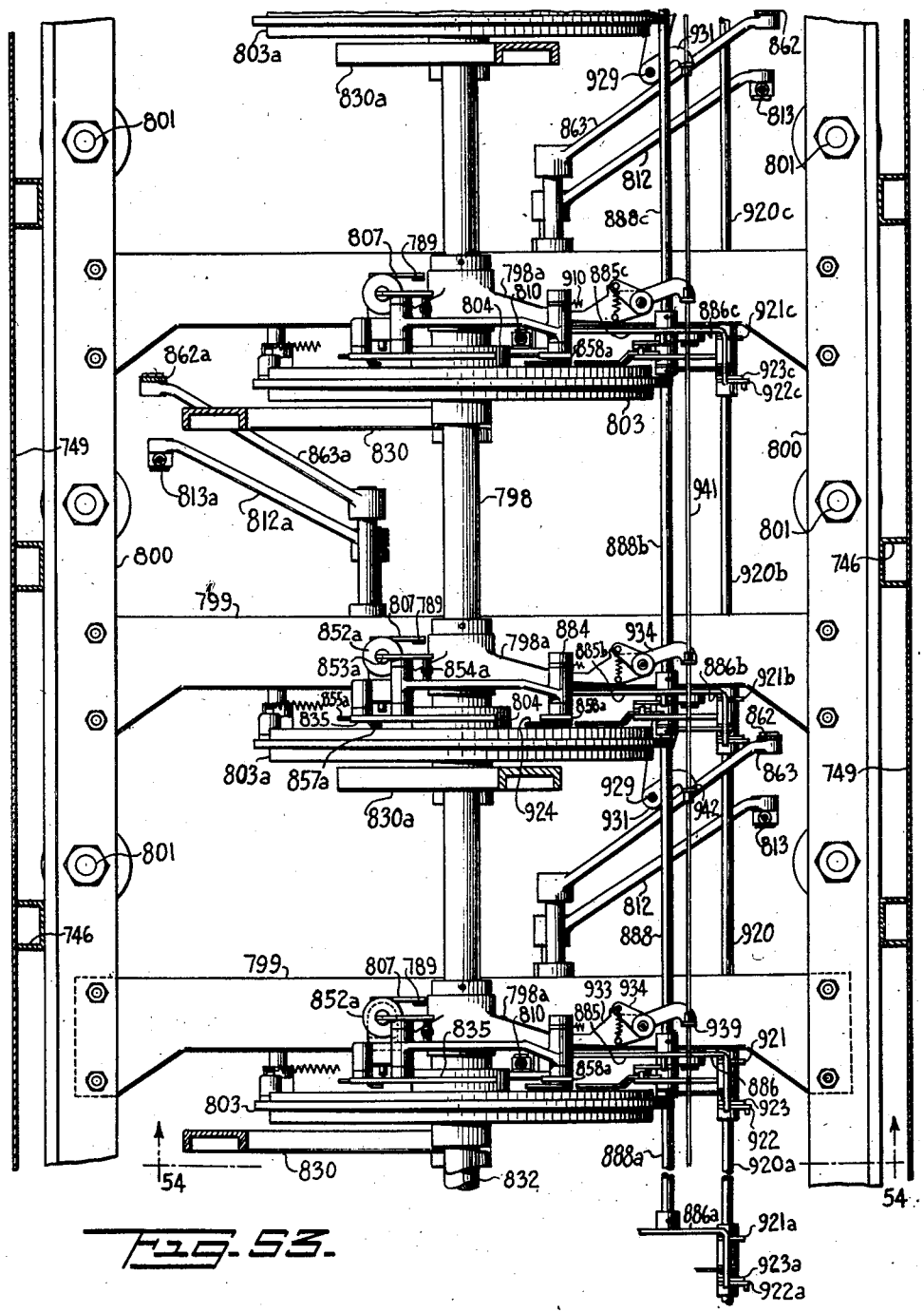

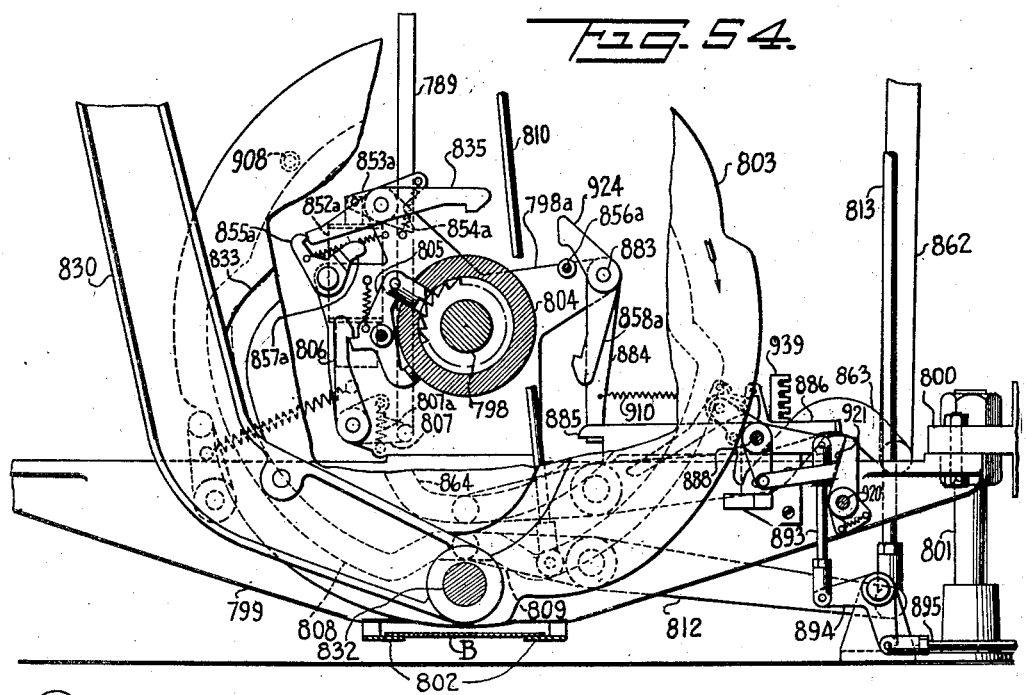
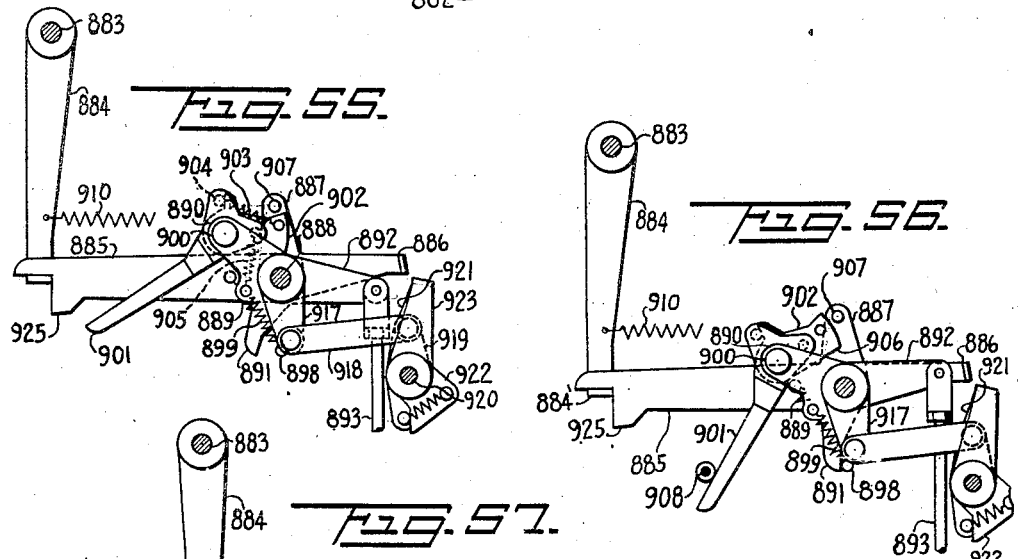
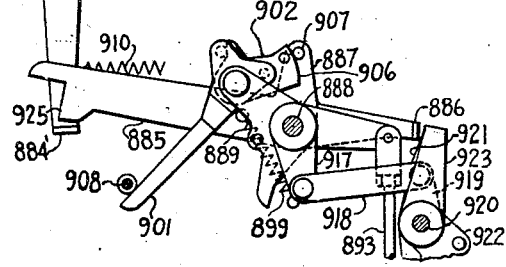

Jan. 22, 1935. H. R. BRAND 1,988,936
AUTOMATIC COMMODITY HANDLING SYSTEM
Filed Dec. 10, 1930 37 Sheets-Sheet 35
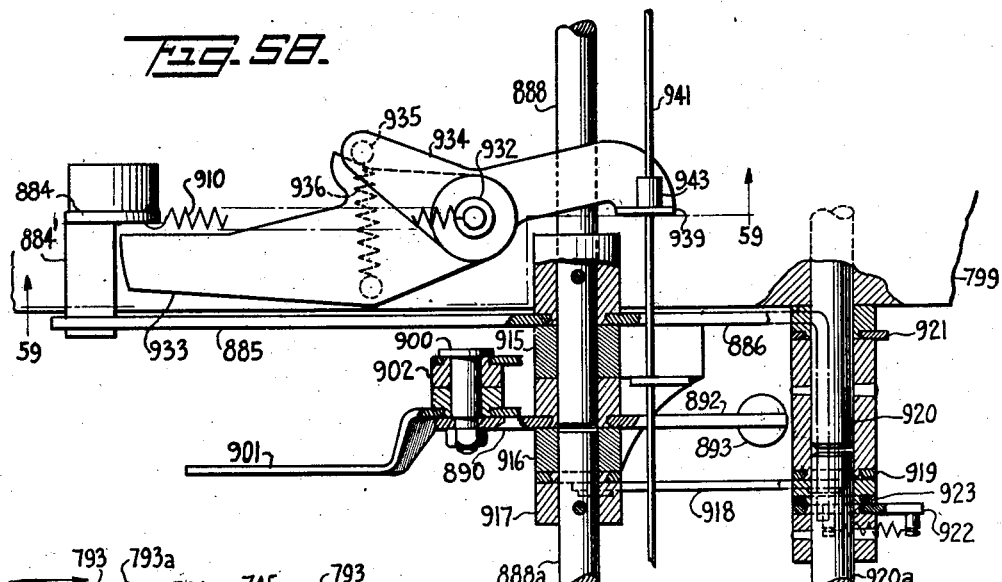
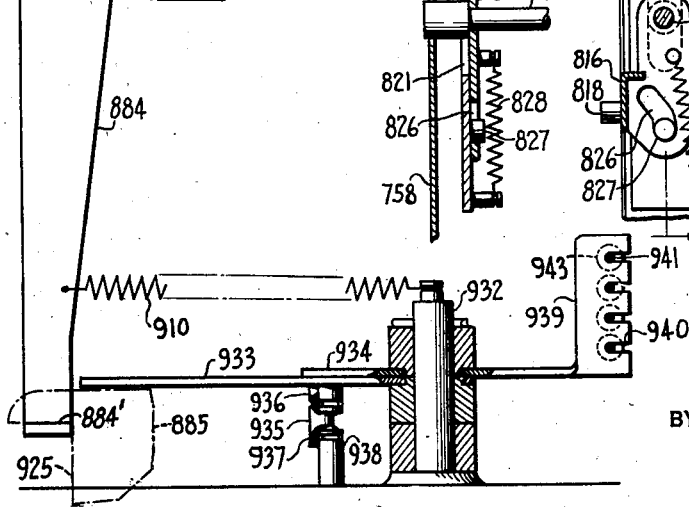
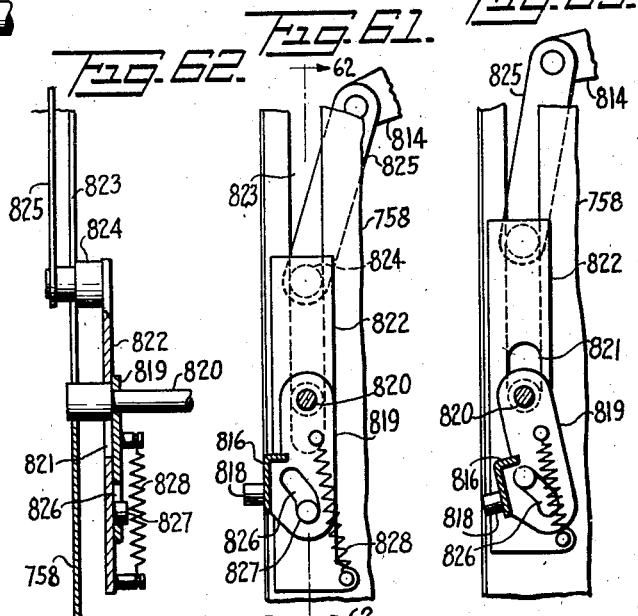
INVENTOR
*H. R. BRAND.*
BY
*H. Russell Bond*
ATTORNEY Jan. 22, 1935.                H. R. BRAND                1,988,936
                      AUTOMATIC COMMODITY HANDLING SYSTEM
                        Filed Dec. 10, 1930    37 Sheets-Sheet 36
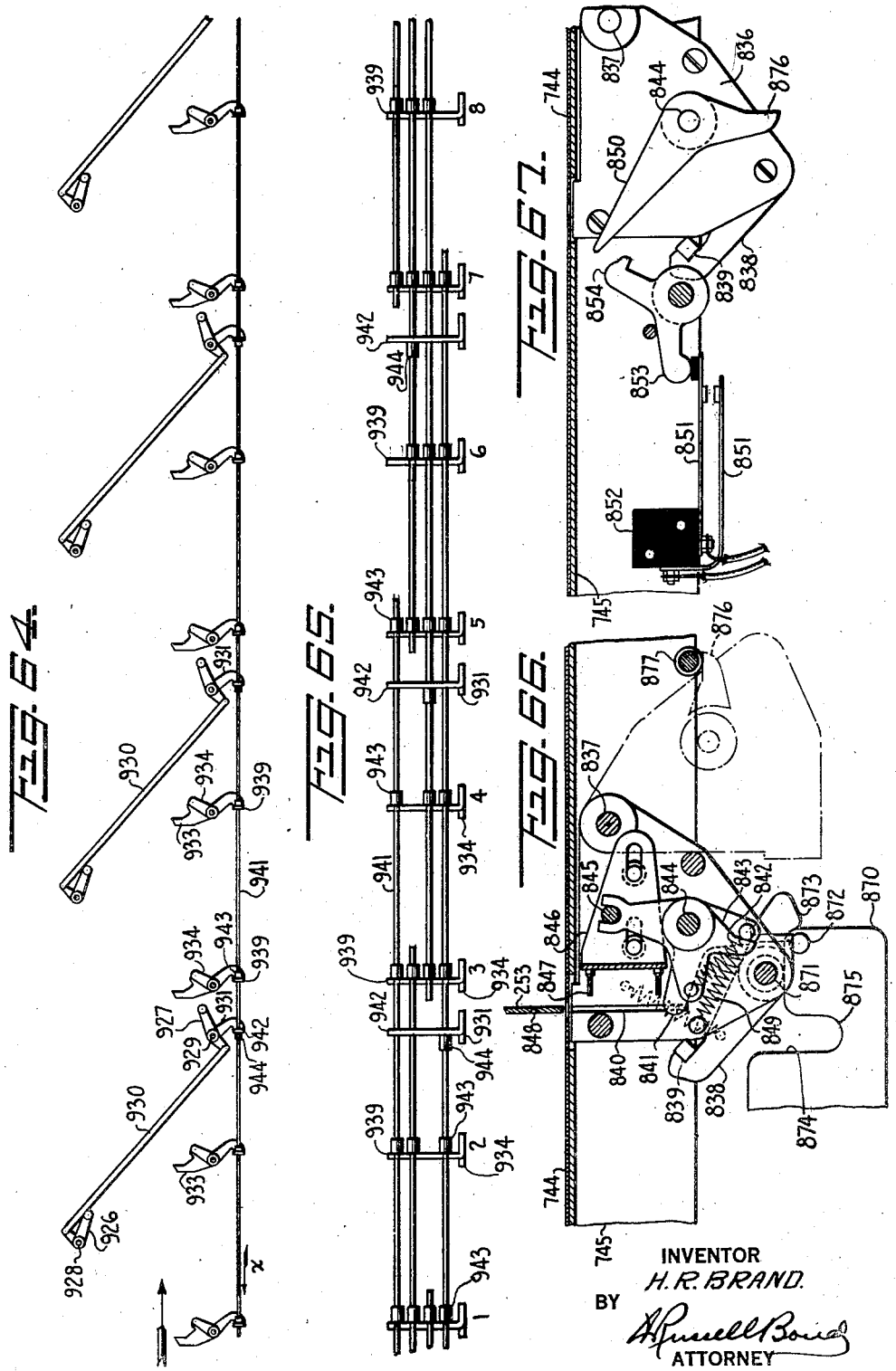

Jan. 22, 1935.  H. R. BRAND  1,988,936
AUTOMATIC COMMODITY HANDLING SYSTEM
Filed Dec. 10, 1930    37 Sheets-Sheet 37
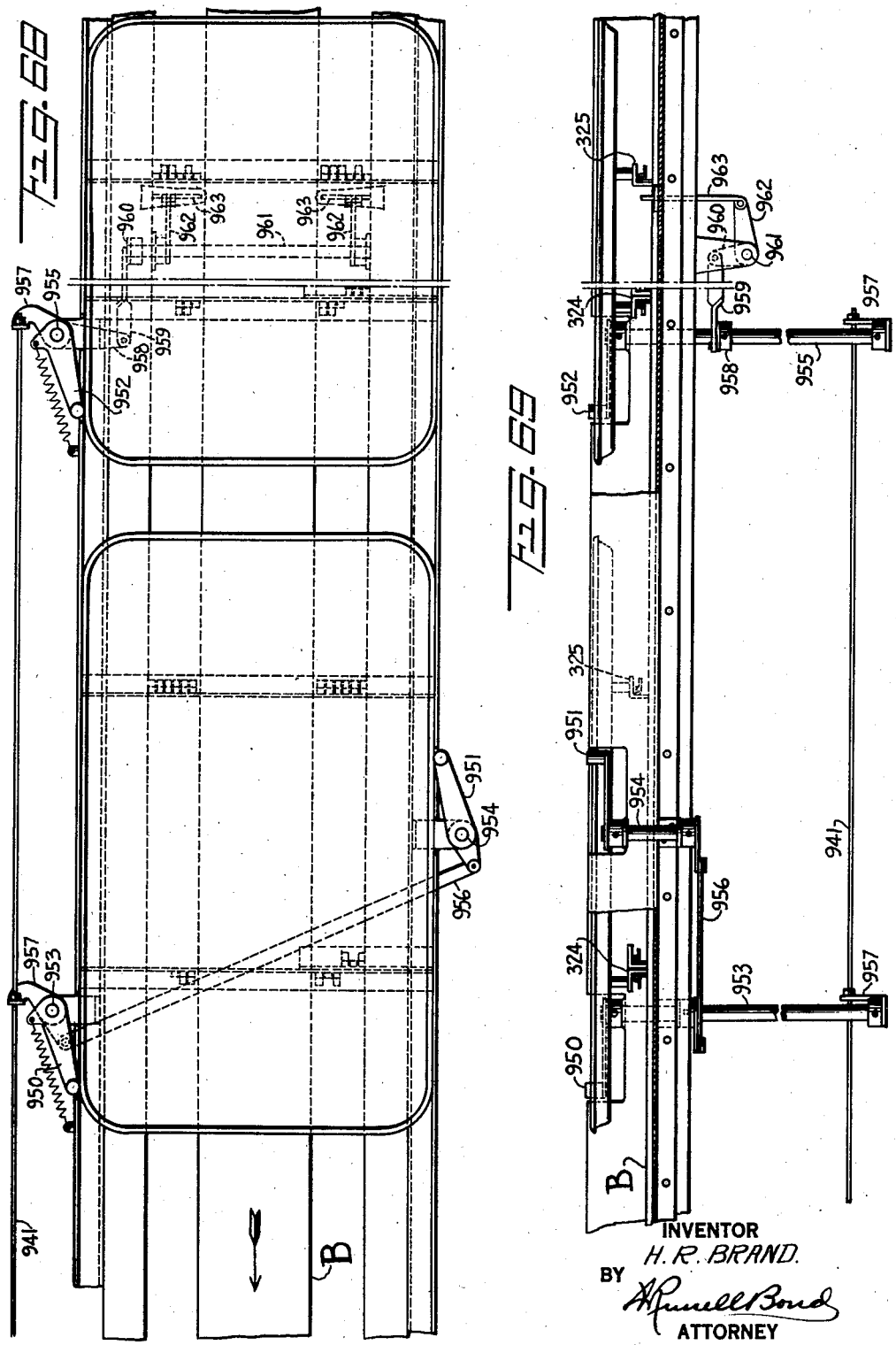
INVENTOR
H. R. BRAND.
BY
ATTORNEY Patented Jan. 22, 1935

1,988,936

UNITED STATES PATENT OFFICE 1,988,936

AUTOMATIC COMMODITY HANDLING SYSTEM

Harry Russell Brand, New York, N. Y.

Application December 10, 1930, Serial No. 501,245

82 Claims. (Cl. 194—4)

My invention relates to automatic systems for handling commodities and has for an object to provide a new method of merchandising and apparatus for carrying out such method.

Another object of the invention is to provide a commodity handling system in accordance with which an article may be automatically dispensed under direction of a single individual with complete involuntary control over the entire transaction, whereby full responsibility may be placed upon said individual for the entire transaction.

A further object is to provide a commodity handling system which will automatically select, assemble and vend a plurality of different articles as part of the same sales transaction and deliver them as a unit with complete involuntary control over the entire transaction.

A further object is to provide a commodity handling system which will dispense selected articles some or all of which may be prepared, portioned or assembled on order, and deliver said articles automatically and as a unit to a designated delivery station without the intervention of the human element.

In my copending application, Serial No. 288,722, filed June 27, 1928, I describe an automatic vending system for dispensing and delivering commodities, in which the dispensing of a commodity or group of commodities constituting an order, is initiated by an impulse transmitted by a vendor from a control station, a token being automatically issued to the vendee simultaneously with the sending of the impulse. However, the vendor has no control over the point of delivery of the order, but the vendee may select any one of a number of delivery stations and by inserting the token at the selected station, cause the delivery of the order to said station. In said system the vendee has no choice of the commodities, and since all orders are alike and it matters not whether he receives the particular order whose preparation and dispensing was initiated at the time he received his token; hence deliveries are made not in the order in which tokens are issued, but in the order in which tokens are deposited at the delivery stations. In said application, by way of illustration, I describe the invention as applied to a restaurant serving a table d'hote meal, with no choice of the food items constituting the meal and with a uniform price for all the meals served.

The invention forming the subject matter of the present application, like that described in said copending application, is not limited to restaurant service, but is applicable to a wide variety of services. However, it differs from the invention of said copending application in permitting a choice of a variety of commodities. Thus the present invention has for an object to provide, in connection with a plurality of dispensing machines, selective means adapted to be set up by the vendor in compliance with the choice expressed by the vendee, for determining which of said machines will be automatically operated to fill the vendee's order. Hence, as applied to a restaurant the present invention permits of serving an a la carte meal.

Since different orders will almost certainly vary in number and choice of commodity items as well as in the price of the order, the present invention has for an object to provide means for identifying the vendee with the particular order he has placed.

Another object of the invention is to provide means controlled by the vendor for selecting the particular station to which an order will be automatically but inaccessibly delivered, and for simultaneously issuing to the vendee a token identified with said station, by means of which the vendee may gain access to the order.

As in the invention of said copending application, the present invention includes means for removing from the delivery station such residue or part of the order, if any, as may not be taken by the vendee. It is an object of the present invention to prevent the vendor from selecting a station for delivery of an order until said station has been cleared of a previous order.

Another object is to provide, in a selective dispensing and delivery system, in which certain commodities are ready for instant delivery and others must be prepared after the order is placed, means for routing orders composed solely of ready commodities ahead of orders which include one or more unready commodities.

Other objects and advantages will appear in the following description of a preferred embodiment of my invention and thereafter the novelty and scope of the invention will be pointed out in the claims.

In the accompanying drawings;

Figures 1 and 2 are diagrammatic plan and side views respectively of an automatic restaurant embodying my invention;

Fig. 3 is a plan view of keyboard machine for controlling the restaurant, the upper walls of the casing of said machine being cut away to reveal interior details;

Fig. 4 is a view in section taken substantially on the line 4—4 of Fig. 3 showing certain seat keys and associated mechanism;

Fig. 5 is a view in section taken substantially on the line 5—5 of Fig. 3, showing certain commodity keys and associated mechanism;

Fig. 6 is a fragmental view in transverse section taken substantially on the line 6—6 of Fig. 3 and looking toward the front of the machine;

Fig. 7 is a view in transverse section taken substantially on the line 7—7 of Fig. 3 and looking toward the front of the machine;

Fig. 8 is a view in transverse section taken substantially on the line 8—8 of Fig. 3 and looking toward the front of the machine;

Fig. 9 is a fragmental view in section taken substantially on the line 9—9 of Fig. 8;

Fig. 10 is a sectional detail view of a clearance key, the section being taken on the line 10—10 of Fig. 16;

Fig. 11 is a fragmental detail view of a latching mechanism for the commodity keys;

Fig. 12 is a view in section taken on the line 12—12 of Fig. 11;

Fig. 13 is a view on enlarged scale of a portion of Fig. 7, showing a register dial and certain price-setting mechanism associated therewith;

Fig. 14 is a view in section taken on the line 14—14 of Fig. 13;

Fig. 15 is a view similar to Fig. 14 but showing certain parts in a different position;

Fig. 16 is a view in section taken on the line 16—16 of Fig. 13 and showing the clearance key with associated mechanism;

Fig. 17 is a view similar to Fig. 16 but showing certain parts in a different position;

Fig. 18 is a view in perspective of certain locking mechanism for the seat and commodity keys;

Fig. 19 is a view in perspective further illustrating the mechanism shown fragmentally in Figs. 11 and 12;

Fig. 20 is an expanded view in perspective of a cam set for controlling certain of the mechanisms of the keyboard machine;

Fig. 21 is a plan view of a tray used in my automatic restaurant;

Figs. 22 and 23 are side views respectively of a pair of lug-bearing supporting rails secured to the bottom of the tray, Fig. 22 showing the rail near the right hand end of Fig. 21 as viewed from said end, and Fig. 23 showing the other rail as viewed from the left hand end of Fig. 21;

Fig. 24 is a view in cross-section taken on the line 24—24 of Fig. 23;

Fig. 25 is a somewhat diagrammatic plan view of a routing station for the trays with certain tray stacks being shown in section;

Fig. 26 is a side elevation of the same;

Fig. 27 is a view in section of certain tray stacking and lug testing mechanism, the section being taken substantially on the line 27—27 of Fig. 26 and showing the mechanism to the right of the line 27—27 of Fig. 25;

Fig. 28 is a view in section taken substantially on the line 28—28 of Fig. 27;

Fig. 29 is a view on an enlarged scale of a portion of Fig. 28;

Fig. 29a is a view in section of certain cam and clutch mechanism, the section being taken on the line 29a—29a of Fig. 29;

Fig. 30 is a view in section taken on the line 30—30 of Fig. 31 and showing mechanism for testing the lugs on one of the tray rails;

Fig. 31 is an end elevation of the lug testing mechanism;

Fig. 32 is a view of the lug testing mechanism shown at the left hand side of Fig. 31 but with certain parts in a different position;

Fig. 33 is a plan view of a portion of the routing station which lies between lines 27—27 and 33—33 of Fig. 25;

Fig. 34 is a side elevation of the same, partly in section;

Fig. 34a is a detail view of a portion of Fig. 34, showing certain parts in a different position;

Fig. 35 is a side elevation, partly in section, of a portion of the routing station lying between lines 33—33 and 37—37 of Fig. 25;

Fig. 38 is a plan view of a portion of the routing station lying between lines 37—37 and 38—38 in Fig. 25;

Fig. 39 is a side elevation of a portion of the routing station lying between lines 39—39 and 39a—39a in Fig. 26 and shows certain elevator mechanism;

Fig. 40 is a plan view of certain driving and transfer mechanism of the routing station located to the left of the line 38—38—40 of Fig. 25;

Fig. 40a shows a portion of Fig. 40 on an enlarged scale, illustrating certain cam and clutch mechanism;

Fig. 40b is an end elevation of the same partly broken away and in section;

Fig. 41 is a view in section of the routing station taken on the line 41—41 of Fig. 25;

Fig. 42 is a fragmental view in section taken substantially on the line 42—42 of Fig. 25 and showing only the lower portion of the structure;

Figure 22:
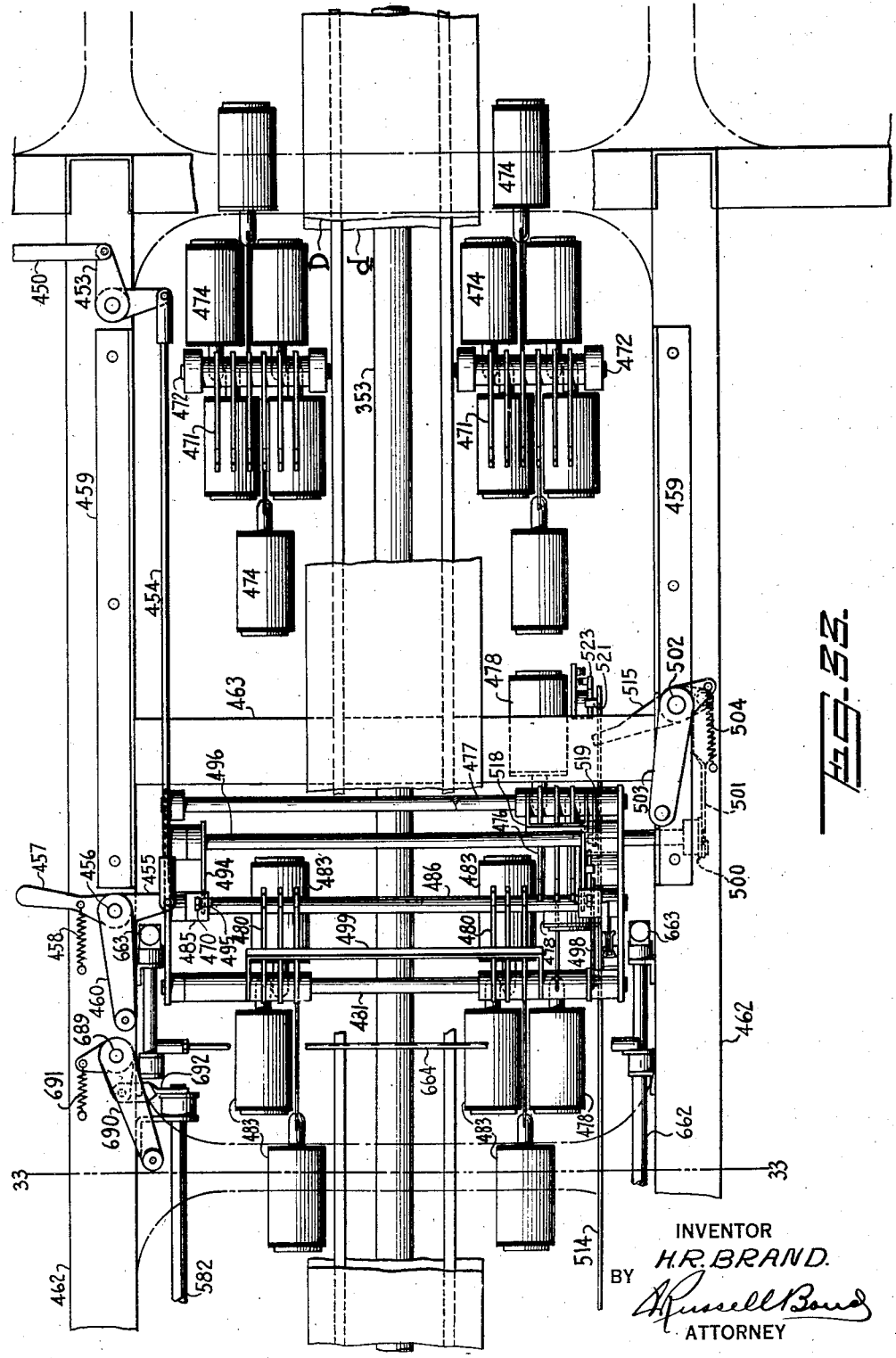

Fig. 43 is a plan view of one of the elevators in the routing station, showing, on an enlarged scale, the part below the line 38—37 and between lines 38—40 and 37—43 in Fig. 25;

Fig. 44 is a detail view of mechanism in the kitchen at "ready item" dispensers for reading the lug combinations on the forward tray rails;

Fig. 45 is a view looking from the right hand end of Fig. 44;

Fig. 45a is a detail view of mechanism at machines which prepare foods on order, for reading the lug combinations on the rear tray rails;

Fig. 46 is a view in section of the serving counter and associated mechanism, the section being taken on the line 46—46 of Fig. 2;

Fig. 47 shows a portion of Fig. 46 on an enlarged scale;

Fig. 48 is a plan view of the upper portion of the serving counter with the casing removed;

Fig. 49 is a fragmental view in section taken on the line 49—49 of Fig. 48 showing certain tray-arresting mechanism;

Fig. 50 is an end view of the same, looking from the right hand end of Fig. 49;

Fig. 51 is a view similar to Fig. 50, but showing certain parts in a different position;

Fig. 52 is a similar view showing the parts in a still different position;

Fig. 53 is a fragmental view in section taken on the line 53—53 of Fig. 47 and showing certain driving mechanism for moving the trays to and from the serving counter;

Fig. 54 is a view in section taken on the line 54—54 of Fig. 53 with certain parts broken away to disclose details of a clutch mechanism;

Fig. 55 is a view on an enlarged scale of certain clutch control mechanism shown in Fig. 55;

Figs. 56 and 57 show said clutch control mechanism in two different operating positions;

Fig. 58 is a fragmental plan view, but on enlarged scale of certain control mechanism shown in Fig. 53, certain parts being broken away and others shown in section;

Fig. 59 is a view in section taken substantially on the line 59—59 of Fig. 58;

Fig. 60 is a fragmental view taken in section on the line 60—60 of Fig. 48 and showing certain tray lifters;

Fig. 61 is a detail view of a removable tray guide rail;

Fig. 62 is a view in section taken on line 62—62 of Fig. 61;

Fig. 63 is a view similar to Fig. 61, but showing certain parts in a different position;

Fig. 64 is a skeleton plan view of certain tray control mechanism;

Fig. 65 is a view in side elevation of part of the control mechanism shown in Fig. 64;

Fig. 66 is a view in vertical section of a token at a serving space below the counter;

Fig. 67 is a side elevation of the token receiver and certain switch mechanism controlled thereby;

Fig. 68 is a fragmental plan view of the counter conveyor belt to the right (as viewed in Fig. 2) of the counter casing, showing certain control mechanism operated by the trays and means for setting the lugs on the right hand rail of the tray, to inoperative position; and Fig. 69 is a side elevation of the same, with certain portions broken away and others shown in section.

As explained above the present invention differs from that disclosed in said copending application primarily in the fact that in said former invention the vendee or customer was given no choice of foods that were to be served to him, whereas in the present invention he is allowed to make a selection. The foods are arranged in classes with a number of choices in each class, thus, for instance, one class might consist of soups, another of entrees, another of salads, another of desserts, and still another of beverages. The food is served on trays which are mechanically conveyed through a kitchen and automatically stopped at various dispensing machines in the kitchen to receive the foods ordered after which they are conveyed to a table or serving counter and delivered to selected serving spaces on the counter as predetermined by the vendor or cashier to whom the customer gives his order. The customer on paying for the order receives a token which bears the number of the seat that he is to occupy, and he receives the food after it has been prepared and placed on the tray, provided he inserts the token in a slot in front of the position assigned to him at the serving counter.

*General arrangement*

The general arrangement of the system, is illustrated somewhat diagrammatically in Figs. 1 and 2. It comprises a washroom W and kitchen K which are preferably located on a balcony or a mezzanine floor M, while a cashier's cage C and a pair of serving tables or counters S are located on the main floor. On the mezzanine floor between the washroom and the kitchen is a routing station R. An endless belt D runs through the stations W, R, and K, and is driven at one end by a motor 95 through suitable gearing 96. Hereinafter, this belt will be called the "dispensing conveyor". On the main floor immediately below the dispensing belt is another endless conveyor belt B which runs through a long casing or gallery G located between the counters S. Hereinafter, the belt B will be called the "counter conveyor". Each counter is divided into a number of seating or serving spaces O, and before each serving space there is a stool or chair H.

Fresh trays T are brought from the washroom and stacked in a suitable stack frame F in the routing station R at one side of the dispensing belt adjacent the kitchen. Thence the trays are withdrawn automatically, as needed, from the bottom of the stack and moved laterally upon the lower run d of the dispensing conveyor which carries them toward the washroom. While, a tray is on the lower run of the belt, mechanism controlled by a keyboard machine N in the cashier's cage, operates to set up various combinations of lugs on the tray. A selection is also made between trays that are to receive ready-prepared items and those that are to be delayed to allow time for foods that are to be cooked or otherwise prepared on order. The trays are then raised from the lower run d to the upper run D of the dispensing conveyor which carries them in the opposite direction through the kitchen. However, the trays which are to receive foods cooked on order are elevated more slowly than the "ready item" trays, so that the latter are routed ahead of the "unready item trays". In the kitchen are a number of cooking and dispensing machines, before certain of which a tray will stop to receive food in accordance with the set-up of lugs carried by the tray.

As the trays leave the kitchen they are lowered by an elevator L to the counter conveyor B which runs through the casing G. Each tray is arrested opposite a selected serving space O in accordance with the setting of certain of the lugs carried by the tray and is moved automatically off the counter conveyor into an antechamber, whence it is moved out on the counter, if, or when, a token has been inserted in the token slot.

After the customer has finished his meal and left the stool H, the tray is automatically returned to the counter conveyor which then carries it on to an elevator E. The latter raises the tray to the dispensing conveyor which deposits the tray upon a platform P in the washroom. The trays are picked off the platform, washed and then returned to the stack frame F.

*The keyboard controller*

The following general survey of the keyboard machine N and its operation is given at this time in order to disclose broadly the nature and purpose of the various mechanisms which will be described in detail hereinafter. The keyboard machine is provided with a key for each food that is to be served. These keys will hereinafter be referred to as "commodity keys". Since, as explained above the foods are arranged in classes, the keys are arranged in corresponding groups or rows. The keyboard machine also has a key for each seat at the serving counters and these will hereinafter be called the "seat keys".

The customer gives his order to the cashier, naming the various foods which he wishes and as each food is named the cashier depresses a commodity key corresponding to said food. The customer is entitled to only one food in each class. If he should change his mind after choosing one food he may make another choice and the cashier then needs merely to depress a corresponding commodity key in that class, whereupon the commodity key previously depressed will spring up to normal position. If a customer, after making a choice, wishes to eliminate one class entirely, the cashier operates a reset key which returns all the commodity keys and then may set up a new order. When the commodity keys are depressed they remain in depressed position until the entire order is transmitted to the routing station and the kitchen, except, as explained above, when a change in the order is made. As each key is depressed the price of the food represented thereby is added up on a register visible to the customer and to the cashier, so that each will know how much is to be paid for the order. After the order has been completed, the customer pays for the order and the cashier thereupon touches one of the seat keys.

The touching of a seat key effects the following operations: It issues a token to a customer bearing the number of the seat at which his order is to be delivered; it sets up various combinations of commodity lugs on a tray in the routing station, corresponding to the commodity keys depressed, and also sets up a combination of seat lugs corresponding to the particular seat key depressed, thereby determining at what points in the kitchen the tray is to be delivered; if any one of the items of food are to be cooked or otherwise prepared on order, it transmits actuating impulses to corresponding cooking and preparing machines in the kitchen, thereby initiating the preparation of the food so that by the time the tray reaches these machines the food will be ready to be delivered to the tray; it starts the tray on its way and initiates the withdrawal of another tray from the stack, so that the latter tray will move to the set-up position; it releases all the commodity keys and returns the register to zero so that the machine is cleared for the next order; it charges the amount of the sale against the cashier, thereby making it incumbent upon the cashier to obtain the money for the order before depressing the seat key; it registers in an accumulator adjacent to each commodity key the total number of each commodity sold; and it registers the total number of sales to guests. The seat key remains depressed so that the cashier cannot, by mistake, assign the same seat to another customer and, after the customer has left his seat, the seat key is automatically returned to normal position.

*Details of the keyboard machine*

As shown particularly in Fig. 5, the keyboard machine has a bed plate 100 on which the mechanism of the machine is supported. Over the mechanism is fitted a casing 101. The latter is formed with a sloping upper wall or key panel 102, through which project the stems of the commodity keys 103 and seat keys 104 (see Figs. 3 and 4). At the rear of the machine, the casing is vertically extended to form a chamber 105 in which a register and certain mechanism for operating the same are housed. The front wall of this chamber has an opening 106 for a purpose which will be explained hereinafter.

In the particular embodiment illustrated the commodity keys 103 are arranged in an upper and lower bank, with three rows in the lower bank and two in the upper bank (see Fig. 3), the rows running from front to rear of the bank and there being six keys in each row. Each key corresponds to a particular commodity or food and each row is used for a particular class of commodity, i. e., one row may be used for soups, another for entrees, etc.

*Commodity key mechanism.*—The stems 107 of the commodity keys 103 pass through slots in the panel 102 and are thereby guided near their upper ends. The stems 107 are also guided in slots formed in the top and bottom flanges of channel beams 108, there being a channel beam for each row of keys (see Figs. 6 and 7). The channel beams for the lower banks of keys are supported on the bed plate 100, while the channel beams for the upper bank are supported on reduced extensions of the lower channel beams.

As best shown in Fig. 6 each key stem 107 has a widened portion 109 which plays between the top and bottom flanges of the channel beam and in this widened part there is a rectangular slot 110, through which passes a set of cam strips 112. There are three cam strips in each set which pass through all the key stems of the row of keys. Headed studs 113 screwed into the channel beams pass through slots in the cam strips, supporting the latter and permitting limited sliding movement thereof. Each cam strip is formed on its edge with teeth 114. Each tooth has a vertical forward edge and a sloping rearward edge adapted to be engaged by the correspondingly beveled upper margin 115 of the slot 110, whereby, when a key is depressed the margin 115 by bearing against the inclined edge of a tooth 114, will slide the tooth and the cam strip 112 of which it is a part, forward, or to the left as viewed in Fig. 5. Each cam strip 112 is urged rearward by a spring 116 so that when the key is released the strip will return to normal position. Each strip 112 carries a switch blade 117 suitably insulated therefrom which, when the plate is moved forward slides, between contact fingers 118 (Fig. 6), thereby closing a gap in an electric circuit (Fig. 36) which will be described hereinafter. By proper selection of the position of the teeth, as shown in Fig. 18, each key when depressed will advance a different cam strip or combination of strips. Each cam strip has a tooth 114 at its forward end which also engages a stop mechanism to be explained hereinafter. Obviously, there are seven possible combinations of the three cam strips, but only six are used in the machine illustrated.

When a commodity key is depressed it is held in depressed position, because the depression of the key is merely a selective act. An order is not transmitted to the routing station and kitchen, until a seat key is depressed. As stated above, only one commodity of a class may be ordered at a time. A customer may change his mind after selecting one commodity and choose another, hence means are provided whereby the operator may effect the desired change by merely depressing another key in the same row. When so doing, the previously depressed key will be released and will spring up to normal position, so that any number of changes may be made in the selection of commodities before the order is finally put through. As shown in Fig. 6, each key is normally held in raised position by a tension spring 119, while a lug 120 on the key stem bears against the under face of the upper flange of the channel beam. Immediately below the lug, the edge of the stem is formed with a recess 121. A latch plate 122 is hinged to the upper flange of each channel beam. The lower depending edge of the latch plate is bent inward and bears against the recessed edges of all the key stems of the row. The springs 119 are bent around the latch plate pressing the latter normally into the recesses 121. When a key is depressed, the latch plate rides over the lug 120 and by engaging the top of the lug, holds the key stem in depressed position, as shown at the left hand side of Fig. 6. It will be obvious that when a key is depressed and the latch plate 122 rides over the lug 120 of said key, it will be swung clear of the lug of any previously depressed key of the row, permitting the latter key to rise.

The mechanism just described will prevent more than one key from remaining depressed upon successive key depressions. There remains, however, the contingency that the operator might try to depress the two keys simultaneously. Therefore, I provide means for preventing simultaneous depression of two or more keys in the same row. Mounted on the web or vertical wall of each channel beam is a train of cam blocks 123 (Figs. 5 and 6). Each block has a pin and slot connection with the channel beam so that it is capable of moving endwise. At the rear end of each train of cam blocks there is a fixed cam block or stop 124. A shaft 125 is disposed transversely before the forward end of the trains of cam blocks of the lower bank of keys and a corresponding shaft 126 is disposed in front of the trains of cam blocks of the upper bank. Each shaft bears cams 127 (as best shown in Fig. 9) which serve respectively as stops for the front end of the cam trains. When the cams are in the normal position illustrated the space between the front and rear stops is equal to the length of the cam train plus a clearance equal to the thickness of one key stem 107. When the cams are turned, as will be described hereinafter this clearance is taken up. The commodity key stem is provided at one edge of the widened portion 109 with a lug 128 which, when the key is depressed, is adapted to pass between an adjacent pair of cam blocks 123 or between an end block and the stop 124 or the cam stop 127. To facilitate entrance of the lug 128 between the cam blocks, the corners of the latter are chamfered and the lugs 128 also are beveled at the top and bottom. When one lug 128 is passing between the cam blocks it will take up all the clearance in the cam train leaving no room for another lug 128 to pass through train. Hence, two commodity keys cannot be depressed simultaneously.

When a commodity key is depressed sufficiently to be held in depressed position by a latch plate 122, the lug 128 will have passed through and clear of the train of cam blocks, as shown at the left in Fig. 6 and another key may then be depressed. Just as the lug 128 of the latter key clears the cam train, the lug 120 of said key will swing the latch plate 122 outward, releasing the previously depressed key which will then be restored to normal raised position by its spring 119. Thus, two keys cannot be depressed simultaneously and while they may be depressed successively only the key last depressed will remain latched in depressed position.

*Price registering mechanism.*—The depression of any commodity key is arranged to register on a dial, the price of the commodity represented by that key. All the commodities represented in any row of keys are of the same price, and hence one dial operating mechanism will suffice for each row of keys. To this end, there is a link 129 for each row of commodity keys in the lower bank, which link carries a transverse stud 130 at its forward end and this stud passes through slots 131 formed respectively in the cam strips 112 of the row. Thus, the advance of any cam strip in the row will pull the link 129 of that row (see Figs. 5 and 6). Each link is supported near its forward end by a stud 132 (see also Fig. 7) projecting from the web of an adjacent channel beam 108, but the link is slotted at its point of connection with the stud to permit of limited longitudinal movement. The rear end of each link 129 is pivotally connected to one arm of a lever 133 the other arm of which is formed with a tooth sector 134. A spring 135 serves to hold the link 129 normally in the retracted position shown in Fig. 5. Similarly each group of cam strips in the upper bank has pin and slot connection with a link 136 which is held in retracted position with a spring 137. Each link 136 is pivotally connected to one arm of a lever 138, the other arm of which carries a toothed sector 139.

It will be understood that there are three sectors 134, one for each row of commodity keys in the lower bank, and two sectors 139, one for each row of commodity keys of the upper bank. Each of the toothed sectors meshes with a mutilated pinion 140 (see Figs. 5, 7, 13, 14 and 15). This pinion turns freely on a shaft 141 which is journaled in uprights 142 and 143 rising from the bed plate 100 in the chamber 105. Fixed to the shaft 141 are five ratchet wheels 144, one adjacent each pinion 140. Mounted on each pinion is a spring pressed pawl 145 adapted to engage the teeth of the ratchet wheel. Also mounted on the shaft 141 is a register dial or drum 146 with two rows of numbers inscribed or marked on the cylindrical surface thereof, one row being inverted with respect to the other. In the front wall of the chamber 105 there is a window (see Fig. 3) through which the numbers of one row may be seen, one at a time, by the cashier and an offset window on the rear wall of the chamber 105 displays to the customer, corresponding numbers in the other row. The numbers are shown one at a time, and run consecutively by fives, from zero to one hundred, so that any amount may be registered from five cents to $1.00. Items on the bill-of-fare may vary in price from, say, five cents to twenty-five cents in five cent increases. In such case the maximum range of angular movement that can be imparted to the drum by a full key stroke will be five number spaces, representing 25 cents. However, to provide for the lower food prices, I employ means to prevent operation of the ratchet wheel during part of the key stroke.

Each ratchet wheel has a tooth for each number space on the drum and, for each key operation, the pawl 145 actuated thereby is swung through an arc of six tooth spaces. However, a shield 147 is provided for each ratchet wheel 144, to fix the point at which the pawl 145 may engage the teeth of the ratchet wheel. Figs. 14 and 15 show the positions of the shield for a full stroke and for a part stroke, respectively. In the setting shown in Fig. 14 the pawl will clear the shield and engage the first exposed tooth of the ratchet wheel soon after beginning of its stroke. Hence, in making a complete stroke, from full to broken line position, it will turn the shaft through an angle of five tooth spaces, registering twenty-five cents on the drum 146. In the setting shown in Fig. 15 the pawl will not clear the shield until it has passed over two ratchet teeth and hence it will advance the ratchet through a space of three teeth, registering only fifteen cents on the drum.

Each shield 147 is in the form of an arcuate flange on a sector shape plate 148 freely pivoted on the hub of the ratchet wheel 144. The periphery of each plate 148 projects through a slot in a partition wall 149 (see also Fig. 3) located back of the opening 106 and supported by the uprights 142 and 143. Access may be had to the projecting sector plates 148 through the opening 106 so that the shields 147 may be turned to change the number of ratchet teeth exposed and thereby alter the price setting for any row of commodity keys. The shield is held in set position by a dog 150 which engages notches formed in an arcuate flange 151 projecting from the face of the sector plate 148. The notches have the same annular spacing as the teeth of the ratchet wheel 144. Each dog is pivotally mounted on the partition wall 149 and has an arm 152 engaged by a spring 153 which urges the dog into engagement with the flange 151. To lock the dogs at any desired setting, I provide a locking rod 154 common to all of the dogs and extending from side to side of the casing 101, with one end of the rod projecting into a key barrel 155 (Figs. 3, 5 and 7) in one of the side walls of the casing. Each arm 152 carries a pin 156 which bears against the rod 154, the opposite sides of the locking rod being flattened. When the rod is in the position shown in Figs. 14 and 15, it will lock the dogs, but when the rod is turned through an angle of 90 degrees, each dog will be free to move by reason of the clearance between its pin 156 and the flattened part of the rod 154, so that the dog may ratchet out of the notches and permit the shield to be adjusted. However, the rod 154 cannot be turned unless it is unlocked by means of a key inserted in the key barrel 155, so that an unauthorized person will be prevented from changing the price settings of the machine.

It will be clear that as the different commodity keys are depressed, the shaft 141 will be turned, rotating the indicator drum 146 and showing through the windows in the casing to the cashier and the customer respectively, to total price of the food ordered by the customer. Depression of more than one key in a group will not affect the reading on the drum after the first key of the group is depressed, because the link 129 or 136, as the case may be, will be held in advanced position until the order has been put through, as will be explained hereinafter. However, if a customer changes his mind and wishes to omit a class of food entirely the cashier pushes a clearance key 157 which restores all parts to normal and returns the drum to zero, after which a new order may be set up in the machine.

*Manual clearance mechanism.*—As shown in Figs. 10, 16 and 17, the key 157 is detachably secured to a plate 158 which slides in ways 159 in the frame member 143. The key 157 is detachable to permit of removing the casing 101 when it is so desired. The plate 158 has a pin 160 which projects into slot 161 in the upright 143. On the opposite face of the upright are ways 162 in which a block 163 (see also Fig. 13) is adapted to slide, and the latter has a pin 164 which also projects into the slot 161, but on the rearward side (to the right, as viewed in Fig. 10) of the pin 160. A spring 165 urges the block forward (to the left as viewed in Fig. 10) and, because of engagement of the pin 164 with the pin 160, the key 157 is also normally urged forward or outward. However, the block 163 may be moved rearward and inward without disturbing the key 157 when the key is in its normal outward position.

The block 163 is provided along its lower edge with teeth 166 which mesh with a pinion 167 mounted to turn freely on the shaft 141. The pinion carries an arm 168 and the indicator drum 146 carries a pin 169 which projects across the path of the arm 168. As viewed in Fig. 16, the pin 169 advances counterclockwise as the drum is operated by the commodity keys. The key 157 is normally in the outward position shown in Fig. 5, and when it is pushed inward, the pinion 167 is rotated by engagement when the rack teeth 166 and the arm 168 is swung from the position shown in Fig. 16 to that shown in Fig. 17. In its sweep the arm engages the pin 169 and turns the drum back to zero position. Incidentally, the arm 168 also prevents rotation of the drum past the 100 mark. The drum 146 is not fixed on the shaft 141, but is driven by a star wheel 170 fixed on the shaft, and engaged by a spring-pressed pawl 171. The latter is mounted to slide radially on a side face of the drum, thereby permitting the drum to be turned by the clearance key before the pawls 145 let go of the ratchet wheels 144.

Means are provided to insure a full stroke of the clearance key 157 in either direction. The plate 158 is formed with teeth on its upper edge adapted to be engaged by one tooth or the other of a double toothed dog 172 pivoted on the frame member 143. This dog is formed with a tail piece 173 which lies in the path of two pins 174 and 175, disposed respectively near opposite ends of the plate 158. The dog also has an oppositely extending projection 176 formed with two end faces disposed at an angle to each other, and a spring finger 177 is adapted to engage one or the other of said faces. When the key 157 is restored to the end of its outward stroke, the pin 175 strikes the tail piece and turns the dog to the position shown in Fig. 16. In this position, the dog is held by the spring finger 177 engaging the forward face of the projection 176. The dog will then ratchet over the teeth of plate 158 when the latter is pushed inward, but will resist motion in the opposite direction. When the key is pushed in to the limit of its inward stroke, the pin 174 swings the dog to the position shown in Fig. 17 bringing the other tooth of the dog into mesh with the teeth on the plate 158, and in this position, the dog will be held by the finger 177 which now engages the opposite face of the projection 176.

Means for releasing the commodity keys when the clearance key is operated will now be described. Pivoted on the frame member 143 is a depending arm 180 which carries a roller lying in the path of the block 163. When the parts are in the position shown in Fig. 16, the arm 180 is in depressed position and bears against the end of the block 163 (see also Fig. 13) and as the latter is moved rearward, the arm 180 is lifted and rides on the upper surface of the block as shown in Fig. 17. Fixed to turn with the arm 180 is a longer depending arm 181 and a tension spring 182 tends to return the arms to the normal position shown in Fig. 16. A link 183 (see Figs. 5 and 18) connects the lower end of arm 181 to a crank arm 184 fixed on the shaft 126. The shaft 126 also has a crank arm 185 fixed thereon which is connected by a link 186 to a crank 187 on the shaft 125, so that the two shafts turn together. Above the shaft 126 there is another shaft 188 (see Figs. 11, 12 and 19) on which two bell cranks are journaled. One arm 189 of each bell crank engages a notch 190 in a latch plate 122 of the upper bank of commodity keys, while the other arm 191 engages the cams 127 which are fixed to the shaft 126. When the shaft 126 is turned by a pull on the link 183, the arm 189 is swung forward. The forward edge of the notch 190 is beveled, as shown in Fig. 12, so that as the arm 189 swings forward the latch plate is swung outward releasing any commodity keys that it may have been holding down. Similar means, as shown in Figs. 8 and 9, are controlled by the cams 127 on shaft 125 to release the latch plates of the lower bank of commodity keys.

The commodity keys are not entirely restored until the clearance key 157 is returned to its normal position or until power clearance means, to be presently described, has completed its cycle. When, by engagement of the roller on the arm 180 with the end of the block 163, the latch plates 122 are moved clear of the key stem lugs 120 (Fig. 6), the cam blocks 123 are already locked by the cams 127. However, there is sufficient clearance between the lug 128 and the cam blocks 123 permitting the key stems 107 enough upward movement to prevent relatching of the plates 122 with the lugs 120. Thereafter, when the clearing mechanism has been restored, the cams 127 again unlock the cam blocks 123 and the lugs 128 of the key stems 107 will pass through the cam blocks and permit the keys 103 to return to their normal position under impulse of the spring 119. Thus, while the clearing mechanism is in operation, no commodity keys will be returned nor is it possible for the operator to depress other commodity keys due to the locking effect of the cam blocks 123.

The inward stroke of the clearance key 157, by means of the arm 168 and the pin 169 (Fig. 17), restores the price registering drum 146 to zero but as the toothed sectors 134 and 139 have not as yet been returned, as shown in dot and dash lines in Figs. 14 and 15, the engagement of the pawls 145 with the ratchet wheels 144 prevents the star wheel 170 from turning and, hence, while the drum is being restored, the spring pressed pawl 171 ratchets over the teeth of the star wheel. Thereafter, when the toothed sectors 134 and 139 are returned by the commodity keys rising to their normal position, the pawls 145 will ride over the teeth of the ratchet wheels 144 but, in so doing, will not disturb the setting of the drum 146 from its normal zero position. As previously explained, the clearance key 157 due to the full stroke device, must be moved to the extreme limit of its inward position before it can be returned to its normal position by the spring 165 (Fig. 10) and during this movement, as will be hereinafter described, the seat keys 104, like the commodity keys 103, will be locked against depression.

*Seat key mechanism.*—The seat key mechanism is shown particularly in Figs. 4 and 8. The stem 196 of each seat key 104 is formed with ratchet teeth 197 in the rear face thereof adapted to be engaged by a pawl 198. The latter is in the form of a pin carried by a plunger 199 of a solenoid 200 which is in an electrical circuit (Fig. 36) to be hereinafter described. A spring 201 normally forces the plunger outward. The teeth 197 are set at such an angle that the pawl will ratchet over them as the key is depressed, but will hold the key in depressed position until the solenoid is energized to withdraw a pawl, permitting the key to rise to normal position under the pull of a spring 196a.

Each key stem 196 has pin and slot connection with a stem plate 202 which slides vertically in slots in the flanges of channel beams 203, as best shown in Fig. 8. There is a channel beam for each row of seat keys running from front to rear of the machine, and, like channel beams 108, they are disposed with their opposite flanges extending horizontally and the connecting web disposed vertically. The solenoids 200 are secured to the underside of the top flange of each channel beam and contact terminals for the solenoids are mounted in insulation blocks 204 which project through opening in said flange.

On the plate 202 is a pawl 205 which normally engages a shoulder formed on the stem 196. A spring 206 connected at one end to the channel beam and at the other to the pawl, tends to draw the plate upward with respect to the stem, but is normally prevented from doing so by engagement of the pawl with said shoulder.

The plane of each stem plate 202 is transverse to the longitudinal axis of the channel beam 203 and in each plate there is a rectangular opening 207. Passing through the alined openings 207 of each row of stem plates is a group of cam strips 208 similar to the cam strips 112 controlled by the commodity keys. Each cam strip 208 is slotted to receive a number of supporting screws 209 which are screwed into the vertical web of the channel beam. The cam strips are thus permitted a certain amount of movement longitudinally. Each cam strip is formed on its upper edge with one or more teeth 210 defined by inclined edges on the rearward side (the right hand side, as viewed in Fig. 4) and the upper edge of each opening 207 is correspondingly beveled on its forward side, so that when a key is depressed any tooth engaged by said beveled edge will be wedged to the left (as viewed in Fig. 4), thereby advancing the cam strip of which it is a part.

In the particular embodiment illustrated there are ten seat keys 104 in each row and there are four cam strips 208 passing through the stem plates 202 of the three keys shown on the extreme right of Fig. 8 and five cam strips 208 passing through the other two stem plates. The teeth 210 are disposed in various combinations so that each key will advance a different cam strip or combination of such strips. Each cam strip 208 is formed with a slot 211 at the rear to engage transverse rods 212 which are supported in crank arms 213 fixed to shafts 214 journaled in brackets 215 and 216 (see also Fig. 7). The cam strips and the slots are of different length, as clearly shown in Figs. 3 and 4, so that when a cam strip is drawn forward, only one shaft 214 will be turned. The bracket 216 supports a plate 217 of insulation which bears a number of electric contact members 218 arranged in pairs and adapted to be bridged by contact blades 219 carried by but insulated from switch arms 200 fixed respectively on the shafts 214. Normally the switches are in open position, but whenever a seat key is depressed one or a combination of switches will be closed forming circuits (see Fig. 36) for sending electrical impulses to apparatus which will be described hereinafter.

As shown in the drawings there are six pairs of these contact members and six switch shafts 214 controlling them. This is more than ample to provide for the fifty combinations of switches requisite for the fifty seat keys shown in the keyboard. It will be understood that each rod 212 may be engaged and operated by more than one cam strip, and by reason of the various combinations of teeth 210 provided on the different cam strips, each key depressed will close its own individual characteristic combination of switches.

In addition to the four or five switch operating cam strips 208 in each row, there is an extra cam strip 221 which also passes through each row of key plates 202, but which differs from the other strips in having a tooth 222 for each key plate. Hence, any key in any row when depressed will advance the cam strip 221. However, the teeth 222 are shorter than the teeth 210 and consequently the strip 221 is not advanced until the other cam strip or strips of the row have been advanced. The strips 221 have enlarged holes at the rear end to receive a transverse rod 223 carried by crank arms fixed to a shaft 224, so that whenever any key is operated the latter shaft will be turned. It will be understood that all of the slots 211 are long enough to clear the rod 223. The shaft 224 also carries a depending crank arm 225 (see also Fig. 7) which has a pin and fork connection to an arm 226 fixed on a shaft 227. Thus, whenever a seat key is depressed the shaft 227 is turned, operating certain clutch mechanism which will now be described.

*Clutch mechanism.*—As shown in Figs. 5 and 7 an electric motor 228 (see also Fig. 36) is secured to the underside of the bed plate 100. This motor, through suitable step down gearing 228a, drives a shaft 229. Mounted on this shaft is a hollow cam shaft 230, see also Figs. 4 and 20. Near one end, the bore of the cam shaft is enlarged to receive a toothed clutch wheel 231 fixed to the drive shaft 229. A clutch pin 232 passes through an opening in the enlarged portion of the cam shaft and is adapted to engage the clutch wheel, but is normally held out of engagement therewith by a latch arm 233, fixed to shaft 227 and engaging a clutch lever 234 which controls the pin 232. When the shaft 227 is turned by the pull of a cam plate 221, the latch 233 releases the clutch lever and the pin 232, under pull of a spring, connects the hollow cam shaft 230 to power by engaging with the constantly moving toothed clutch wheel 231. On the cam shaft is a cam 235 which engages an arm 236 fixed on the shaft 227. When the cam 235 has made somewhat more than half a rotation, it swings the arm 236 upward, turning the shaft 227 momentarily in a counter-clockwise direction, as viewed in Fig. 4, which causes the rod 223 to force all of the cam strips 221 forward or to the left. (The purpose of this movement will be explained hereinafter). Immediately thereafter the arm 236 clears the swell of the cam 235 and the shaft 227 returns to normal position under pull of a spring acting on the arm 226 and the latch 233 lies in position to seize the clutch lever 234 and withdraw the clutch pin as soon as the clutch shaft has completed a full rotation.

On the cam shaft 230 is another cam 238 engaged by a lever 239. This lever is pressed against the cam by a powerful spring 240 (Fig. 5). The shape of the cam is such that the lever engages and slides down a sharply inclined shoulder 238a on the edge of the cam just as the latch 233 is about to engage the cam lever 234, which momentarily advances the hollow cam shaft with respect to the drive shaft and facilitates withdrawal of the clutch pin.

Fixed to move with the lever 239 is an arm which has a switch blade 241 fixed thereto but insulated therefrom. As soon as the cam 238 starts turning, the switch blade is swung rearward bridging a pair of electric contact members 242 supported on a plate of insulation 243 (see also Fig. 36). As will be explained more fully hereinafter, closing of this switch serves to send out from the machine, the order and seating set up on the keyboard.

The purpose of moving the cam strips 221 forward by power, as described above, is to disconnect the key plate 202 from the key stems 196, thereby permitting return to normal of any cam strips 208 that may have been advanced, but without restoring the depressed seat keys 104. Referring to Fig. 4, it will be observed that to the rear (i. e. the right) of each tooth 222 there is a recess 245 terminating at its rear end in an upwardly sloping wall. Referring now to Fig. 8, it will be seen that each pawl 205 is formed with a toe 246 which overlies the cam plate 221 and normally projects below the upper edge of the slot 207. In the drawings, the second seat key from the left is shown as fully depressed with the toe 246 in the recess 245 of a cam plate 221. When the cam strip 221 is moved forward by action of cam 235, the sloping end wall of the recess strikes the toe 246 moving the pawl 205 out from under the shoulder on the key stem 196, permitting the spring 206 to draw the key plate 202 upward, while the key stem 196 is held in depressed position by engagement of pin 198 with the teeth 197. The parts then assume the position shown at the left in Fig. 8.

*Token ejecting mechanism.*—As shown in Figs. 4 and 8 the lower end of each key plate extends into a slot in the bed plate 100 through which the plate is projected when the key is depressed, striking one arm of a bell crank lever 250. Pivoted to the lower end of the lever is an ejector finger 251 which is adapted to pass through a slot in a token reservoir 252, so that when the key is depressed, a token 253 will be ejected by this finger from the reservoir. Each reservoir contains tokens characteristic of the seat key with which the reservoir is connected, with a number or other symbol on the token which will indicate to the customer which seat he is to occupy. When a token is ejected it drops upon a chute 254 and slides down to an opening 255 on the customer's side of the machine. Normally each ejector finger 251 and its lever 250 are held in retracted position by a spring 256, but when a seat key is depressed the corresponding lever 250 is struck by the end of the key strip 202 and operates to eject the lowermost one of a stack of tokens in the reservoir. The tokens in the reservoir are pressed down by a weighted follower 257 which consists of a block of metal too thick to pass out of the slot through which the tokens are ejected. Consequently, when the tokens are exhausted the finger 251 will strike the follower block and will be prevented thereby from entering the token receiver. This blocks the lever 250 against turning, and since the key plate 202 strikes the lever 250 before it engages the teeth of the cam strip 221, the cam strip is not advanced when the lever is blocked by the follower 257 and the clutch is not actuated. Consequently, the machine will not operate to place the order set up on the keyboard unless there is a token in the reservoir for the particular seat assigned, which can be issued to the customer.

When the operator finds that the machine will not operate by reason of exhaustion of a particular token reservoir, another seat key is operated and an attendant is notified to replenish the tokens in the exhausted reservoir. As shown in Fig. 8, there is a door 259 in one side of the casing which is normally locked shut, but which can be unlocked and opened by an authorized person to permit access to the token reservoirs. The reservoirs are arranged in batteries of five cells each, running across the width of the keyboard and each battery slides in suitable ways formed in the under side of the bed plate 100. Thus, whenever a token receiver is reported exhausted, an authorized attendant withdraws an entire battery of token reservoir and recharges the empty or partially emptied cells with new tokens, or else substitutes a new battery to replace the one which is partly exhausted.

*Interlocking seat key controls.*—Means are provided to prevent the depression of more than one seat key at a time. Each stem plate 202 has a lug 260 (Fig. 8) at one side adapted to pass through a joint in a train of cam blocks 261 (see also Fig. 4). The latter are similar to the cam blocks 123 controlling the commodity keys. There is a train of cam blocks 261 mounted on each channel beam 203. The blocks are individually mounted on the vertical web of the channel beam with a limited amount of longitudinal play. At the rear end of the cam train there is a fixed stop 262, while at the forward end there is a block 263 which is mounted to slide a distance equal to the thickness of one of the lugs 260, but is normally held in retracted position by a spring 264, taking up all slack or play in the train of cam blocks. The upper corners of each cam block 261 are chamfered to facilitate entry of lugs between adjacent blocks, and for the same purpose the adjacent upper corners of the stop 262 and spring-pressed block 263 are also chamfered. Whenever a key is depressed and its lug 260 is forced between the cam blocks, it crowds the spring-pressed block 263 outward as far as it will go, and by thus taking up all the extension allowed for in the train, prevents the depression of any other key of the row.

The end block 263 of each train has a forwardly projecting lugs 265 adapted to enter between abutting cam blocks 266 of another train which runs transversely across the front of the machine, as shown in Fig. 3. The latter train or cam blocks is mounted on a transverse rail 267, so that each block has individual end play and there is just enough slack in the entire train to admit a single lug 265. Hence when one seat key is depressed, not only are all the rest of the keys of that row locked against depression, but also all the keys of every other row as well until the order has been put through and the machine has been cleared for the next order.

Referring now to Figs. 5, 6, 9 and 18 it will be observed that there is a bail 270 fixed on a shaft 271 in front of the cam strips 112 of the lower bank of commodity keys, and there is a smaller bail 272 fixed on a shaft 273 in front of the cam strips 112 of the upper bank of commodity keys. These bails are connected by a link 274. On the shaft 271 is freely pivoted a lever 275 which has a pin 276 normally held in engagement with the rear edge of an arm 270a of the bail 270 by a tension spring 277 (Fig. 9) connecting said pin to the arm 270a. The lever 275 has a depending finger 278 which, in normal position, is swung across the right hand end of the train of cam blocks 266, taking up all slack in this train of blocks. Thus, normally, none of the seat keys can be depressed. As explained above, each of the commodity cam strips 112 has a tooth at its forward end in position to strike the bail 270 or 272, as the case may be. Hence, whenever a commodity key is depressed whether in the upper or the lower bank, the bail 270 will be swung forward and by reason of the spring 277, the finger 278 will be drawn out of engagement with the train of cam blocks 266, unlocking said train. Thus, the seat keys are all normally locked, but as soon as any one of the commodity keys is depressed a seat key may be depressed. Accordingly, the cashier cannot issue a token unless an order has been set up in the machine.

Pivoted on the shaft 271 and positioned to engage the pin 276 of the lever 275 is an arm 279 (see also Fig. 8) which is connected by a resiliently extensible link 280 to the arm 184. It will be recalled that the latter arm is pulled whenever the block 163 is moved to return the indicator drum to zero position. Thus, while the indicator is being cleared the finger 278 will be held in locking position preventing the depression of a seat key.

Figure 36:
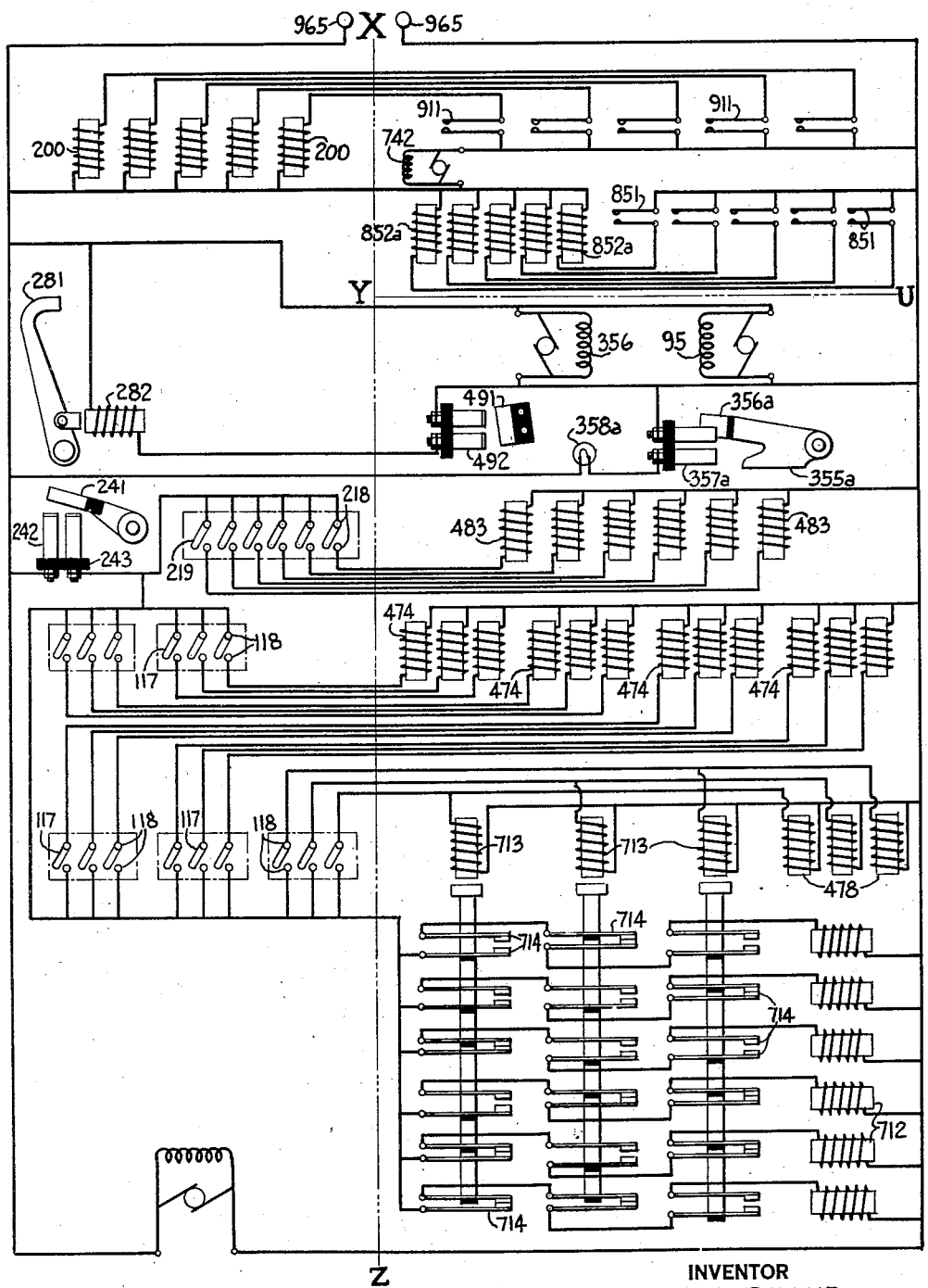
Fig. 36 is a diagram of electrical connections.

As shown in Figs. 8 and 9 there is a lever 281 at the forward end of the machine which is operated by a solenoid 282 (see also Fig. 36). The lever is held in retracted position by a spring 283, but when the solenoid is energized the lever is swung against the pin 276, holding the finger 278 in locking position with respect to the cam train 266 and preventing any seat key from being depressed even if there may be commodity keys depressed. The purpose of this is to prevent sending out orders from the machine faster than trays can be fed to set-up position, as will be explained more fully hereinafter. However, while the seat keys are locked by the solenoid 282 the commodity keys can be depressed to set up various combinations preparatory to sending out the next order.

*Power clearance mechanism.*—As shown in Fig. 20, there is a cam 285 fixed on the hollow cam shaft 230. This cam is engaged by a roller on the lower end of a lever 286 pivoted on the frame member 143 (see Figs. 5 and 7). The upper end of the lever 286 (see also Fig. 13) is formed with a toothed sector 287. The latter engages the pinion 167 and the lever 286 performs the same function as does the key 157 except that instead of being manually operated it is power driven whenever the clutch is thrown in by depression of a seat key. The cam 285 operates during the latter half of its rotation to swing the lever 286 and turn the pinion 167 clockwise, restoring the indicator drum 146 to zero position and then, just before the cam completes a full rotation, a spring 288 returns the lever and the pinion 167 to their original positions. It will be noted, as shown in Fig. 10, that owing to the relationship between the pin 160 on the clearance key plate 158 and the pin 164 on the block 163, no movement of the clearance key 157 results when the block is operated during the power clearance of the machine.

Means are provided for transferring the reading of the indicator to an accumulator 290 when the drum is restored by power but no such reading is taken when the drum is restored manually, because the key 157 is used for the purpose of correcting the setting of the keyboard and not for transmitting the order from the keyboard. The accumulator 290 is mounted on one end of an arm 291 (see Figs. 3, 4, 5, 7 and 13). This arm is fixed upon a shaft 292 which is journaled in the frame member 143. Also fixed upon the shaft 292 is a depending arm 293 bearing a roller that engages a cam 294 (see also Fig. 20) fixed on the cam shaft 230. Also fixed on shaft 292 is an arm 295 (Fig. 5) which projects rearwardly and is urged downwardly by a spring 296, thereby holding the arm 293 in engagement with the cam. The accumulator is normally held in the position shown in Fig. 5 with the dial of the accumulator showing through a window 297 (Fig. 3) in the front wall of the chamber 105. The price indicator drum 146 has fixed thereto a gear 298 (see Figs. 3 and 4). As soon as the cam 294 begins to turn, and before the sector 287 operates to restore the indicator drum, the accumulator is swung rearward until the gear 298 meshes with a pinion 299 fixed to the accumulator shaft and the meshing engagement is maintained while the sector 287 returns the drum to zero. Thus, the reading on the drum is transferred to the accumulator, and the latter is then returned by the cam 294 to the window 297. The throw of the accumulator to meshing position is limited by a screw 300 in the free end of the arm 295 which is adapted to engage a lug 301 formed on the frame member 143. The screw 300 may be adjusted to stop the lever 291, when the pinion 298 is in proper mesh with the gear 299.

Means are provided for registering the total number of orders sent out from the machine. Fixed under the keyboard panel 102 there is a counter 303 (Figs. 3, 4, 5 and 7) which is operatively connected by a link 304 to the arm 291, so that each actuation of said arm is registered on the counter. The counter may be read through an opening in the face of the panel. Thus, the registration on the counter represents the number of orders that have been placed and this registration is made only when the indicator drum is restored to zero by power.

In addition to the registration just described there is a separate registration of the number of sales of each commodity. In front of each commodity key 103 there is a counter 305 (Fig. 5) which shows through a window in the panel 102. Each counter 305 has an operating arm 306 which is adapted to be engaged by a lug 307 on the key stem 107 (see also Figs. 3 and 6). When a commodity key is depressed the arm 306 is turned sufficiently to bring a pin 308 on the arm into a notch 309 in a bar 310. There are three of these bars extending from front to rear of the keyboard and they are mounted, with limited freedom of movement lengthwise, on brackets 311 rising from the channel beams 108. Each bar is connected to an arm 312 (Figs. 3 and 5) and the arms 312 are fixed upon a shaft 313. A depending arm 314, also fixed on the shaft 313, is connected by a link 315 to one arm 316 of a lever. The other arm 317 of said lever carries a roller which is pressed into engagement with a cam 318 by a spring 317a acting on the arm 316. The cam 318 is fixed on the cam shaft 230 (see also Fig. 20).

When a commodity key is depressed it does not turn the counter arm 306 sufficiently to make a registration. Hence, if the commodity key is released by operating the clearance key 157 or by depressing another commodity key in the same row, a spring 319 will restore the arm 306 without disturbing the reading of the counter. However, when the order is actually sent out from the machine by throwing in the clutch of the cam shaft, the cam 318 moves all the bars 310 forward and any pin 308 that happens at the time to project into a notch 309 will be engaged by the bar and the counter lever 306 bearing the pin will be swung by the bar sufficiently to register the sale on its counter.

The serving tray

Details of the serving trays T are shown in Figs. 21 to 24 and Fig. 30. Each tray is formed of a flat body portion 320 bordered by a shallow outwardly flaring rim 321 which cooperates with a certain control mechanism, to be described hereinafter. The body of the tray is preferably formed with depressions 322 to receive various dishes, or certain commodities which may be placed directly in the depressions, if so desired, without the necessity of using dishes. In other words, the depressions may serve as integrally formed dishes in the tray.

Connected to the bottom of the tray, but spaced therefrom by means of studs 323, are transverse rails 324 and 325 respectively on which the tray normally rests. The rail 324 is spaced a short distance from the leading edge of the tray, that is the forward end of the tray, as it passes along the serving counters in the direction indicated by the arrow in Fig. 21, while the rail 325 is placed at equal distance from the opposite end of the tray. Each rail is angular in cross section with one horizontal flange to which the studs are secured and the other flange depending vertically from the inner edge of the horizontal flange. Secured to the rail 324 is another angle rail 326 which is oppositely disposed so that the two combine to form a T in cross section (see Fig. 24). The rail 326 is much shorter than rail 324 and has a much narrower vertical flange.

Pivoted within the angle of the rail 324 are a number of lugs 327 which, as shown in Figs. 21 and 23, are arranged in two widely separated groups disposed respectively on opposite sides of the center of the rail. Each lug consists of a small metal tab coiled about a fixed pivot pin 328 and with a tangential portion which normally bears against the vertical flange of the rail 324 as a stop, but which may be swung up to the position shown in broken lines in Fig. 24. Each lug is frictionally held in either the raised or the normal position by a spring finger 329 which engages one or the other of a pair of notches formed in the coiled portion of the lug.

To provide access to the lugs, so as to swing them up to the horizontal position, the vertical flange of the rail 324 is notched at 330 and 331 respectively opposite the two groups of lugs.

The vertical flange of the short rail 326, however, is so narrow that it does not need to be notched. The under surface of the lugs when in raised position lies slightly below the upper edge of the notches, as shown in Fig. 24.

The notch 331 is extended outwardly beyond the lugs 327 to provide access to a set of lugs 332 pivoted within the angle of the rail 326. The lugs 332 and their mounting are similar in every respect to the lugs 327, except that they face in the opposite direction and swing inwardly or toward the middle of the tray when being raised to horizontal position. The notch 330 is also extended beyond the lugs 327 for a purpose which will appear hereinafter.

Two separate groups of lugs 333 are pivoted within the angle rail 325. These lugs are similar in construction and mounting to the lugs 327, but are arranged to swing outwardly to horizontal position in the same direction as the lugs 332. The vertical flange of rail 325 is also formed with recesses or notches 334 to provide access to the lugs 333.

In the particular embodiment illustrated the lugs 327 are arranged in two groups of three each and are adapted to be raised in various combinations of one or more in each or either group by means controlled by the seat keys 103. These lugs determine at which serving space the tray is to be delivered. The lugs 332, here shown as consisting of only three, are raised in various combinations by mechanism controlled by certain of the commodity keys 104. These lugs determine at which of a number of food preparing machines the tray will stop to receive foods that have to be prepared on order. The lugs 333 comprise, as illustrated, two groups of six each and are controlled by other commodity keys. The lugs 333 determine at which of certain dispensing machines the tray will stop to receive commodities that are already prepared, a combination of three lugs being used for each group of six dispensing machines.

*The routing station*

It will be recalled that the trays, as they come from the washroom, are piled up in a supply stack F near the kitchen and immediately adjacent the dispensing conveyor and that the trays are automatically withdrawn one at a time, as needed, from the bottom of the stack and placed on the lower run $d$ of the dispensing conveyor. However, before the trays pass out from the stack they are tested to see that their lugs are all in normal position. Means are provided for transferring trays whose lugs have not been properly set or trays which have been inadvertently introduced wrong side around, to a reject stack F' on the opposite side of the conveyor.

*The tray supply.*—Referring now particularly to Figs. 25 to 28 inclusive, the supply stack F comprises an open frame composed of uprights 340 rising from a bed plate 341 resting on the mezzanine floor. Cross beams 341a at each side of the stack frame, serve to brace the posts above the plane of the lower run $d$ of the dispensing belt and they provide supports for shorter intermediate uprights 342. The reject tray stack frame F' is similarly constructed and the same reference numerals are used as in the tray stack frame F to indicate the numbers thereof.

The trays are introduced into the stack frame F from above and are supported by two pairs of opposed pawls 343 on which the rim of the lowermost tray of the stack rests. These pawls are keyed to a pair of shafts 344 which are journaled in bearings depending from the cross beams 341a. The shafts project from one end of the stack frame, (see Figs. 27, 28 and 29) and carry crank arms 345 and 346 respectively which are connected by a link 347. The arm 345 projects downwardly and the arm 346 upwardly so that an outward movement of either pair of the pawls 343 will cause a corresponding outward movement of the other pair of pawls and vice versa. One of the shafts 344 also carries an operating crank arm 348 connected by a link 349 to one arm of a freely mounted lever 350. The other arm of the lever bears a roller which rides in a groove 351 formed in a cam 352, see also Fig. 29a. The latter is journaled on a shaft 353, which, in turn, is journaled in brackets 354, 354a and 354' rising from the base plate 341. This shaft runs parallel to and below the lower run $d$ of the dispensing belt and is continuously driven through suitable gearing 355 by a motor 356, Figs. 25, 27 and 36.

The cam 352 is normally idle, but a clutch is provided for operatively connecting the cam to the shaft 353 under certain conditions presently to be described. When this clutch is thrown, the cam acts to withdraw the pawls 343 from engagement with the bottom tray, permitting said tray to be lowered by a pair of tray carriers 357 (Figs. 27, 28 and 29). These carriers are mounted to slide on vertical posts 358 carried by the brackets 354 and 354a. Each tray carrier is provided with a pair of upright pins 360 in position to engage the rim of the tray when the carrier is raised. The carriers are raised by lever arms 361 secured to a shaft 362 journaled in the brackets 354 and 354a, and on which shaft the lever 350 is fulcrumed. Keyed to this shaft is an operating arm 363 which carries a roller engaging the periphery of the cam 352. Thus, when this cam is rotated the carriers are raised and the pins 360 lift the stack of trays off the pawls 343. Then the pawls are retracted by the cam and the carriers descend lowering the stack. Immediately after the lowermost tray passes the pawls the latter are moved inward under control of the cam groove 351 to engage the rim of the next tray in the stack, while the lowermost tray descends with the carrier and is deposited on a conveyor running transversely to the belt run $d$.

The transverse conveyor consists of a pair of endless belts 364, which run on pulleys 365. Each of the pulleys at the left hand end of the conveyor, as viewed in Fig. 28, is mounted on an upright arm of a bell-crank lever 366. These levers are pivoted on a bracket 367 rising from the bed plate 341. The other arm of each bell crank extends inwardly or toward the right and is urged upwardly by a spring 368. Thus, the belts 364 are held taut, but will yield to allow for certain transverse movements of the belt presently to be described. The pulleys 365 at the opposite end of the conveyor are fixed upon a shaft 369 journaled in a bracket 370 rising from the bed plate. A sprocket wheel 371 is keyed to the shaft 369 and engages a chain belt 372 which runs about a driving sprocket wheel 373 mounted on the shaft 353 (Figs. 27 and 29a) and an idler 374 adjustably supported by the bracket 370.

The upper run of each belt 364 (Fig. 29) passes under the lower run $d$ of the dispensing belt, being guided under a central roller 375 and over a pair of rollers 376 at either side thereof.

The rollers are mounted in carriages 377 (there being a carriage for each belt 364) fixed on posts 378 which slide vertically in the brackets 354 and 354a, thereby moving the upper run of the belts from the position shown by full lines in Figs. 28 and 29 to that shown by broken lines in Fig. 28, and vice versa. When in the broken line position, a tray carried by the belts 364 will ride across the belt run d and when the belts 364 are lowered the tray will be left upon the belt run d. Rails 380 serve as supports for the belt run d, while the belts 364 are supported by rails 381 on the brackets 354 and 354a and rails 382 on the carriage 377.

The carriages 377 are moved vertically by links 377a connecting the carriages to crank arms fixed to a shaft 383 which has an operating arm 383a secured thereto bearing a roller that runs in a cam groove 384a formed in a cam 384. The latter is normally free on the shaft 353, but may be connected thereto by a clutch which will be described hereinafter. When the belts 364 are drawn downward by the carriages 377 the pulleys 365 carried by the bell-cranks 366, will be swung inward, compressing the springs 368, and as the carriages rise, the springs will swing the pulleys outward to take up the slack in the belts.

*Lug testing and tray reject mechanism.*—As stated above, the tray must be tested to see that the lugs carried thereby are all in normal position, and also to see that the tray has been inserted in the stack right side around. The testing mechanism operating on these lugs is shown particularly in Figs. 30 to 32 inclusive. This testing mechanism comprises a set of feeler fingers 385, there being a finger for each lug. The feeler fingers are arranged in two units; that shown at the right in Fig. 31, serving to test the lugs on the leading rails, 324 and 326, and the unit shown at the left, serving to test the lugs on the rear rail 325 of the tray. The units are oppositely disposed for engagement with the two sets of lugs but are otherwise alike, except that the unit at the right has nine fingers to test the nine seat and commodity lugs on the forward rails, while the other unit has twelve fingers to test the twelve lugs on the rear rail (see Fig. 27). The two testing units are carried respectively by the two tray carriers 357, but a description of one unit will suffice, bearing in mind the difference between the units just pointed out.

Projecting inward under the stack of trays, from the tray carrier 357 are two bracket arms 386 which provide journals for a transverse shaft 387. Mounted on this shaft is a bail comprising a pair of vertical arms 388 connected at their upper ends by a transverse shaft 389. Suspended from this shaft is an inner bail comprising side plates 390 connected by a shaft 391. One of the side plates 390 carries a roller 392 which bears against the vertical edge of cam plate 393 carried by the bracket 354. A tension spring 394 connects one of the plates 388 to a pin on the adjacent bracket arm 386 and urges the outer bail inward or toward the cam 393. The two bails are connected by extension spring 395 which presses the roller 392 against the cam, and this spring would force the outer bail outward were it not overpowered by the spring 394. A stop pin 396 carried by the outer bail and bearing against the outer edge of the adjacent side plate 390, limits inward movement of the outer bail and serves to hold the latter in upright position when the parts are in their normal position shown in Fig. 31. In other words, the spring 394 presses the roller 392 against the vertical edge of the cam plate 393, which in turn presses a side plate 390 of the inner bail, against the pin 396. The latter is cut away at its upper end to form an inclined edge 393a.

When the tray carrier is raised, the parts maintain the position shown in Fig. 31 until the roller 392 rides off the vertical edge of the cam and upon the inclined edge 393a. Thereupon the outer bail swings inward or to the left as shown in Fig. 32, under pull of the spring 394, until a toe piece 397 on said bail strikes a stop pin 398 on the arm 386. The inner bail also swings in the same direction under pull of the spring 395 until it bears against a stop pin 399.

Journaled on the shaft 389 are the feeler fingers 385, and they are individually urged upward by springs 400, but are normally held in retracted position by a bail 401 journaled on the shaft 391, which engages depending extensions 402 of the feeler fingers. The bail 401 has a depending arm 403 which engages a pin 404 on the outer bail when the inner bail swings inward, thereby swinging the bail 401 on its axis against the pull of a spring 406, withdrawing the bail 401 from engagement with the fingers extensions 402 and permitting the feeler fingers 385 to swing upward to the position shown in broken lines in Fig. 32. The bail 401 also has a tail 403a which acts as a stop against a pin 404a fixed on the side plate 390 and serves to hold the bail in the position shown in Fig. 31 by limiting the pull of the spring 406.

The operation of the feeler mechanism is as follows: As the tray carriers 357 rise to withdraw the bottom tray from the stack, the feeler fingers 388 swing over the belts 364 of the transverse conveyor and under the lugs on the tray rail. Just before reaching the lugs they are released from the bail 401. As the feeler fingers are pressed upward against the lugs they will be swung back to full line position, as shown in Fig. 32, if all the lugs are in normal position, but if one of the lugs is swung up, the corresponding finger will remain in the broken line position so that when the carrier is lowered and the roller 392, coacting with the cam plate 393, swings the outer bail back to vertical position, the extension 402 of the projecting feeler finger will lie in the path of the bail 401 and prevent the latter from returning to normal position. This will cause the arm 403 to project into the path of an arm 408, as shown by broken lines at the right hand side of Fig. 31, depressing said lever and operating certain stop mechanism which will be described presently. The extensions 402 and the bail 401 will be restored to nonoperative position, as shown in Fig. 31, and in full lines in Fig. 32, during any subsequent cycle of the frames 357 in which all lugs on the tray rails are in normal position.

As explained above, the feeler units for the two rails are made exactly alike, except that one has more fingers than the other. If the tray is placed in the stack with the wrong end forward this fact will be detected even though the lugs are all depressed, because of the twelve fingers in one unit only nine will engage lugs or be depressed thereby, permitting three to remain in sprung position to operate the arm 408.

There are two arms 408 one for each testing unit and these arms are fixed upon a shaft 409 journaled in the brackets 354 and 354a. As shown in Figs. 28, 29 and 30, a spring 410 acting on an oppositely disposed crank arm 411 fixed to the rockshaft resists depression of the arms 408. A link 412 connects the crank 411 to a crank 413 on a shaft 414, journaled in an extension fixed to the bracket 354, and an arm 415 disposed at an angle to the crank 413 is connected by a link 416 (see also Fig. 27) to an arm 417 journaled upon a shaft 418. The latter shaft runs parallel to the belt run d and is journaled on the uprights 340 of the reject stack frame F'. A tension spring 419 connects the arm 417 to an arm 420 fixed on the shaft 418, and a stop pin 420a on the arm 420 normally bears against the arm 417, limiting the contraction of said spring. When an arm 408 is depressed by action of a feeler finger, the shaft 418 will turn clockwise under pull of spring 419. Fixed upon and depending from the shaft 418 are stop fingers 422 which normally lie in the path of a tray conveyed by the belts 364, arresting the tray in centered position over the belt d, but when the shaft 418 is turned clockwise the stop fingers are swung forward clear of the tray permitting it to pass on into the reject stack F'.

When the tray carriers 357 deposit a tray upon the belts 364 the latter are in the raised position shown by broken lines in Fig. 28, and the tray rides over the belt run d without touching the same, so that the latter will not drag the tray out of alinement, the supporting rails 324 and 325 of the tray being long enough to span the depression in the belts 364 through which the belt d passes, without dropping on said belt.

When the tray strikes the fingers 422, it presses them back slightly, turning the shaft 418 counter-clockwise as viewed in Fig. 29. This movement of the shaft takes place without disturbing the arms 408, by reason of the spring 419 connecting arms 417 and 420. When the shaft turns counter-clockwise it pulls a link 423 which has a pin and slot connection with a crank arm 424 on said shaft. The pin and slot connection between the link 423 and the crank arm 424 permits the fingers 422 to be swung clockwise by the link 416 when a tray is to be passed on to the reject stack. A pin 423a fixed to the upright 340 passes through an elongated hole in the link 423 and a spring 424a, between the link and the pin 423a, cooperates with the latter to maintain the link 423 in the position shown in Fig. 29 when the pin in the arm 424 rides down the slot in the link 423. When link 423 is pulled by engagement of a tray with the fingers 422 it operates the clutch which connects the cam 384 to power, causing the carriages 377 to move downward and with them the belts 364. This leaves the tray on the belt run d which then carries the tray away.

The trays which pass on to the reject stack frame F' strike depending fingers 425 (Figs. 27 and 28) fixed to a shaft 426 journaled in the uprights 340 on the far side of the frame F'. The fingers are pushed back by the tray, turning the shaft 426 and exerting a pull on a link 427 which is connected to a crank arm 428 fixed on the shaft 426. When the link is pulled, clutch mechanism is operated which connects the cam 352 to power, as will be explained presently. The rejected tray is arrested by the fingers 425 in position to be raised into the reject stack frame. This is effected by tray carriers 430, similar to the carriers 357, which are vertically slidable on posts 431 fixed upon the brackets 354 and 354a. The carriers 430 are raised by arms 432 fixed upon a shaft 433. Keyed upon this shaft is an operating arm 434 which has roller engagement with the cam 352. The carriers 430 have upright pins 435 adapted to engage the rim of the tray, and when the carriers are lifted by action of the cam, the tray is raised until the rim thereof snaps past spring-pressed pawls 436 which project from the opposite cross-beams 341a.

As shown in Figs. 27 and 29a, the hub 437 of the cam 352 has a radial slot therein in which a clutch dog 438 is pivoted. This dog is urged, by a compression spring 439 into engagement with a notched clutch disk 440 fixed on the shaft 353, but is normally held in retracted position by an arm 441 of a clutch lever pivoted on the bracket 354. The other arm of the clutch lever is connected to the link 427, so that whenever said link is pulled the dog 441 will be released and by engaging one of the notches in the disk 440, will cause the cam 352 to turn with the shaft 353. This will cause the tray carriers 357 and 430 to rise, the former to pick off a fresh tray from the stack in frame F, and the latter to lift a rejected tray (if there be one) into the stack of frame F'. When the latter tray clears the stop fingers 425, a spring 442 returns the arm 441 to normal position. The latter has a beveled face 441a which lies in the path of the dog 438, when the arm is in normal position, so that the dog will strike said beveled face and be withdrawn thereby from engagement with the clutch disk and the cam will thus be automatically arrested on making one complete rotation.

The clutch of the cam 384 is of the same general construction as that used in the keyboard machine to connect the hollow cam shaft 230 to the drive shaft 229 (Fig. 4). In the hub 444 (Figs. 27 and 29) of the cam there is a clutch pin 445 which is slidable radially to engage a toothed clutch wheel (not shown) which is fixed on the shaft 353. The pin 445 is secured to a clutch lever 446 pivoted on the face of the cam 384. Normally the pin is held in retracted position by a latch lever 447 engaging an arm of the clutch lever. When the latch lever is withdrawn the pin 445 is pressed by a spring (not shown) into engagement with the toothed clutch wheel, connecting the cam to power. However, when the cam has made a half rotation the clutch lever 446 encounters another latch lever 448 which withdraws the clutch pin and arrests the cam. When the lever 448 is withdrawn the clutch is again thrown into engagement and the cam makes another half turn when it is arrested by the latch lever 447.

The lever 448 is connected to the link 423, while the lever 447 is connected by a link 449 to a crank on the shaft 426 (Fig. 28). Thus, whenever a rejected tray strikes the stop fingers 425 turning the shaft 426, not only is the cam 352 connected to power, but also the cam 384. The former cam makes a complete rotation, raising and lowering the tray carriers, but the latter cam makes only a half turn, raising the belts 364 and holding them in raised position. If the feeler fingers 385 find that the tray is in proper condition to be delivered to the belt run d, the tray will be arrested by the stop fingers 422, and by depressing the latter and turning the shaft 418, will pull the link 423, withdrawing the latch lever 448. The cam 384 will then make another half rotation lowering the belts 364 and depositing the tray on the belt run $d$. On the other hand, if the tray is a reject, the fingers 422 will be lifted clear of the path of the tray by action of the lever 408 and, hence, the clutch lever 448 will not be withdrawn and the belts 364 will remain in raised position until a tray comes along which has passed the test of the feeler fingers 385. It will be observed that each time a tray is rejected, it strikes stop fingers 425 and thus automatically causes the delivery of another tray from the stack F. This action will continue until a tray in proper condition is delivered to the belt run $d$.

The shaft 426 which controls the latch levers 441 and 447 is turned not only by a rejected tray, but also by a link 450 (Figs. 27 and 28). The link has a notch therein to receive a lug on the end of a crank 451 fixed on the shaft 426. The end of the link 450 has formed thereon a cam face 450a which lies in the path of a cam plate 452a fixed on an upright 340, and a spring 452 holds the top of the notch in the link 450 pressed against the lug on the crank 451. When the link 450 is pulled to the left as viewed in Fig. 28, the right hand end of the notch strikes the lug on the crank 451, turning the shaft 426 and thereby connecting the cams 352 and 384 to power, which causes a tray to be withdrawn from the bottom of the stack F and carried to the belt run $d$ by the pair of belts 364. However, as the link 450 continues to the left, the cam face 450a strikes the cam plate 452a thus raising the end of the link which causes the disengagement of the right hand end of the notch with the lug on the crank 451 permitting the shaft 426 and hence, the latch levers 441 and 447, to return to their normal positions and thereby disconnect the cams 352 and 384 from power. The notch on the link 450 must be withdrawn from the lug on the crank 451 as said link, after rocking the crank, remains in its operative position and would otherwise hold the latch levers 441 and 447 out of engagement and permit the cams 352 and 384 to make more than one cycle. As shown in Figs. 25 and 33, the link 450 is connected through a bell-crank 453 to one end of a link 454 which runs parallel to the dispensing conveyor. The other end of the link 454 is connected to an arm 455 pivoted on a stud 456 fixed on the machine frame and a handle 457 fixed to move with the arm and projecting from the machine frame, serves to allow an operator to pull the links 454 and 450 against the tension of a spring 458 in order to withdraw the first tray from the stack F. Thereafter the mechanism will continue to function automatically.

When a tray is deposited on the belt run $d$ it moves out to the "set-up" position shown in Fig. 33 (provided there is no preceding tray in said position) where it is arrested by mechanism that will be described presently. In moving to the set-up position, the tray is guided between side rails 459. On the stud 456 is an arm 460 which is fixed to move with the arm 455 and disposed to be swung outward by the rim of the tray, as shown in Fig. 33, the rim of the tray being indicated by broken lines. The arm 455 is thus turned pulling links 454 and 450, so that the clutches are thrown to actuate the tray carriers 357 and 430, and also the belt carriages 377, if necessary. Thus, as soon as one tray reaches the set up position, another tray will be automatically withdrawn from the stack F to take its place.

As shown in Figs. 25 and 26, there are three positions for the trays in the routing station to the left of the stacks, viz, "set-up" position, a "ready-item" position, and an "unready-item" position. In front of the "ready-item" and "unready-item" positions are elevators upon which the trays are pushed laterally. The elevators raise the trays to the level of the upper run D of the dispensing conveyor and the trays are then delivered by pusher mechanism on to said belt, to be conveyed toward the right, into the kitchen.

The three "positions" above referred to are preferably housed in a casing, as indicated in Figs. 1 and 2, but the walls of the casing have been removed in Figs. 25 and 26 to expose the mechanism within, only the frame work being left standing. This frame work comprises uprights 461 rising from the base plate 341, and beams 462 connecting the uprights 461 and also the stack frame uprights 340 which are alined therewith. Transverse beams 463 connect the uprights 461 at suitable intervals (see also Fig. 41) and the casing is formed with a peak roof supported on rafters 465.

Means are also provided to annunciate to an attendant when the trays in the tray stack F require replenishment. As shown in Figs. 27 and 28, a spring-pressed arm 355a is journaled within one of the uprights 342 and is disposed to engage the rims of the trays in the stack. The position of the arm 355a is such that after the third tray from the bottom of the stack has been withdrawn, it will swing inward under impulse of its spring and, in so doing an electrical contact blade 356a, fixed to the arm 355a but insulated therefrom, will bridge the gap between a pair of electrical contact members 357a fixed to but insulated from the upright 342, thereby closing the circuit of a lamp 358a (Fig. 36), or other indicating means, and informing an attendant to bring a fresh supply of trays.

*Lug setting mechanism.*—In the "set up" position is the mechanism which raises certain of the lugs of the tray in accordance with the combination set up by the keyboard machine N. This mechanism is shown in Figs. 33 and 34 and the electrical connections between the keyboard machine and certain solenoids actuating the lug-setting mechanism are shown in Fig. 36. These solenoids and most of the lug-setting mechanism are supported on a plate 466 hung from the beams 462.

As the tray is conveyed on the belt run $d$ it is arrested in the set-up position by a pair of dogs 470 which engage the forward rail 324 of the tray. The tray is held in this position until the tray lugs have been set by the lug-setting mechanism.

The tray lugs are set by fingers over which the lugs are positioned by the dogs 470. Thus, there are twelve fingers 471 for the ready-food lugs 333 at the rear of the tray. These fingers are journaled on transverse shafts 472 and may be individually swung rearward or to the right, as shown in Fig. 34, against the pull of springs 473, by means of solenoids 474. The fingers are guided near their upper ends by a fixed comb 475. To set the unready-food lugs 332 (i. e. the lugs which determine where the tray is to stop in the kitchen to receive foods that must be prepared on order) there are three fingers 476 journaled on a shaft 477 and individually operable, in the same direction as fingers 471, by solenoids 478, against the pull of springs 479.

For setting the seat lugs 327 there are six fingers 480 journaled on a shaft 481 and individually movable forward against the pull up of springs 482 by means of solenoids 483. Combs 484 and 484a serve as guides for the upper ends of the fingers 476 and 480 respectively.

Each dog 470 (see also Fig. 34a) slides lengthwise in a socket formed in an upright arm 485 fixed on a transverse shaft 486. A forwardly projecting crank arm 487 on one of the arms 485 is urged upward by a spring 488 so that it normally bears against a stop pin 489 and the dogs 470 are tilted rearward to the position shown in Fig. 34a. However, when the tray rail strikes the dogs, it swings the arms 485 forward against a stop 490 to the position shown in Fig. 34. As it does so, a contact blade 491 carried by but insulated from one of the arms 485, opens a gap between a pair of electrical contact fingers 492 in the circuit of the solenoid 282 of the keyboard machine N, see Figs. 8, 9 and 36. It will be recalled that this solenoid controls a lever 281 which locks the seat keys against actuation when the solenoid is energized. Thus, it is impossible to operate a seat key to transmit an order until there is a tray in the set-up position, for when no tray is in the set-up position the electrical contact fingers 492 will be bridged by the blade 491 and cause the energization of the solenoid 282.

Each dog 470 is urged downwardly by a spring 493, but is normally held in raised position by an arm 494 which engages a pin 495 projecting laterally from the dog. The two arms 494 for the two dogs are secured upon a shaft 496, so that they will move in unison. The arms are held in raised position by a latch lever 497 which engages a lug on one of the arms 494. A spring holds the lever 497 in latching position. A link 498 connects the lever to a crank journaled on the shaft 481. Secured to the crank is a bail 499 which is positioned to be operated by the seat lug fingers 480 near the end of their stroke. Whenever a seat key is depressed at the keyboard machine, one, at least, of the seat key fingers is swung forward by its solenoid, thus striking the bail 499. This pulls the link 498 and unlatches the arms 494, permitting the dogs 470 to drop clear of the rail 324. The belt run d then carries the tray on to the "ready-order" position. As shown in Fig. 34 there is a small clearance between the bail 499 and the fingers 480 which insures the operation of the fingers 471, 476 and 480 before the dogs 470 are depressed.

The dogs 470 are reset just after the rear rail 325 has cleared them, by mechanism which will now be described. The shaft 496 bears a crank 500 which has pin-and-slot connection with a link 501, and the latter is pivotally connected to an arm fixed on a vertical shaft 502. The upper end of the shaft has an arm 503 fixed thereon, which bears against the rim of the tray that is in the set-up position (as shown in Fig. 33). A spring 504 urges the arm into engagement with the tray and as the tray passes out of the set-up position, the arm swings inward under the pull of this spring turning the shaft 502 and, through the link 501, crank 500 and arms 494, raises the dogs 470 to position to arrest the next tray. At the same time the latch lever 497 springs into latching position and holds the dogs in raised position until the seat fingers are operated for the next tray.

*Tray sorting mechanism.*—Provision is made for passing trays that call for ready foods ahead of those which call for foods that have to be cooked or otherwise prepared on order, so as to give time for the preparation of the latter foods without holding up the former trays. Since the lugs that stop the trays at the food preparing machines in the kitchen are operated by the fingers 476, means are provided for passing any trays that have been operated upon by any of the fingers 476 through the "ready item" position to the subsequent "unready item" position. If, however, a tray calls for no unprepared foods it is stopped at the "ready-item" position.

Figure 37:
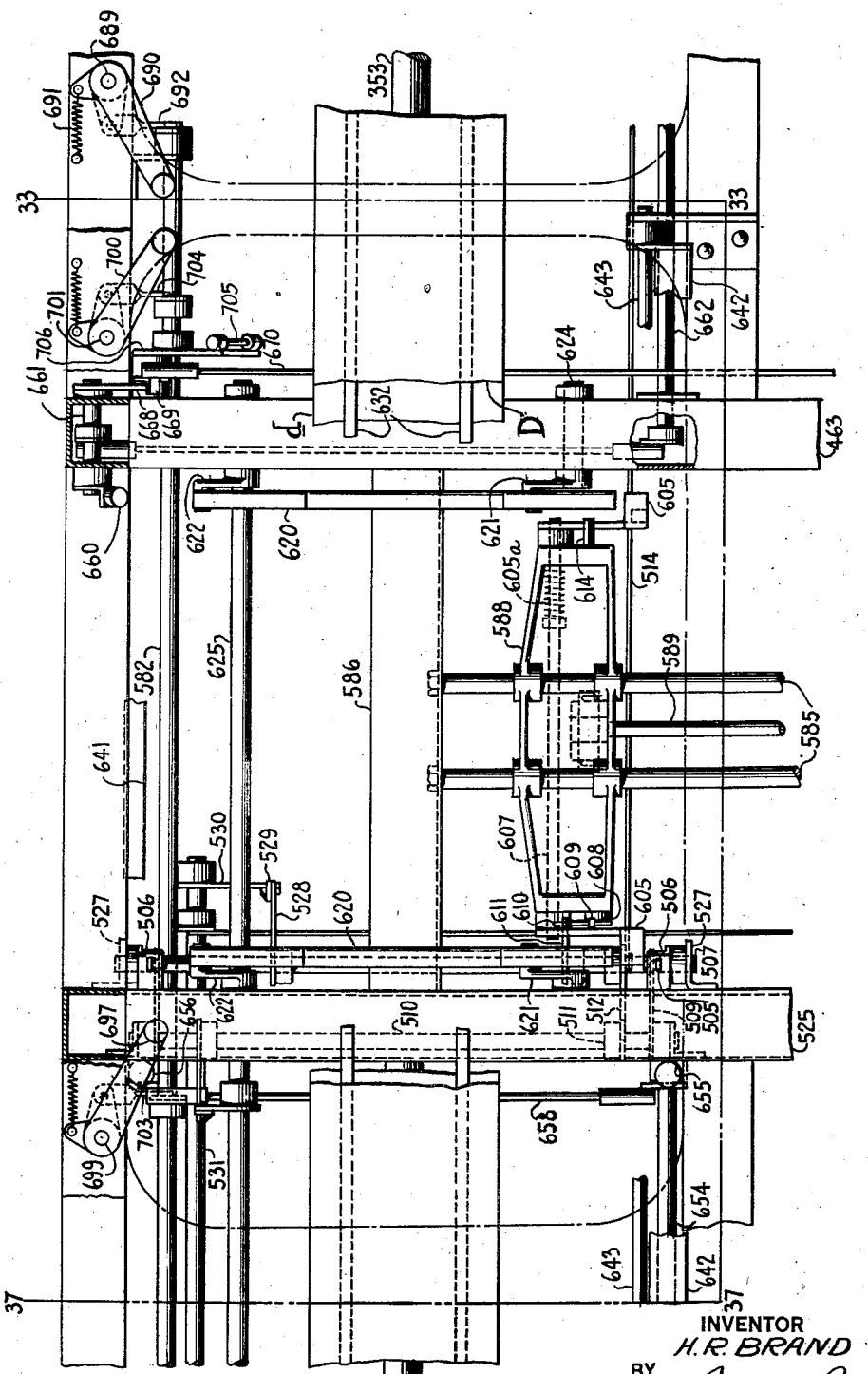
Fig. 37 is a plan view of that portion of the routing station shown in Fig. 35.

The mechanism at the "ready-item" position is shown in Figs. 35 and 37. A pair of dogs 505 are provided to arrest trays in the ready-item position. These dogs are slidable lengthwise in a pair of arms 506, respectively, which are secured on a transverse shaft 507. Said dogs 505 are urged upward by springs 508, but are normally held in depressed position by arms 509, which bear down upon lugs projecting laterally from the dogs 505. The arms 509 are fast on a shaft 510 which has a depending arm 511 secured thereto. The latter normally engages a notch in one arm 512 of a bell-crank journaled on the shaft 507. The other arm 513 of the bell-crank is connected to one end of a pull-bar 514, the other end of which extends back to the "set-up" position. As long as the arm 511 engages the notch in arm 512, the dogs will be held in depressed position and cannot arrest a tray in the "ready-item" position, but a pull on the bar 514 will withdraw the arm 512, releasing arms 509 so that the dogs 505 will rise to tray-arresting position.

Means are provided for pulling the bar 514 every time a tray clears the arm 503 in the set-up position unless one of the fingers 476 has been operated. Fixed on the shaft 502 is an arm 515 (see Figs. 33 and 34) which projects into a notch formed in the rear end of the pull bar 514. Thus every time the arm 503 swings inward as it clears a tray the arm 515 will swing rearward and, engaging a shoulder 516 on the pull-bar, will pull the latter, provided that the pull-bar is in the position shown in Fig. 34. However, fixed on the shaft 477 is a bail 518 which bears against the fingers 476 so that whenever any one of these fingers is operated to set a lug for an unprepared food, the bail will be swung rearward, turning the shaft 477. Fixed on this shaft is an arm 519 which passes under a pin projecting from the pull bar. Thus, the operation of any finger 476 will raise the pull-bar against the tension of a spring 520, so that the shoulder 516 will clear the arm 515. The bar is held in raised position by a latch 523 which snaps under a lug 521 under the pull of a spring 522. However, at the extreme of its rearward sweep, the arm 515 will strike the latch 523 and withdraw it from under the lug 521, so that the parts will then assume the position shown in Fig. 34. Thus, whenever a finger 476 is actuated, the pull bar 514 will not function and hence the dogs 505 will not rise to arrest the tray and the tray then passes through the ready-item into the subsequent unready-item position.

Referring now to Fig. 35, when a tray rail 324 strikes the dogs 505, it swings the arms 506 forward slightly until they come up against a cross-beam 525, forming part of the frame structure of this part of the routing station. Normally the arms are pulled by a spring 526 against stop pins projecting from brackets 527 in which the shaft 507 is journaled. Fixed upon the shaft 507 is an arm 528, which is connected to one end of a link 529. The other end of the link (see Fig. 37) is connected to a crank 530 on a clutch control shaft 531 which extends to the left, through the unready-item position, to a clutch mechanism described hereinafter. Thus, when a tray is arrested by the dogs 505, it also pulls the link 529 and initiates the operation of mechanism for moving the tray laterally into an elevator which carries it up to the upper run D of the dispensing belt.

When the dogs 505 are not raised to stop a tray in the ready-item position, the tray proceeds to the unready-item position, where the forward tray rail 324 strikes projecting fingers 532, Figs. 38 and 39, on a transverse shaft 533, thereby rocking said shaft. The latter has a crank arm 534 fixed thereon which is connected by a link 535 to a crank 536 on the shaft 531. Thus, the arrival of a tray either in the ready-item position or the unready-item position, will actuate the clutch control shaft 531. However, as shown in Figs. 41 and 42, the links have pin-and-slot connection with the cranks on the clutch control shaft 531, so that either one may turn said shaft without affecting the other.

*Routing station elevators.*—Referring now to Figs. 39 and 41 it will be observed that the elevators which raise the trays to the upper run D of the dispensing conveyor are of the chain belt type. Each elevator comprises four endless chain belts 540 arranged in pairs. The belts of each pair are connected ladder-like by transverse rails 541. The rails of opposed "ladders" provide steps on which the opposite ends of a tray may be supported by its rims. The chain belts 540 run on sprocket wheels 542 fixed on upper and lower transverse shafts 543 and 544, respectively. The upper shafts of each elevator are oppositely driven through suitable bevel gearing by a shaft 555, the direction of rotation being such that the rails on the inner side of each ladder will travel upward. The bevel gearing 556 for the elevator opposite the ready-item position is of different gear ratio from the bevel gearing 557 (see also Fig. 43) for the other elevator. In the particular construction illustrated the ready-item elevator runs six times as fast as the unready-item elevator. For this reason, there are only three rails on each ladder of the "fast" elevator, as against eighteen for the "slow" or "unready-item" elevator.

*Interlocking clutch mechanism.*—The shaft 555 (see also Figs. 40, 40a, 40b and 42) is driven by a chain belt 558 from a sprocket wheel 559 journaled on the main shaft 353. A cam wheel 560 is fixed to the sprocket wheel and has a recessed hub forming one element of a clutch 561, the other element being a toothed wheel secured to the shaft 353 and normally rotating within the recessed hub.

The clutch 561 is similar to that used on the keyboard machine as described above, comprising a pin 563 actuated by a clutch lever 564 pivoted on the face of the cam 560. Normally the clutch is held in disengaged position by a latch arm 565 which engages the clutch lever 564. The arm is fixed on one end of a shaft 566 journaled in the bracket 354'. Fixed on the other end of the shaft is a crank 567 which engages a groove 568 formed in the face of a cam 569. The latter is also journaled on the shaft 353 and is adapted to be operatively connected thereto by a second clutch 570, similar to the one just described, having a clutch pin and a clutch lever 571. The clutch pin is normally held in disengaged position by a latch arm 572 mounted on one end of a shaft 573 journaled in the bracket 354'. Fixed on the opposite end of the shaft 573 is a crank 574 which engages a cam groove 575 in the adjacent face of cam wheel 560.

The latch arm 572 is not fixed on the shaft 573, but is connected by a spring 576 to an arm 577 fixed on said shaft which tends to pull the arm outward to declutching position. This is prevented by a stop arm 578 which normally engages a lateral extension 579 of the latch arm 572. The stop arm 578 is fixed upon one end of the shaft 531 above referred to as operated by the links 529 and 535 (Figs. 37 and 38) respectively at the ready-item and unready-item positions. Thus, when either of these links is pulled by the arrest of a tray, the stop arm 578 is pulled out from under the extension 579, permitting the latch lever 572 to disengage the clutch lever 571 under pull of spring 576 and throw in the clutch 570. However, the throwing of the clutch is controlled also by the position of the arm 577. When the parts are in the position shown in Fig. 40b, the crank 574 is swung outward by an offset of the cam groove 575 which holds the arm 577 outward, but except for this offset the cam groove is set to swing the arm 577 inward and hold it in this position, so that a pin 580 carried by the arm 577 presses the latch arm 572 inward into position to engage the clutch lever. Thus, unless the cam 560 is in normal position, the clutch 570 cannot connect the cam 569 to power.

There is also another lock to prevent throwing the clutch 570. Fixed on one end of a shaft 582 is a crank arm 583 which is spring connected to a tail on an arm 581. The arm 581 is pivotally mounted on the shaft 582 and may be swung to engage a lug 584 on the extension 579. Normally, the arm 581 is withdrawn to the position shown in Fig. 40b so as to clear said lug, but under certain conditions which will be explained hereinafter, the shaft 582 is turned to bring the arm 581 into locking position to prevent operation of the latch arm 572. The arm 581 is spring connected to the shaft 582 so that the shaft may be free to turn should the lug 584 be in the path of the arm 581.

When the clutch 570 is engaged, the cam 569 will turn with the shaft 353. As the cam nears the end of one revolution the crank arm 567 (Fig. 40b) encounters an outward offset in the cam groove 568 and withdraws the latch arm 565 permitting engagement of the clutch 561 and starting rotation of cam 560. Immediately thereafter the cam groove 568 restores the latch arm 565 to normal position, so that when the cam 560 has made one complete rotation the latch arm 565 will strike the clutch lever 564 and disengage the clutch 561. In the meantime shortly after the cam 560 has started to turn, the offset part of the cam groove 575 is cleared by the crank arm 574 and the latter with the arm 577 are forced inward, so that the pin 580 will press the latch arm 572 inward holding it in such position as to engage the clutch lever 571 and disengage the clutch 570 as soon as the cam 569 has completed a full turn. By this arrangement the clutches 570 and 561 are alternately thrown into active position and each one is thrown out of engagement after making one complete turn unless other mechanism presently to be described comes into play.

*Pusher mechanism.*—The cam 569 is used to operate certain pusher mechanism by which the trays are pushed off the lower belt run $d$ upon the elevators, and off the elevators upon the belt run D. As shown in Figs. 37, 38 and 41, pairs of transverse rods 585 are secured at one end to longitudinal beams 586 under the belt $d$ at the ready-item and unready-item positions respectively and extend between the opposed belts 540 of the elevators to brackets 587 (Fig. 26) secured to the beam 462. Mounted to slide on each pair of rods is a cross-head 588. The cross-heads serve to draw the trays into the elevators, as will be explained presently. A link 589 connects each cross head to an arm 590 (Figs. 26, 41 and 43) secured to a shaft 591 journaled in suitable brackets on the bed plate 341. Also secured to the shaft 591 is an arm 592 which is connected by a link 593 to an arm 594 of a bell-crank lever pivotally mounted on a bracket 595 (see also Figs. 40 and 42). The other arm 594a of the bell-crank lever is connected by a link 596 to an arm 597 secured to a shaft 598 journaled in suitable brackets just under the peak of the roof of routing station casing. Extending transversely across the said casing above the belt run D are pairs of guide rods 599 (Figs. 25, 39, 41 and 43) on which are mounted cross-heads 600, one for each elevator, which serve to push the trays off the elevators to the upper belt run D. Each cross head 600 is connected by a link 601 to an arm 602, secured to and depending from the shaft 598. The bell-crank arm 594 carries a roller 603 which engages a groove 604 (Fig. 42) in the outer face of the cam 569. The shape of the cam groove is such that a half rotation of the cam from the position shown in Figs. 41 and 42 will slide the lever cross heads 588 to the left and the upper cross heads 600 to the right, while the other half rotation of the cam will return the cross heads to their original positions.

The upper cross heads have depending fingers 600a adapted to engage the rims of the trays so as to push the trays off the elevators while the lower cross heads have up-standing fingers 605 which enter recesses 606 in the tray rails and pull the trays into the elevators. The fingers 605 must be lowered to disengage said recesses after they have carried a tray into the elevator and hence said fingers of each cross head are fixed on a shaft 607 (Figs. 35, 37, 38, 41 and 42) so that they may be swung downward to clear the tray rails. In this lowered position they are held by a latch 608 which engages a lug 609 on one of the fingers 605.

The latch 608 at the ready-item position, as shown in Figs. 35, 37 and 41 and at the right of Fig. 39, has a horizontal arm 610 which is adapted to be lifted by a crank 611 on the shaft 507. Thus, whenever the shaft 507 is turned by a tray engaging the stop dogs 505, the latch 608 at that station will be released, permitting the fingers 605 to rise into engaging position against a stop pin 614, under impulse of a coil spring 605a on the shaft 607. The latch 608 at the unready-item position is of slightly different construction being formed with a depending tail 612 (Figs. 38, 39 and 42) which is adapted to strike a fixed pin 613 as the cross head returns to normal position thereby releasing the latch.

In each case the fingers 605 are raised into position to engage the tray rail recess by a coil spring 605a and are maintained in this position by a stop pin 614. A roller 615 is fixed on one of the pair of fingers 605 and when the cross head reaches the end of its outward stroke it rides over and depresses an inclined lug 618 (Fig. 41) carried by a spring-pressed lever 619. On the return stroke of the cross head the roller 615 is depressed by the under side of the inclined lug, withdrawing the fingers 605 from the recesses 606 in the tray rails. The fingers 605 are then held in the depressed position by the latch 608 engaging the lug 609 until the cross head returns to normal position where, in the case of the ready-item position, shown in Fig. 41, they will be released when the arm 611 is actuated and, in the case of the unready-item position, shown in Fig. 42, they will be released by the tail 612 striking the pin 613.

Before a tray may be slid off the belt run $d$ it must be lifted clear of the same. To this end transverse rails 620 are provided at opposite ends of each cross head in position to engage the opposite rails of the trays. These rails are recessed to clear the belt run $d$ and its longitudinal supports 380. Each transverse rail 620 is pivotally connected near opposite ends thereof to the normally horizontal arms of a pair of bell-cranks 621 and 622, respectively. The bell-cranks also have depending arms connected by a link 623. The bell-cranks 621 are individually pivoted on studs 624 projecting from transverse beams 463 and 525, but the bell-cranks 622 in both the "ready-item" and "unready-item" positions are secured to a shaft 625. The latter is provided at one end with an arm 626 (Fig. 41) which is connected by a link 627 to an arm 628 (see Figs. 40, 40b and 42) pivoted on the bracket 354'. A roller 629 on this arm engages a groove 630 formed in the inner face of the cam 569. The form of the cam groove is such that as soon as the cam begins to turn it will pull down the link 627 turning the shaft 625 and thereby cause the transverse rails both in the ready-item and unready-item positions to rise and lift any tray that happens to be in said position clear of the belt run $d$.

It is also important in sliding the trays off the elevators upon the upper belt run D to hold the trays clear of the belt until they have been centered thereover. Hence, transverse rails 631 (Figs. 25 and 41) are provided in position to support the tray rails. The rails 631 like the rails 620 are recessed to receive the belt run D and longitudinal supports 632 therefor. Each rail 631 is supported on a pair of bell-cranks 634 and 635 respectively, which are connected by a link 636 so that they will move together. The bell-cranks 635 are all fixed upon a shaft 637 and the other bell-cranks 634 are all fixed to a shaft 638. The latter has a crank arm which is connected by a link 639 to a crank arm 640, as also shown in broken lines in Fig. 40, fixed upon the shaft 625. Hence, whenever the cam 569 raises the lower rails 620, it will also raise the upper rails 631. The latter, when in elevated position, rise slightly above the belt run D and in position to guide the tray rails across the belt run D without touching the same. When the tray has been centered over the belt the cam 569 operates to lower the tray so that it will rest upon and be carried away by the belt run D.

The trays are prevented from skewing as they are carried by the belt run d, by longitudinal rails 641 along which the rim of the tray is guided. On the other side the trays are guided by rails 642 (Figs. 35, 38, 39, 41 and 42) which are pivotally mounted so that they can be swung clear of the tray to permit of sliding the trays on to the elevators. The pivoted rails are secured to crank arms fast to a shaft 643 which extends through the ready-item and unready-item positions. Similarly, the trays on the upper belt run D (Figs. 39 and 41) are confined on one side by fixed longitudinal strips 644 and on the other by movable rails 645 carried by a shaft 646. The rails 644 and 645 restrain the ends of the tray rails. Fixed upon one end of the shaft 637 is a bell-crank 647, one arm of which is connected by a link 648 to a crank on the shaft 643, while the other arm of the bell-crank is connected by a link 649 to a crank fixed on the shaft 646. Thus, whenever the shaft 637 is rotated and the rails 620 and 631 are raised to permit of the transfer of trays to or from the elevators the guide rails 642 are raised to clear the tray rims and the guide rails 645 are lowered to clear the tray rails.

*Interlocking controls for the routing positions.*—It is obvious that some provision must be made for timing the various movements of the trays so as to prevent jamming. The release of the trays from set-up position might take place at any time, if controlled solely by the operator of the keyboard machine. A tray in the ready-item position or the unready-item position must be permitted to move out of the way before another tray is allowed to enter such position.

As shown in Figs. 38 and 42 there is a stop control finger 650 which normally lies in the path of the trays but is adapted to be swung outward by the rim of a tray advancing into the unready-item position. This finger is fixed to a short shaft 650a journaled in the frame of the routing station, and a depending arm 651 also fixed to the shaft is connected by a link 652 to a crank arm 653 of a shaft 654 which runs back into the ready-item position, as shown in Fig. 37. Fixed to this shaft is a stop finger 655 adapted to be moved into the path of a tray rail near one end of the rail. A companion stop finger 656 is pivotally mounted on a stud 657 in position to be moved in front of the tray rail near the opposite end thereof. A link 658 connects a depending arm of the stop finger 656 to the stop finger 655 on shaft 654, so that the stop fingers will move oppositely. Normally the fingers are swung outwardly by a spring 659 connected to an arm 665 which moves with the stop control finger 650 so that a tray may pass freely out of the ready-item position, but if a tray has not been removed from the unready-item position, the rim of said tray holds the stop control finger 650 outward, thereby causing the stop fingers 655 and 656 to remain inward and detain the subsequent tray. After the unready-item position is cleared the fingers 656 and 655 are automatically withdrawn as the stop control finger 650 is no longer held by the tray rim.

It will be noted that a tray in the ready-item position, as shown in Fig. 37, clears the dogs 505 before it encounters the stop fingers 655 and 656 so that the latter will not in any way interfere with a tray stopped by said dogs and which is to be fed directly into fast elevator.

Similar stop mechanism is used to prevent a tray from entering the ready-item position until the latter is cleared. A stop control finger 660, Fig. 37, is fixed on a shaft 661 in such position as to be deflected by the rim of a tray in the ready item position. By means of linkage similar to that shown in connection with stop control finger 650, a shaft 662 is rocked. The latter runs back to the set-up position (Fig. 33) where it operates to throw inward a pair of stop fingers 663 which are interconnected by a link 664 in substantially the same way as the fingers 655 and 656 are connected. The fingers engage the forward tray rail 324 of the tray just after it has moved a short distance from set-up position and has caused the bridging of the electrical contact fingers 492 by the contact blade 491 so that the operator of the keyboard machine cannot depress another seat key to put through another order while the tray remains in the set-up zone.

The control fingers 650 and 660 must be latched out, while trays which have deflected them are moving into the elevators. As shown in Figs. 38 and 42 there is a laterally projecting arm 665 movable with the finger 650 which is adapted to be engaged by a latch 666 journaled on the stud 657. The latch is connected by a spring 666a to the framework. One end of a link 667 has pin-and-slot connection with the latch. Similarly a laterally projecting arm 668 (Fig. 37) movable with the stop control finger 660 is adapted to engage a spring-pressed latch 669 journaled on a stud positioned similarly to the stud 657. One end of a link 670 has pin-and-slot connection with the latch 669. As shown in Fig. 41 the other end of the link 670 is connected to an arm 671 of a lever pivoted at the forward end of the fast elevator. Another arm 672 of this lever lies in position to be struck and deflected by one end of a tray rail 325 as it moves into said elevator. In the slow elevator, a similar arm 671a (Fig. 43) is connected to the link 667 and an arm 672a is adapted to be actuated by a tray rail. Thus, whenever the trays reach their extreme position in the elevators, they withdraw the latches 666 and 669 permitting the stop-control fingers 650 and 660 respectively to swing inward and release any trays that may be detained in the ready-item or "set up" positions. Referring to Fig. 42, when the stop-control fingers 650 swings inward the outer end of the arm 665, which is of arcuate profile, will be in the path of a lug on the latch 666, and when the finger 650 is swung outward the arm 665 is drawn up clear of the latch permitting the latter, under pull of the spring 666a, to swing outward to the position illustrated so that the lug on the latch will be under the arm 665 and prevent the control finger 650 from returning to normal position until the latch 666 is swung clear by a pull on the link 667.

It has already been explained that a pull either on the link 529 or the link 535 will turn the clutch-control shaft 531 and by withdrawing the arm 578 permit the clutch 570 to connect cam 569 to power provided the cam 560 is in normal idle position. One complete rotation of cam 569 moves the lower cross heads 588 simultaneously into the elevators and return, while the upper slide heads 600 are simultaneously moved out of the elevators and back. Thus, two trays may be moved into the elevators from the belt run d while two trays are being moved out of the elevators and on to the upper belt run D. As cam 569 completes a rotation, it throws the clutch 561 connecting cam 560 and sprocket wheel 559 to power. The elevators are then operated to raise the trays that may have been placed on them and come to a stop as soon as the cam 560 has completed a single rotation. The fast elevator will raise a tray from the lower to the upper level in a single rotation of the sprocket wheel 559, but the slow elevator requires six rotations of said sprocket wheel. Hence, provision is made for repeating the cam cycles as long as there is a tray on slow elevators. As shown particularly in Figs. 39 and 43 there is a vertical plate 680 secured to a vertical shaft 681 in such position as to engage the trays on the elevator. A crank 682 on the latter is connected by a link 683 to a crank 684 (Fig. 42) on the clutch control shaft 531. When a tray is pushed on to the slow elevator it deflects the plate 680 and, through the linkage described, turns the shaft 531. A similar plate 685 (see Figs. 39 and 41) is secured upon a vertical shaft 686, and a crank on the latter is connected by a link 687 to a crank 688 on the shaft 531. Thus, as long as there is a tray on either elevator the stop arm 578 will be held clear of the arm 579 and the cams 569 and 560 will continue to rotate in alternation unless the arm 581 is thrown into locking position.

The locking arm 581 serves to prevent release of the latch arm 572 when trays are intermediate between the set-up and ready-item positions, or between the latter and the unready-item positions, or when the space in front of the elevators on the upper belt run D is obstructed by a preceding tray. Fixed upon a vertical shaft 689 near the forward end of the set-up position is a lever 690 (Figs. 33 and 37) which is normally held in the path of the trays by a spring 691. A crank on the shaft 689 is connected by a link 692 to a crank on shaft 582, so that deflection of the lever 690 will turn the shaft 582 and move the arm 581 into clutch locking position. Similarly, a spring-pressed lever 694 (Fig. 38) is mounted on a vertical shaft 695 and linked to the shaft 582. Spring-pressed levers 696 (Figs 25, 37, 38 and 39) are mounted on vertical shafts 698 and 699 in position to engage trays discharged from the slow and fast elevators respectively. A spring pressed lever 700, as best shown in Figs. 25 and 37, is mounted on the vertical shaft 701 directly forward of the tray discharge position at the ready-item elevator. Crank arms on the vertical shafts 698, 699 and 701 are connected to crank arms fixed on the shaft 582 by the links 702, 703 and 704 respectively. In each case, as illustrated by link 702 in Fig. 42, there is a lost motion connection between the links connected to the vertical shafts and the crank arms on the shaft 582 so that deflection of one lever will not affect any of the others. Thus, on the lower belt run d while a tray is passing from set-up to ready-item position, it will deflect the lever 690; while a tray passing into the unready-item position will deflect the arm 694. On the upper belt run D, a tray discharged from the unready-item elevator will deflect the arm 696; a tray discharged from the ready-item elevator or passing through the ready-item discharge zone will deflect the arm 697; and a tray passing out of the ready-item zone will immediately deflect the arm 700. If any one of these arms is deflected, the arm 581 (Fig. 40b) will be moved into position to engage the lug 584 on the extension 579 of the clutch latch 572, thus preventing the clutch 570 from being thrown into engagement, or if already engaged, to prevent the repetition of a clutch cycle.

It will be noticed (Figs. 33, 37 and 38) that spring pressed levers 690 and 694 along the lower conveyor run d and the similar levers 696, 697 and 700 along the upper conveyor run D are so placed that should any tray be in a zone in which operation of the mechanism controlled by the clutches 561 and 570 might interfere, a tray in those zones by deflecting any of the levers will prevent the engagement of the clutches. However, a tray awaiting discharge from the ready-item position or unready-item position will not deflect the levers 690 or 694 and hence, the clutch 570 may be engaged by withdrawing the latch 578 (Fig. 40b) by mechanism previously described, provided, of course, that there are no trays on the upper conveyor run D depressing the levers 696, 697 and 700. Should the clutch 570 be turning while a tray is deflecting any of the spring pressed levers, the lug 584 will be in the path of the arm 581 preventing it from moving into position under the lug. This will not prevent the turning of the shaft 582 and thus arrest the movement of the trays, as the spring between the crank 583 and the depending tail of the arm 581 will yield. When the cam groove 575 drops the latch arm 572 into declutching position, the arm 581, impelled by the spring, will snap under the lug 584 and prevent the clutch 570 from again rotating until the arm 581 is again withdrawn by a tray or trays clearing the spring pressed levers.

As shown in Figs. 37 and 42, a crank on the shaft 582 is connected by a link 705 to an arm 706 of the latch 669 which is similar to the latch 666 shown in Fig. 42. Each time the shaft 582 is rocked, the actuation of the latch 669 thereby will permit the stop control finger 660 to swing inward and the stop fingers 663 (Fig. 33) will move out of the path of the tray rail in the set-up position. This mechanism permits the entrance of a subsequent tray into the elevator zones on the lower belt run d after a tray has been delivered to the unready-item elevator and no tray has been simultaneously delivered to the ready-item elevator. A tray traveling along the lower conveyor run d to the unready-item elevator will actuate both stop control fingers 660 and 650. The stop control finger 660 will be restored when the tray rail strikes the arm 672a (Fig. 43) on being delivered into the unready-item elevator but the stop control finger 650 cannot be restored by the similar arm 672 (Fig. 41) as no tray is being delivered into the ready-item elevator. However, as the tray passed from the ready to unready-item position, it deflected the spring pressed lever 694 (Fig. 38) which rocked the shaft 582, and, through the mechanism previously described, unlocked the stop control finger 650 which was then restored to its normal inward position.

The kitchen or dispensing station

The trays after being pushed out of the elevators and deposited upon the upper run D of the dispensing conveyor, are carried out into the kitchen K where a number of machines are provided for preparing and dispensing food. In Figs. 1 and 2 only two such machines are indicated at 710 and 711, but in actual practice there could be a number of such machines located at various points along the conveyor on one or both sides. Some of these machines, such as that indicated at 711, would dispense prepared foods, others such as the griddle cake machine 710 would prepare foods on order.

Figs. 44 and 45 illustrate the mechanism used to arrest a tray at a machine which dispenses ready foods. It will be recalled that the tray lugs 333 used for ready items are on the rail 325 of the tray which is the leading rail when the trays are on the upper run D of the dispensing belt. Adjacent each dispensing machine is a pair of levers 715 fixed on a transverse shaft 716. The latter is journaled in bearings carried by side frame members 717. Rising from the frame members are guide plates 718 between which the tray rails are confined thereby keeping the tray centered on the belt run D and the tray lugs in proper alinement with mechanism to be controlled thereby.

As shown in Fig. 45 the two levers 715 are located on opposite sides of the belt run D and are alined with portions of the tray rails that are not recessed. Normally the levers occupy the position shown by broken lines in Fig. 44 and have cam heads 719 that project above the plane of the belt run D so that when a tray rail strikes the cam heads 719 it will swing the levers to the position shown in full lines. A number of cam fingers 720 are carried at the opposite end of the levers 715. These cam fingers are arranged in groups of three and will be positioned under a corresponding number of lugs 333 which control the operation of a particular set of dispensing machines. Each group of three lugs will control six dispensing machines of a particular type of commodity and as beverages, salads, soups or desserts, etc., and as four groups consisting of three lugs each are mounted on the tray rail 325, a total of twenty-four dispensing machines, each represented by a key on the keyboard machine as previously described, may be used. The cam fingers 720 are pivotally mounted on the levers 715 and each finger has a depending arm 721 which is pressed against a stop pin 722.

When the levers 715 are depressed by a tray rail 324, the cam fingers are swung up into the path of the lugs 333 on the forward rail. The cam fingers are formed with sloping edges 723 and as the rail 325 rides over the cam fingers, such lugs as are alined with the fingers and which have not been moved out of their normal vertical position, will engage the sloping edges and depress the fingers. Other lugs, however, which have been raised to horizontal position will pass over the fingers without disturbing them. Thus the passage of a tray rail 325 over the fingers will result in a momentary setting of the fingers in raised and lowered positions depending upon the particular lug setting carried by the rail. A bail 724 bears against the ends of the fingers. Certain of the fingers are slotted as indicated at 725, others are cut away as indicated at 726 to clear the bail when they are in raised position. If the lugs 333 carried by a tray are of the proper setting the cam fingers will be so set by the lugs when they ride over them as to form a clear passage for the bail 724 to enter.

The bail is fixed upon a transverse shaft 727 journaled in brackets 728 carried by the frame members 717. A second transverse shaft 729 is also journaled in the brackets 728, below the shaft 727. Secured to the shaft 729 near opposite ends thereof are two arms 730 which provide sliding bearings for a pair of dogs 731. These dogs are urged upward by springs 732, but are normally held in depressed position by arms 733 which project from the shaft 727 and engage pins carried by the dogs. When, however, the cam fingers 720, through combination actuation by the lugs 333, are set to form a recess into which the bail may enter, the dogs 731 are released and spring up into position to engage the rail 325 and arrest the tray.

In arresting the tray the arms 730 are swung toward the right as viewed in Fig. 44 rocking the shaft 729. The latter is connected by a crank 734 and link 735 to mechanism (not shown) which actuates or initiates the operation of the dispensing machine. When the dispenser has completed dispensing, it pulls a link 736 connected to an arm 737 fixed on the shaft 727. This withdraws the bail 724 from the cam fingers and also withdraws the dogs 731. Whereupon the tray is released and proceeds on its way, while springs 738 restore the arms 730 to the position illustrated, with stop pins 739 carried thereby bearing against the bracket 728. This returns the crank arm 734 and link 735 to normal position. As soon as the bail 724 is withdrawn from the cam fingers 720, the rail 324 having already cleared the cam heads 719, the levers 715 will swing by gravity to normal position.

Fig. 45a illustrates the mechanism used with the machines that prepare food on order. The mechanism is very similar to that above described and corresponding parts are given the same reference numerals with the suffix "a". It will be observed that the levers 715a differ from levers 715 and that the cam fingers 720a are mounted on the opposite end of levers 715a where they will be actuated by the lugs 332 on the rail 326. The levers 715a normally occupy the position indicated by broken lines with their right hand ends, as viewed in Fig. 45a, projecting into the path of the rail 325. As the latter rail rides over these projecting ends the cam fingers 720a are raised into position to be engaged by the tray lugs 332. When the right combination of tray lugs has been set up, the tray will be arrested by the dogs 731a and the shaft 729a will be rocked, pulling the link 735a. This will cause the food preparing machine to dispense the food prepared thereby. When the food preparing machine has delivered the food, the link 736a is pulled releasing the tray and permitting the parts to return to normal position.

Machines which prepare food on order, such as the wheatcake machine 710, are started by a solenoid 712 (Fig. 36), the circuit of which is set by the depression of the proper commodity key 103. As previously described, each group of six commodity keys controls the closing of three pairs of electrical contact fingers 118 (Fig. 5) which in turn control the circuits of the solenoids 474 and 478 (Fig. 33) in the set-up position. The solenoids 478 set the lugs 332 to determine at what commodity preparing machine the tray is to be arrested. At the same time that the solenoids 478 are energized, selective relays 713 (Fig. 36) which are in parallel electrical connection with the solenoids, are actuated. The selective relays operate to open or close switches 714 and thereby connecting a particular solenoid 712 to power, depending upon which relay or what combination of two relays is actuated.

While the tray is passing along the lower conveyor run d up the slow or unready-item elevator and thence along the upper run D sufficient time will elapse for the commodity preparing machine to complete its function and have its commodity ready for delivery when the tray arrives. The tray on its arrival at the commodity preparing machine will, through the combinations set on the lugs 332 and the mechanism shown in Fig. 45a, cause the machine to dispense the food it has prepared. It is understood that each commodity preparing machine after it has prepared an order of food will store the same until the tray arrives to receive it. Hence it is not necessary to time the travel of the tray to the exact period of time necessary to prepare each food, but it is important that it shall take longer for the tray to reach the food preparing machine than for the latter to prepare the food. When the tray reaches the machine the dispensing act is just like that of machines in which the foods are already prepared, the only difference being that in one case the arresting of the tray to receive a food item is controlled by lugs on the after tray rail and in the other by the lugs in the leading tray rail.

*The serving station*

From the kitchen the trays are conveyed to the serving counters. Obviously, the counters might be placed on the same floor as the kitchen in which case the dispensing conveyor would continue through the serving station. However, in the particular embodiment illustrated, the serving station is located on a floor below that which supports the kitchen, and an elevator is provided to pick the trays off the dispensing conveyor, carry them down to the floor and deposit them on the counter conveyor B. The elevator may be of any suitable type and hence is not here described in detail.

The counter conveyor consists of an endless belt B which runs between a pair of counters S, and is supported on opposed belt wheels 740 and 741 (Fig. 2). One of these wheels 741 is driven continuously by a motor 742, see also Fig. 36. The counters consist of shelves 743 and 744 (Fig. 46) carried by transverse beams 745 which are mounted on uprights 746. Between the uprights, the beams 745 are depressed to pass under the upper run of belt B, and on these beams are secured rails 747 (Fig. 47) which serve as longitudinal supports for said belt run. Inverted channel beams 748 connect the transverse beams 745.

A casing 749 encloses and is secured to the uprights 746 forming a long corridor or chamber 750 in which is located certain cam mechanism which will be described hereinafter. The lower or return run of the belt B passes through the corridor under said cam mechanism. Above the shelves 743 and 744 there is a housing 751 which is divided lengthwise by two walls 752 and 753 to form a central corridor 754 through which passes the upper run of the conveyor belt. Through this corridor the trays are carried by the belt B. At each side of the corridor 754 are ante-chambers 755 and 756 respectively, into which the trays are pushed from the belt. These chambers serve as reserve spaces in which the trays may be retained before passing out upon the serving counters.

As indicated in Figs. 2 and 46, the counters S are divided into individual serving spaces O by means of low partitions 756 secured to the shelves 743 and 744 respectively. The serving spaces of one counter are staggered with respect to those on the other counter. In other words, the partitions 756 on one shelf come opposite the middle of the serving spaces on the other shelf. There is an ante-chamber 755 opposite each serving space on shelf 743 and an ante-chamber 756 opposite each serving space on the other shelf 744, the ante-chambers on each side being separate from one another by pairs of spaced partition walls, as indicated at 757 and 758 in Fig. 48.

In the conveyor corridor 754 are a number of "stop positions", one opposite each ante-chamber, where trays may be arrested. At each "stop position" feeler mechanism is provided for testing the seat lugs of a tray and, if the lug setting corresponds to the setting of any feeler mechanism, the tray is arrested and slid laterally into the adjoining ante-chamber. Since the seat lugs are on the forward or leading tray rail 324 when tray is on the belt run B, the feeler and stop mechanisms are located near the forward end of each "stop position" so that when a tray is arrested, it will be alined with the ante-chamber into which it is to be moved.

*Seat lug feeler mechanism.*—The feeler and stop mechanisms are illustrated in Figs. 48 to 52 inclusive and it will be observed that they are somewhat similar to the mechanisms used to arrest the trays at dispensing machines in the kitchen. At each "stop position", a transverse stud 760 is secured in the beam 748 and provides bearings for a number of cam fingers 761. These fingers are arranged in two groups of three, one on each side of the belt B, there being a finger for each seat lug. Each finger is held in raised position by a spring 762, as shown in Fig. 50. An angle 763 fixed to the beam 748 enters recesses 764 in the fingers 761 providing a stop against which all of the fingers are pressed by their respective springs, and by means of a comb 764a mounted on the depending leg of the angle, the fingers are guided at their outer ends.

When in raised position, the fingers 761 project into the path of the seat lugs 327 and, as the tray passes over the fingers, such seat lugs as are in normal vertical position will depress the fingers they encounter while seat lugs that have been raised will pass over the fingers without touching them. As in the case of the cam fingers 720, certain fingers 761 have recesses 765 in their forward end faces and others are cut away at their lower edges as indicated at 766. A transverse shaft 777 is journaled in brackets 778 secured to an adjacent beam 745. Fixed on this shaft are two bails 779 located respectively opposite the two groups of cam fingers 761. Another transverse shaft 780 is journaled in brackets 781 secured to the beam 745. Fixed on the shaft 780 and located respectively near opposite ends thereof, are two upright arms 782 which provide sliding bearing for a pair of dogs 783. Fixed to the shaft 777 are arms 784 which engage pins 785 projecting laterally from the dogs 783.

Normally the bails 779 are obstructed by engagement with one or more of the cam fingers and hold the arms 784 in such position as to depress the dogs 783 against the pull of springs 786. When the cam fingers 761 are depressed by a proper setting of seat lugs, the obstruction to the bails will be removed, permitting the dogs to rise to the position shown in Fig. 51 so that they will engage the rail 324. The tray will then swing the arms 782 to vertical position against the pull of springs 787, and when the arms 782 strike the cross-beam 745, as shown in Fig. 52, the tray will be arrested. As the arms 782 are swung to this position the shaft 780 is turned and a crank 788 fixed on this shaft pulls a link 789 pivotally connected to the outer end of said crank. This initiates the operation of mechanism for pushing the tray into the adjoining reserve space and thence to the counter.

As shown in Fig. 49, the lugs 332 on the rail 326 are disposed so that they cannot operate the cam fingers 761. However, as may readily be seen in Fig. 21, a portion of the lugs 333 on the rail 325 are in alinement with the lugs 327 on the rail 324 and would, if in vertical position, deflect the cam fingers 761 were it not for the fact, as will be hereinafter described, that the lugs on the rail 325 are restored to horizontal position before the tray enters the conveyor corridor.

Under each serving space is a pair of guide rods 790 which extend to the central beams 748. Each pair of rods 790 provides sliding support for a cross head 791. At each end of the cross head is a pusher finger 792. These pusher fingers enter the recesses 606 formed in the tray rails 324 and 325. It will be understood, of course, that the recesses engaged by the pusher fingers are those on the ends of the rails nearest the ante-chamber into which the tray is to be pushed, and that because of the staggered arrangement of the serving spaces the cross heads are alternately disposed on opposite sides of the belt conveyor corridor, as clearly shown in Fig. 48.

Before a tray is pushed out of the conveyor corridor 754, it must be raised clear of the belt B. To this end a pair of tray lifters is provided at each "stop position". The tray lifters comprise lifter rails 793 (Figs. 48 and 49) positioned under the tray rails 324 and 325 respectively when a tray is arrested over them. The lifter rails 793 are centrally recessed to pass under the belt B and its longitudinal supports 747, but at each side of the belt, the lifter rails provide bearing surfaces for the tray rails. The lifter rails are supported at each end on bellcranks 794 and 795. The bell-cranks 794, which are farthest from the ante-chamber into which the tray is to be pushed are fixed upon a common shaft 796 journaled in opposed cross beams 745, while the forward bell-cranks 795, or those nearest the pusher fingers 792, are freely journaled on the ends of shafts 796 which project through the cross-beams 745 from the "stop positions" at each side (see also Fig. 60). A link 797 connects each pair of bell-cranks 794 and 795, and hence by turning the shaft 796 all of the bell-cranks of the stop position in which it is operatively located, will be oscillated to raise or lower the lifter rails carried by said bellcranks.

Normally the lifter rails are in the lowered position illustrated in Fig. 49 and clear the tray rails, but when raised they lift the tray rails clear of the belt B. The forward lifter rail at each stop position, i. e. the one adjacent the feeler mechanism is preferably formed with a rib 793a (Fig. 60) which serves as a guide for the forward tray rail 324 when the tray is pushed out of the conveyor corridor.

*Cam and clutch mechanism.*—Extending longitudinally through the corridor 750 (Figs. 46, 47 53 and 54) is a main shaft 798 which is driven by the motor 742 through a reduction gear (Fig. 2). The shaft is journaled in suitable bearing brackets 798a carried by yoke beams 799 spanning the corridor just above the lower run of the belt B. The yoke beams are bolted to longitudinal beams 800 secured to the uprights 746. There is a yoke beam under each stop position and between the yokes, the beams 800 are supported on adjustable pedestals 801 resting on the floor. By this means the counter unit may be vertically and horizontally alined despite variations in the floor level. As shown in Fig. 54, guide plates 802 are hung from the yoke beams 799 and support the lower run of the belt B.

A cam group is provided for each stop position to operate the tray lifters, the tray pushers and certain ante-chamber closures. Each cam group comprises a cam wheel 803 journaled on the main shaft 798 and a clutch 804 for operatively connecting the cam wheel to the shaft. The clutch, as shown in Fig. 54, is similar to that used on the keyboard machine and described above, comprising a spring-pressed clutch lever 805 mounted on the cam wheel and carrying a pin which projects radially through the hub of the cam wheel to engage a toothed clutch wheel fixed on the main shaft 798. Normally, the clutch is held in disengaged position by a latch lever 806 pivoted on the adjacent bearing bracket 798a. An offset arm 807 of the lever 806 is connected to the lower end of the link 789, so that when the dogs 783 of the tray stop mechanism engage and stop a tray and the link 789 is pulled, it will draw the latch lever 806 against the pull of a spring 807a out of engagement with the clutch lever 805, permitting the clutch pin to engage the shaft and connect the cam wheel 803 to power.

The cam wheel 803, shown in Figs. 46, 47 and 54, is adapted to control the movements of a tray which is to be pushed toward the right as viewed in said figures. On one face of the cam wheel is a cam groove 808 engaged by a roller carried by an arm 809 pivoted on the yoke beam 799. A link 810 connects this arm of the lever to a crank-arm 811 (Figs. 48 and 49) on the shaft 796 of the tray lifters. As soon as the cam turns from the normal position shown in Fig. 54, it pulls the link 810 and the tray lifters are operated to raise the tray off the belt.

An oppositely disposed and laterally offset arm 812 (Fig. 53) fixed to the arm 809 has a push rod 813 pivotally connected thereto. The upper end of this rod is connected to a lever 814 (Figs. 47 and 48) located just outside of the forward side wall 758 of the ante-chamber into which the tray is to be pushed. The lever 814 is fixed to a shaft 815 which runs through the chamber and carries a companion lever on the opposite side of the chamber. A rail 816, which serves as a guide for the trays carried by the conveyor belt B, normally bars entry into the ante-chamber. This rail is drawn upward by the levers 814 to clear the way for the tray.

The mounting of the guide rails 816 is best shown in Figs. 61 to 63. The rail 816 is formed with rollers 818 which fit under the rim of the tray preventing the tray from tilting while riding on the belt and consequently the rollers must be withdrawn before the rail can be lifted. To this end the guide rail is secured to a link 819 at each end and the links are fixed on a rod 820. The latter projects into slots 821 formed in a pair of plates 822 mounted to slide against the opposite walls 758 of the ante-chamber. These walls have vertical slots 823 into which project the ends of the rod 820 and pins 824 carried by the slide plates 822. The pins 824 are connected by links 825 to the levers 814 so that when the levers are lifted by the pusher rod 813 the slide plates are constrained to move vertically by engagement of the pins 824 and rod 820 with the slots 823.

Each link 819 has a cam slot 826 therein engaged by a pin 827 carried by the adjacent slide plate 822. Normally the parts occupy the position shown in Figs. 61 and 62 with rod 820 at the top of slots 821 and the pins 827 at the bottom of the cam slots 826. When the slide plates are raised there is initially a relative movement of said plates with respect to the links 819 due to gravity aided by the tension of a spring 828, with the result that the pin 827 rides up the cam slot 826 causing the links 819 and the rail they carry to swing to the position shown in Fig. 63, in which position the rollers 818 are clear of the tray rims, and, thereafter, further lift of the levers will raise the rails 816 to clear the tray as it moves into the antechamber.

The initial act of the cam 803 is to lift the tray off the conveyor belt and raise the guide rails 816, as just explained. The next act of the cam is to push the tray into the ante-chamber 756. This is effected by an arm 830 connected at its upper end by a link 831 to the cross head 791. The arm 830 is pivoted at its lower end on a stud 832 projecting from the next yoke beam 799 to the rear, and roller on the arm 830 engages a groove 833 in the rear face of the cam wheel, as best shown in Fig. 47. The groove is of such form as to hold the arm stationary while the tray lifters and rail 816 are raised and then to advance the cross head along the guide rods 790, so that the tray being engaged by the pusher fingers 792, will be slid into the ante-chamber 756. Guide rails 834, Figs. 46 and 47, extend under the ante-chamber and the serving space to support the tray rails as the tray is moved by the pusher fingers and the shelf plate 744 which overlies these rails is formed with slots to clear the posts 323 of the tray.

When the tray has entered the ante-chamber, the cam acting on arms 809 and 812 returns the tray lifters and the guide rail 816 to normal position, and if the customer has not inserted the proper token in the serving space, the cam is arrested by a latch 835 (Fig. 54) which engages the clutch lever 805 and disengages the clutch.

*The token receiver and control mechanism.*—A token receiver 836 (Figs. 46, 66 and 67) is provided at each serving space beneath the shelf plate 743 or 744 as the case may be. The token receiver is mounted to oscillate on a stud 837, but is normally held in the position shown in Fig. 67, by a spring-pressed latch 838 engaging a pin 839 projecting from an adjacent crossbeam 745. A token 253 is inserted through a slot formed in the shelf plate 744 into the receiver, being guided by grooves 840 in the side walls of the receiver. As the token is pushed down into these grooves, it engages and rocks a bell-crank 841. The latter is connected by a spring 842 to another bell-crank 843 fixed on a shaft 844. An arm of the latter engages a pin 845 on a member 846 which is mounted to slide transversely to the grooves 840. The member 846 carries pins 847 adapted to engage holes 848 formed in the token. Each token receiver has its own characteristic arrangement of pins 847 and the tokens must have an arrangement of holes to correspond with the arrangement of pins in the receiver into which it is to be inserted. If the right token 253 is inserted in the receiver, it will be locked therein by entrance of the pins 847 into the holes 848 as the member 846 is slid toward the token by the spring connection 842 between the two bell-cranks, but if a wrong token is inserted, the pins cannot enter the holes and, on releasing the token, the latter will be thrown out of the receiver by a spring 849 acting on the bell-crank 841.

Fixed upon the shaft 844 outside of the token receiver is a lever 850. Adjacent the token receiver is an electric switch comprising a pair of spring fingers 851 projecting from a block of insulation 852 secured to the beam 745. These fingers are normally separated but are adapted to be moved into mutual engagement by a switch lever 853 depressing one of the spring fingers. When a proper token is inserted in the receiver and the bell-crank 843 is turned far enough to lock the token therein, the arm 850 which moves with the bell-crank 843 will be swung far enough to snap past an arm 854 of the switch lever 853 thereby oscillating said lever sufficiently to contact the fingers 851. This momentarily closes the circuit of a solenoid 852a, (Figs. 36, 53 and 54). The plunger of this solenoid is connected to one arm of a lever 853a, another arm of which is drawn downward against a stop by a spring 854a. The lever 853a is fixed to turn with the latch 835. Whenever the solenoid 852a is energized, this latch is raised to release the clutch lever 805. In such raised position the latch 835 is held by a spring-pressed catch lever 855a which hooks over a rearward extension of the latch 835.

Thus, if a token is inserted before the clutch has been disengaged by the latch 806 the latch 835 will be held in such position that it cannot operate to arrest the cam when the tray has been pushed into the ante-chamber and hence, under action of the cam 803 acting on arm 830, the tray will proceed without interruption out to serving position on the counter. If, on the other hand, the tray has been arrested by action of latch 835 it will resume its travel as soon as the proper token has been inserted in the token receiver.

A pin 856a carried by the cam is adapted to strike an arm 857a of the catch lever after the clutch lever 805 has passed the latch 835, releasing the latter and permitting the spring 854a to restore the latch to latching position. After the clutch lever has cleared the latch 835 it is arrested by a latch 858a which disengages the clutch after the cam wheel 803 has rotated through slightly more than 180 degrees.

In the outer wall of the ante-chamber is a vertically slidable door 857 (Fig. 47) which is normally locked in closed position to prevent anyone from reaching into said chamber and helping himself to food therein. This door must be opened before the tray can move out upon the serving counter. The door is arranged to slide in vertical slots formed in the side walls 758 and is connected by links 856 to arms 858 fixed upon a common shaft 859 which runs parallel to the shaft 815. Springs 860 acting on the arms 858 hold the door normally in closed position. A crank 861 fixed on the shaft 859 has pin-and-slot connection with one end of a link 862, the other end of which is pivotally attached to one arm of a lever 863. The other arm of this lever bears a roller which runs in a cam groove 864

(Fig. 54). A spring-pressed latch 865 (Fig. 47) pivoted on an adjacent wall 758 normally engages a lug 866 on the arm 861 locking the door in closed position. A tail 867 on the latch is formed with a heel which bears against a pin 868 on the link 862. When the cam, acting on the lever 863, pulls the link 862, the pin 868 acting in riding by said heel deflects the tail 867, withdrawing the latch 865 from the lug 866, and, the lost motion between arm 861 and link 862 having been taken up, the link then pulls the door open. This takes place immediately after the clutch lever 805 has cleared clutch latch 835, and continued movement of the cam wheel thereafter causes the cross head 791 to slide the tray out upon the serving counter.

At one end of the cross head 791 there is a plate 870 (see Figs. 47, 48, 49 and 66). The forward end of the plate is adapted to pass under a stud 871 on which the receiver latch 838 is journaled, while a pin 872 lifts a tail 873 of said latch releasing the latch from engagement with the pin 839. A shoulder 874 of the plate 870 then strikes the stud 871 and oscillates the token receiver about its shaft 837 to the position shown by broken lines in Fig. 66, the stud in the meantime riding into a vertical slot 875 formed in the plate. As the token receiver moves to the broken line position, a tail 876 (Fig. 67) on the lever 850 engages a pin 877 projecting from the cross beam 745 turning the shaft 844 sufficiently to withdraw the pins 847 from the token in the receiver. Thereupon the arm 841 urged by spring 849 ejects the token from the receiver. Since the receiver has been swung through an angle of 90 degrees from its normal position the token is thrown out horizontally and drops into receptacle 878, Fig. 46. This receptacle is hinged to the casing under the counter shelf but is normally locked in the position illustrated. An authorized person may unlock the receptacle and swing it back on its hinges to empty out the tokens accumulated therein.

When the customer or patron has completed his meal, the cross head 791 automatically withdraws the tray as will be explained presently. The token receiver is drawn back to normal position by engagement of stud 871 with the recess 875 and the latch 838 then locks the receiver in position to receive another token. In the meantime, the arm 850, having returned to normal position with respect to the receiver, does not project into the path of the arm 854 and hence does not actuate the switch lever 853 on return of the receiver to normal position.

*Seat control mechanism.*—The seat H in front of the serving counter has a stem 880 (Fig. 46) which slides in a tubular post 881. A spring 882 holds the seat normally in slightly raised position. When a customer sits on the seat the latter is slightly depressed thereby setting certain control mechanism which operates to release the latch 858a when the customer leaves the seat. This mechanism is not set until after the tray has moved out on the counter.

The seat control mechanism is illustrated more particularly in Figs. 54 to 59 inclusive. The lever 858a is fixed on a shaft 883 journaled in an arm of the bracket 798a. A depending arm 884 is fixed to the shaft 883 and is formed at its free end with a lateral extension 884'. The arm 884 is normally held in the position shown in Figs. 54 to 56 and Fig. 59 by engagement of said extension with the notched arm 885 of a three-armed latch lever. The latter is formed with a rearwardly disposed arm 886 and an intermediate vertically disposed arm 887 and is fixed on a shaft 888, as clearly shown in Fig. 58. A spring 889 holds the arm 885 in latching position. Freely journaled on the shaft 88 is a control lever having three arms 890, 891 and 892 respectively. The arm 892 is connected by a link 893 (Fig. 54), bell-crank 894, link 895 (Fig. 46), bell crank 896 and link 897 to the lower end of the seat stem 880 so that, when the seat H is depressed, the control lever will be swung from the position shown in Fig. 55 to that shown in Fig. 56 with the arm 891 bearing against a stop pin 898. A spring 899 aids in swinging the control lever to the latter position, but said spring is overpowered by the spring 882 in the seat post so that when the weight is taken off the seat H the parts will return to their original position, unless in the meantime the tray has moved out to serving position, as will be explained presently.

The arm 890 of the control lever bears a stud 900 on which are fulcrumed a trigger lever 901 and a catch lever 902. A spring 903 connects levers 901 and 902 with a shoulder of the catch lever bearing against a stop pin 904 on the trigger. On the other hand a spring 905 connects the trigger 901 to the control lever with a heel portion 906 of the catch lever 902 resting on the hub of the control lever. The heel 906 is of such width as to just clear a pin 907 on the arm 887 of the latch lever. Hence, with the trigger in normal position with respect to the control lever, as shown in Fig. 55, the seat H may be raised and lowered without affecting the latch 885. However, when the cam wheel 803 turns sufficiently to be arrested by the latch 858a, a pin 908 carried by the cam wheel, strikes and depresses the trigger 901 against the pull of spring 905. If the seat is unoccupied when this occurs, the heel 906 will be detained by the pin 907 and the spring 903 will be extended, but as soon as the seat is depressed the control lever will swing to the position shown in Fig. 56 drawing the heel 906 clear of pin 907. If the seat has already been occupied, the heel 906 will have been drawn clear of the pin 907 before the trigger is depressed. In either case, after the seat H is occupied and the trigger is depressed, the parts will assume the position shown in Fig. 56. When, thereafter, the patron leaves the seat, the spring 882 will return the control lever to its original position and the end of the heel 906 will strike the pin 907 lifting the latch 885 to the position shown in Fig. 57. Thereafter, except under conditions presently to be explained, a spring 910, acting on arm 884, will swing the arm 884 thus turning shaft 883 and withdrawing latch 858a from engagement with the clutch lever 805. This connects the cam wheel to power and permits it to resume its rotation until it is brought to a stop in its initial position by the latch 806.

During its latter rotary movement the cam wheel operates to return the tray pusher to its initial position returning the tray to the belt B. In timed relation to this movement, the door 857 is raised and then closed behind the tray, the guide rail 816 is raised and then lowered after passage of the tray into the conveyor corridor 754, and the tray lifters, acting with the guide rail, rise to guide the tray across the belt B and then drop to deposit the tray upon the belt B. The latter then carries the tray off.

On the return stroke of the tray pusher (Fig.

47) a slight overthrow is provided to take up the clearance between the pusher fingers 792 and the tray rail slots 606 and thus center the tray on the belt. This causes the upper end of the arm 830 to press a pair of spring contact fingers 911 into mutual engagement, thereby momentarily closing the circuit of the keyboard solenoid 200 (Figs. 4 and 36) corresponding to the serving position from which the tray has been withdrawn. The solenoid thus energized withdraws the detent 198, releasing the seat key held thereby and permitting the latter to rise to normal position under pull of its spring 196a (Fig. 8). The key may then be depressed for another patron.

Mechanism similar to that just described for pushing trays to and from the counter at the right, as shown in Fig. 46, is provided for pushing the trays to and from the counter at the left. However, the positions and direction of movement of certain parts are reversed. Thus, for trays that are to be delivered to the left hand counter, cam wheels 803a (Fig. 53) are used, which differ from cam wheels 803 merely in the shape of the cam grooves cut therein. Arms 830a are actuated by the cam 803a to operate the tray pushers for the left hand counter and they are pivoted on studs axially alined with the studs 832 on which the arms 830 are pivoted. The lever 812a (Fig. 47) which operates the tray lifters and the guide rails through rods 810a and 813a respectively are located on the left hand side of the main shaft 798 and the cam 803a is accordingly modified. The same is true of the link 862a and its actuating lever 863a which opens the door in the ante-chamber 755. However, the positions of the clutch latches are relatively the same for cam 803a as for cam 803. Hence the control mechanisms operated by the seats for the left hand counter are also located on the right hand side of the main shaft.

*Interlocking control mechanism.*—As explained previously, the serving spaces on one counter are staggered with respect to those on the other; hence, as shown in Fig. 53, the cam mechanism controlling the movement of trays to and from the right hand counter, alternates with the cam mechanism controlling movement of trays to and from the left hand counter. Because of the staggered relation of the serving spaces, whenever a tray is returned to the belt B from one serving space it will obstruct return of trays from two serving spaces on the opposite counter. Also, during the time a tray is returning to the belt from one serving space, it must prevent the return of a tray adjacent and forward to its position. This is necessary as it is obvious that if a forwardly adjacent tray should attempt to return just after the tray to the rear has begun to return, there would be a clash between the trays as the rearward tray would not have been carried clear of the forward tray position by the belt B. The mechanism to be described will prevent the return of the two trays opposite and the tray forwardly adjacent to the tray being returned until the returning tray is placed upon the belt B. Thereafter, other mechanism will cooperate to control the return of the detained trays to the belt. Interlocking control means are, therefore, provided whereby, whenever a latch 858a is released, the corresponding latches of the cam to the rear and the two cam positions forward thereof are locked against release.

The shaft 888 is made up of independent sections designated in the drawings by suffixes *a, b* and *c* (Fig. 53). The section which carries the trigger 901 and arm 885 (Figs. 54 and 58) of one tray stop position, extends forward to the next tray stop position. At each tray stop position there is a bracket providing a bearing 915 for the rear end of one shaft section (section 888 in Fig. 58) and a bearing 916 for the forward end of the next shaft section (888a) to the rear. Fixed upon forward end of section 888a is a crank 917 (Figs. 55 to 58) which is connected by a link 918 to one arm 919 of a lever fixed on a shaft 920. The other arm 921 of this lever is alined to engage with the offset of the adjacent arm 886. The shaft 920 is also made in independent sections designated by suffixes *a, b* and *c*, which parallel the sections of the shaft 888. The rear end of each section of shaft 920 journaled in a yoke beam 799, the forward end being supported in a recess in the hub of the arm 919 on the next shaft section ahead, as shown in Fig. 58. Fixed on the forward end of the shaft section 920 is an arm 922 which is spring connected to a lever 923 journaled on the shaft section. The upper end of the lever 923, like the arm 921, is adapted to engage with the offset of the arm 886. Thus, when the shaft section 920 is turned, the arm 922, through its spring connection, will cause the lever 923 to turn with it and the lever 923 will be in the path of the offset of the arm 886. However, if the offset of the arm 886 happens to be in the path of the lever 923, which would be the case should a cam controlled by that particular arm be in the process of delivering a tray to the belt B, the shaft section 920 would not be prevented from turning as the spring connection between the arm 922 and the lever 923 would yield.

When the latch arm 885 is raised to the position shown in Fig. 57, the shaft section to the rear 888a (see also Figs. 53 and 58) cannot be turned because the arm 921 is blocked by the offset of arm 886. At the same time the latch 885b at the next tray stop position forward will be prevented from operating because the arm 921b of said forward position will be swung under the offset of the arm 886b of said forward position preventing said latch from releasing. Simultaneously, as shaft section 920b turns with the arm 921b of the forward position, the lever 923c will be swung under the offset of the arm 886c, preventing the operation of the latch 885c which controls the return of the tray at the station forwardly adjacent to the returning tray. Thus, whenever one latch arm 885 is operated to release the arm 884, the next two arms 885 forward and the arm 885 to the rear will be blocked. In other words, when a tray is returning to the conveyor belt B, a tray cannot at the same time be returned from either of the two opposite or the forwardly adjacent serving spaces. However, if a tray has begun to return from the forwardly adjacent serving space, it will not prevent the tray to the rear from returning also as, in such an event, the forwardly adjacent tray will reach the belt B before the tray next to the rear, and there will be no clash of trays. As shown in Fig. 53, should the latch 885c operate to release its cam 803, the offset of the arm 866c will drop into the path of the lever 923c. This will not prevent the shaft sections 920b and 888 from turning, owing to the spring connection between the lever 923c and the arm 922c fixed on the shaft 920b and, hence, the latch 885 may turn to release its cam 803.

To return the parts to normal position after a clutch has been engaged by release of a latch arm 858a, an arm 924, Fig. 54, is secured to the shaft 883. When latch arm 858a is swung to releasing position, the arm 924 is swung into the path of a roller 856a, carried by the cam wheel. As this roller wipes past the arm 924, it swings the arm 884 back to latching position.

As shown in Fig. 57, the arm 884 is unlatched and the latch 885 is being held in raised position by mechanism operated by the return of a seat H. It will be noticed that in this position, as soon as the cam 803 begins to rotate, the roller 908 affixed thereto will move out of the path of the trigger lever 901 which will allow the heel 902, under impulse of the spring 905, to clear the pin 907. This action would normally allow the latch 885 to drop as soon as the cam 803 began to turn and thus permit the particular shaft sections 888 and 920 to return and release the locking mechanisms controlling the return of the trays at the two opposite and the forwardly adjacent serving positions. However, these serving positions must be locked by this mechanism until the returning tray is placed on the conveyor where other mechanism, to be hereinafter described, will come into play to control the return of the detained trays. The latch 885 has at its engaging end a projection 925 which, when the heel 902 clears the pin 907, will permit the latch 885 to rest on the lateral extension 884' of the arm 884. In this position, the latch 885 will not permit the particular shaft sections 888 and 920 to return but, as soon as the pin 856a strikes the arm 924, which engagement is timed to take place when the returning tray is placed on the belt B (see also Fig. 54), the arm 884 swings its lug clear of the projection 925 and the latch 885, with the particular shaft sections 888 and 920, is restored by the spring 889 to the position shown in Fig. 55. Thus, through cooperation of the projection 925 and the pin 856a, the locking mechanism controlled by shaft sections 888 and 920, will prevent the movement of trays which would interfere while another tray is being returned to the belt B.

As previously mentioned, means are provided to control the return of trays to the conveyor belt B by a tray already on the belt. It is obvious that should a tray be returned to the belt while another tray on the belt is advancing nearby, a clash might result between the trays. Hence, the trays on the belt are given right of way over trays that are to be returned to the belt, and about each tray on the belt there is a safety zone extending five to six tray stop positions ahead and two to one positions respectively behind, the tray, and this zone progresses with the tray. The clutch latches 858a are locked so that no tray may start back from any of the serving spaces on either counter embraced within this safety zone.

The mechanism for locking the safety latches in the safety zone is illustrated in Figs. 47, 48, 53, 54, 58, 59, 64 and 65. At each side of the conveyor corridor are provided arms adapted to be deflected by the rim of a tray conveyed by the belt B. As shown particularly in Fig. 48 there is an arm 926 at the left hand side of each stop station for the right hand counter and an arm 927 at the right hand side of each stop station for the left hand counter. Each of these arms is spring pressed so that it normally lies in the path or trays on the belt. A tray in passing one of these arms is prevented from being moved laterally off the belt by the opposite guide rail 816. Each arm 926 is fixed upon the upper end of a short vertical shaft 928 suitably journaled in the frame work. Each arm 927 is fixed upon the upper end of a long vertical shaft 929 which, as shown in Fig. 47, extends from a suitable bearing carried by the yoke beams 799 immediately below. A link 930 (see also Figs. 48 and 64) extends diagonally from each shaft 928 to the next forward shaft 929, this link connecting crank-arms on the two shafts in such manner that an outward deflection of an arm 926 will cause an outward deflection of the next forward arm 927. Thus, when a tray deflects an arm 926 it will turn the next forward shaft 929, and as the tray proceeds it will prevent shaft 929 from turning back until it has cleared the arm 927 on the upper end of said shaft. At the lower end of each shaft 929 there is a crank arm 931 (Figs. 53 and 64) which actuates one of a series of control rods 941, as will be explained presently.

Referring now to Figs. 58 and 59, it will be observed that adjacent each arm 884 there is a vertical stud 932 on which is journaled a plate-like locking arm 933 and also a superposed lever 934. In normal position the free end of the locking arm 933 clears the arm 884 and the extension 884' may pass under the locking arm 933. However, the latter may be swung forward so that its free end will obstruct the arm 884, preventing arm 884 from swinging outward sufficiently to release the clutch even though the notched arm 885 is raised. A pin 935 on one arm of the lever 934 normally bears against the forward edge of the locking arm 933, being pressed there-against by a spring 936 which provides a yielding connection between the lever arm and the locking plate. Below the spring 936 is a second spring 937 (Fig. 59) which connects the pin 935 to a fixed stud 938. The other arm of the lever 934 extends across the shaft 888 and is bent at its outer end to form a vertical plate 939. The latter is formed with slots 940 through which pass the control rods 941. The crank arms 931 are similarly formed with vertical plate-like extensions 942 similar to the plates 939 and have notches in them through which the rods 941 pass.

There are four rods 941 disposed, one above the other. Each rod (Fig. 65) is long enough to pass through the plates 939 of seven successive tray stop positions, but the rods are progressively staggered so that if one embraces tray stop positions 1 to 7 the next rod above will embrace positions 3 to 9 the next 5 to 11, and the top rod, positions 7 to 13. The series is then continued by other rods 941 alined with the first four and embracing positions 9 to 15 etc. A collar 943 is fixed on each rod, directly in front of each plate 939 through which it passes and also fixed on each rod is a collar 944 directly back of one of the crank-arm extensions 942. As shown in Fig. 64, there is a crank arm 931 between every second pair of levers 934 and, as shown in Fig. 65, the collar 944 of each rod is fixed thereon back of the crank extension 942 which lies ahead of the two rearmost collars 943 fixed on said rod. Thus each rod is normally held against the pull of springs 937 by one crank extension 942. When, however, a crank 931 is turned by the passage of a tray past the arm 926 to which it is linked, the rod 941 controlled thereby will be moved in the direction of the arrow x in Fig. 64, and all of the locking arms 933 controlled thereby will be swung into locking position. By this means a tray, as it proceeds along the conveyor corridor by deflecting a lever 926 locks the clutch latches 858a of the two tray stop positions through which it is passing and also those of the next five tray stop positions ahead, and, as the tray in its advance holds the next arm 927 deflected, the same mechanism will still be operative and the tray in this position will then lock out the two tray stop positions through which it is passing, the position to the rear thereof and the four positions ahead.

If in one of said stop positions the latch 858a has already released its clutch lever 805, the arm 884 is returned to normal position by the roller 856a. This can take place only at the fifth or sixth position ahead of the tray on the conveyor and hence there will be sufficient time for a returning tray to reach the belt B and pass along thereon without colliding with the tray whose safety zone has overtaken it. If a tray should be returning to the belt just before the safety zone mechanism comes into operation, the arm 884 will be in the path of the locking arm 933. This will not prevent the deflection of the arms 926 or 927 and thus arrest the tray advancing on the belt, as the spring 936 between the locking arm 933 and the lever 934 will yield, permitting the lever 934 to turn independently of said locking arm. When, however, the arm 884 is restored, the spring 936 will move the locking arm into position and prevent a further withdrawal of the arm 884 until the locking arm is again restored to normal position by passage of a tray out of the safety zone.

As each arm 927 is cleared by the tray, the rod 941 controlled thereby will return to normal position but the next rod will already have been operated by a deflection of the next forward arm 926. In other words, the spacing of the arms 926 and 927 is such that there will always be one if not two pair of these arms deflected by the passage of a tray along the corridor.

The safety zone begins outside of the counter casing or between the elevator L and the first serving space, so that there will be no danger of collision between a tray coming from the elevator and trays returning from the first serving spaces along the counter. Figs. 68 and 69 illustrate this safety zone and, as shown, spring pressed arms 950, 951 and 952 are mounted on vertical shafts 953, 954 and 955 respectively which are suitably journaled in the framework. The arms 950 and 951 are interconnected by a link 956 through levers fixed to their respective shafts and each shaft 953 and 955 has fixed thereto a crank arm 957 which is similar to the crank arms 931. The crank arms 957 actuate an extension of one of the control rods 941 which prevents the return of a tray to the conveyor B from any of the first four serving spaces in the counter. Hence, engagement of an incoming tray with any of the arms 950, 951 and 952 outside the counter casing will maintain a safety zone past the first four serving spaces. Before the incoming tray clears the arm 950, it engages the first arm 926 (Fig. 64) of the tray return control mechanism in the counter casing and from thereon, the control mechanism will function as described above.

Trays returned to the conveyor B are carried to the elevator E which may be of any suitable construction, and are thereby raised to the upper run D of the dispensing belt. The latter carries the trays to the platform P, whence they are taken into the washroom to be cleaned and washed for another trip.

As previously mentioned, the lugs 333 on the rear tray rail 325 are returned to inoperative or vertical position before the tray enters the counter casing so that they will not affect the cam fingers 761 which are operated by the lugs 327 on the forward rail 324 and cause an undesired setting of the fingers. When a tray leaves the elevator L on the belt B, it encounters the spring pressed arm 952 (Figs. 68 and 69). The shaft 955 of the arm has fixed thereon a crank 958 which is connected by a link 959 to an arm 960 fixed on a shaft 961 journaled in suitable brackets depending from the framework. Affixed to the shaft 961 is a pair of levers 962 to which are connected plates 963 extending through guides in the framework. Normally, the upper ends of the plates 963 lie below the run of the belt B so that the tray rail 324 and the lugs 327 may pass. However, after the rail 324 passes the plates 963, the tray encounters the arm 952, turning the shaft 955 which pulls the link 959 and causes the plates 963 to be lifted into the path of the lugs 333 as shown in Fig. 69. Further movement of the tray then carries the lugs 333 past the projecting plates which throw all of the vertical lugs 333 into a horizontal position where they are held by their spring fingers 329 (Fig. 22).

*Electrical connections*

Numerous references have been made to the wiring diagram, Fig. 36, and a more comprehensive description will now be given of the same. As may be seen, the diagram is divided into three portions by the broken lines X, Y, Z and Y U. The symbols to the left of the line X Y Z indicate parts located in the keyboard machine N, the symbols included by the lines X Y and Y U indicate parts in the counter conveyor casing, and the symbols included by the lines Y U and Y Z indicate parts in the routing station R with the exception of the solenoids 712 which would be located at their respective commodity preparing machines. Electrical power is introduced into the circuit through the terminals 965 at the top of the diagram.

When the cashier sets up an order on the keyboard machine N, she first strikes the commodity keys 103 (Fig. 3) in accordance with the order given her by the patron. It will be recalled that there are five groups of commodity keys with six keys in each group and that one key in each group may be depressed. Depression of a key in a particular group will cause one or two of the electrical contact blades 117 associated therewith to bridge the electrical contact members 118. Each pair of contacts 118 forms part of the circuit of a particular solenoid 474 or 478, the former controlling the ready-item tray-lugs and the latter the unready-item lugs and in shunt with each solenoid 478 in a selective relay 713. The bridging of contacts 118 does not energize the solenoids with which they are in circuit but merely connects them to a contact finger 242 of the main switch. Thus depression of the commodity keys merely sets up a combination of electric circuits which remain open until the complete order has been put through by depression of a seat key and the main switch is thereafter automatically closed. However, until a seat key is depressed the setting of the circuits may be changed at will.

When the cashier depresses a seat key certain electrical contacts numbered 218 are bridged by blades 219. Each pair of contacts 218 forms part of the circuit of a particular solenoid 483 controlling the seat lugs and the bridging of a combination of contacts 218 will connect a corresponding combination of solenoids 483 to the main switch. At the same time the cam shaft 230 which is driven by the continuously running motor 228, is clutched in, thereby issuing to the patron a token 253 characteristic of the serving space O assigned to him, clearing the keyboard machine and momentarily bridging the contact members 242 with the contact blade 241 (see also Fig. 5). This closure of the main switch momentarily energizes all of said solenoids and relays connected thereto. The solenoids 474, 478 and 483 so energized (see also Figs. 33 and 35) will set their corresponding lugs 333, 332 and 327 which action also releases the tray T from the "set-up" position, causing the contact blade 491 to bridge the electrical contact members 492, connecting the solenoid 282 in the keyboard machine to power (see also Fig. 9). The solenoid 282 actuates the lever 281, to prevent depression of another seat key 104 until the next tray arrives in the "set-up" position and withdraws the blade 491 from the contacts 492.

The relays 713 which are energized with the solenoids 478 are used as stated above selectively to control the energization of solenoids 712. In the diagram there are three relays 712 controlling six solenoids 713. In the circuit of each solenoid are three switches 714 operated respectively by the relays 713. Thus, there are six switches 714 controlled by each relay. Certain of the switches are normally closed and others normally open, but the arrangement is such that a different solenoid 712 will be selectively cut into power by actuation of each relay or combination of two relays. Each solenoid 712 is associated with a particular food-preparing machine and the energization thereof will actuate mechanism (not shown) which will initiate the preparation of the food. Thus, whenever a key is depressed which calls for an un-ready-item, not only does it cut in one or a combination of two solenoids 478 to set the un-ready-item lugs on a tray in the routing station, but it also cuts in one or a combination of two relays 713 whereby when the main switch blade bridges the contact fingers 242 and 243 a particular solenoid 712 will be energized to initiate operation of an automatic commodity preparing machine in the kitchen or dispensing station.

The electrical contact blade 356a (see also Fig. 28) bridges the contact members 357a when the tray stack F has become depleted, and connects an electric light 358a or other indicating device to power thus notifying the attendant. The light 358a is placed in any position where it may be readily seen by the attendant and, when more trays are placed in the stack, the circuit is again broken and the light 358a extinguished.

The motors 95, 356 and 742 are directly connected to power and run continuously. The motor 95 (see also Fig. 2) through suitable gearing 96, drives the dispensing conveyor Dd and the motor 742 drives the counter conveyor B while the motor 356, through the gearing 355 (see also Fig. 27), drives the routing station shaft 353.

Meanwhile, the token 253 issued to the guest is deposited by him in the token receiver at the serving space O assigned. In depositing the token the electrical contact fingers 851 are momentarily closed (see also Fig. 67) thereby connecting the circuit of the solenoid 852a (see also Fig. 54) to power which will permit the tray, when it arrives, to be transferred directly to the serving space where it is accessible to the guest. When the guest has completed his meal and leaves his seat, the return of the tray to the counter conveyor will cause the momentary closure of the contact fingers 911 (see also Fig. 47) which energizes a magnet 200 in the keyboard machine (see also Fig. 4) and restores the seat key 104 corresponding to the particular serving space to its normally raised position.

While I have described my invention as applied particularly to the dispensing of food it is also applicable to the dispensing of other commodities as well. I wish it to be understood that the above description is to be taken as illustrative and not limitative of my invention and that I reserve the right to make such changes and modifications in details of construction, arrangements of parts, and mode of operation as fall within the spirit and scope of the appended claims.

I claim:

1. In a commodity dispensing apparatus, a plurality of receptacles, means for dispensing commodities thereon, selectors carried by each receptacle and adapted to cooperate with the dispensing means, mechanism for setting the selectors and means for bringing said receptacles into cooperative relation therewith to cause dispensing of commodities to the receptacle from selected ones of said dispensing means.

2. In a commodity dispensing apparatus, a plurality of receptacles, a plurality of commodity dispensing devices, means for effecting relative movement of the receptacles and said devices, and selectors on the receptacle and cooperable with said devices to cause selective dispensing of commodities from any of said devices to any of said receptacles.

3. In a commodity dispensing apparatus, a conveyor, a commodity receptacle thereon, selectors carried by the receptacle, and commodity dispensing means relatively fixed with respect to the conveyor selectively controlled by said selectors for dispensing commodities upon the receptacle.

4. In a commodity dispensing apparatus, a conveyor, a commodity receptacle carried thereby, arresting means at a plurality of points along the conveyor, and selectors carried by the receptacle and cooperable with said means to arrest the receptacle, said selectors being settable to cause the arrest of the receptacle at any desired one of said points.

5. In a commodity dispensing apparatus, a conveyor, a commodity receptacle carried thereby, devices at a plurality of points along the conveyor, selectors carried by the receptacle and cooperable with said devices to vary the movement of the receptacle, a commodity dispensing machine at each of said points, and means actuated by the receptacle upon such variation of movement thereof at any of said points for causing the machine at that point to dispense a commodity on the receptacle.

6. In a commodity dispensing apparatus, a conveyor, a commodity receptacle carried thereby, detaining mechanism at a plurality of points along the conveyor, selectors carried by the receptacle and cooperable with said mechanism to detain the receptacle, a commodity dispensing machine at each of said points and means responsive to the detention of the receptacle at any of said points for causing the machine at that point to dispense a commodity on the receptacle.

7. In a commodity dispensing apparatus, a conveyor a commodity receptacle carried thereby, arresting means at a plurality of points along the conveyor, selectors carried by the receptacle and cooperable with said means to arrest the receptacle, said selectors being settable to cause the arrest of the receptacle at any one of said points, a commodity dispensing machine at each of said points, and means responsive to the arrest of the receptacle for causing the machine at said points to dispense a commodity on the receptacle.

8. A commodity dispensing apparatus comprising a plurality of dispensing machines, a receptacle, a conveyor adapted to transport the receptacle adjacent said machines, and selective means carried by the receptacle for operating said machines, said selective means being settable to cause dispensing of a commodity upon the receptacle from any desired one of said machinese.

9. In a selective dispensing apparatus a plurality of commodity dispensing machines each having a characteristic dispensing control, a receptacle, a conveyor for transporting said receptacle adjacent said machines, and selectors carried by said receptacle and settable to cooperate selectively with said controls to cause dispensing of a commodity from one of said machines to said receptacle.

10. In a selective dispensing apparatus, a plurality of commodity dispensing machines each having a characteristic dispensing control, a receptacle, a conveyor for transporting said receptacle adjacent said machines, selectors carried by said receptacle and settable to cooperate selectively with said controls to cause dispensing of a commodity from one of said machines to said receptacle, and means for detaining the receptacle on the conveyor while the commodity is being dispensed.

11. In a selective dispensing apparatus, a plurality of commodity dispensing machines each having a characteristic dispensing control, a receptacle, a conveyor for transporting said receptacle adjacent said machines, selectors carried by said receptacle and settable to cooperate selectively with said controls to cause dispensing of a commodity from one of said machines to said receptacle, and means for coordinating the movement of the receptacle and the dispensing machines during the dispensing.

12. A commodity dispensing apparatus comprising a plurality of commodity preparing machines, a controller for each of said machines, a receptacle, selectors carried by the receptacle and cooperable selectively with said machines to cause dispensing of commodities therefrom on the receptacle, and common means for actuating the controller of and initiating operation of a selected one of the machines to prepare a commodity and setting the selectors to cooperate therewith to dispense the commodity prepared.

13. A commodity dispensing apparatus comprising a plurality of commodity preparing machines, a receptacle, a conveyor for transporting the receptacle adjacent said machines, selectors carried by said receptacle and settable at will, each of said machines including control mechanism adapted to cooperate with a characteristic setting of the selectors to cause commodity dispensing on the receptacle, common means for initiating the operation of a selected one of the machines and setting the selectors to cooperate therewith.

14. In combination, a machine for preparing a commodity, a receptacle, a conveyor for transporting the receptacle from a predetermined position to commodity receiving position, common means for initiating preparation of said commodity and initiating transportation of the receptacle, the conveyor being timed to said machine so that the preparation of the commodity will be completed by the time the receptacle reaches said receiving position, and dispensing means controlled by the receptacle upon arrival at the receiving position for dispensing the commodity on the receptacle.

15. In combination, a receptacle, a commodity preparing machine, a conveyor for transporting the receptacle from a predetermined position past said machine to a delivery point, common means for initiating preparation of the commodity by said machine and initiating transportation of the receptacle by the conveyor, the conveyor being timed to said machine so that the preparation of said commodity will be completed by the time the receptacle reaches said machine, means for detaining the receptacle adjacent said machine and dispensing said commodity thereon, and means for releasing the detaining means after the commodity has been dispensed so that the receptacle may continue to said delivery point.

16. A commodity dispensing apparatus comprising a plurality of commodity preparing and dispensing machines, a controller for each machine, a receptacle, a conveyor for transporting the receptacle from a predetermined position to commodity receiving positions with respect to said machines, selectors carried by the receptacle and settable to cause dispensing of a commodity from any selected one of said machines, and control means for actuating the controller of the selected machine to initiate preparation of a commodity by said selected machine and simultaneously initiating transportation of the receptacle by the conveyor, the conveyor being timed to said machine so that the commodity will have been prepared and will be ready for dispensing by the time the receptacle is in position to receive the same.

17. A commodity dispensing apparatus comprising a plurality of commodity preparing and dispensing machines, a controller for each machine, a receptacle, a conveyor for transporting the receptacle from a predetermined position to commodity receiving positions with respect to said machines, selective means carried by the receptacle and settable to cause dispensing of a commodity from any selected one of said machines, a common control means for setting the selective means and actuating the controller of the selected machine to initiate preparation of the commodity and also for initiating transportation of the receptacle, and means for moving the conveyor at such rate that the commodity will have been prepared and will be ready for dispensing by the time the receptacle is in position to receive the same.

18. A commodity dispensing apparatus comprising a plurality of commodity preparing machines, a controller for each machine, a receptacle, a conveyor for transporting the receptacle from a predetermined position through a series of commodity receiving positions associated respectively with said machines, dispensing means at each of the commodity receiving positions operable to detain the receptacle and dispense a commodity thereon from the machine associated therewith, selective means carried by the receptacle and settable to operate the dispensing means selectively, common means for actuating the controller of the selected machine to initiate the preparation of the commodities to be dispensed by the selected dispensing means and initiating transportation of a receptacle from said predetermined position, means for moving the conveyor at such rate that the commodities will have been prepared and be ready for dispensing by the time the receptacle is in position to receive the same, and means for automatically releasing the receptacle after each of said commodities has been dispensed to permit resumption of transportation.

19. A commodity dispensing apparatus comprising a plurality of commodity preparing machines, a controller for each machine, a receptacle, a conveyor for transporting the receptacle from a predetermined position through a series of commodity receiving positions associated respectively with said machines, dispensing means at each of the commodity receiving positions and operable to arrest the receptacle and dispense a commodity thereon from the machine associated therewith, selective means carried by the receptacle and settable to operate the dispensing means selectively, common means for setting the selective means and actuating the controller of the selected machine to cause the preparation of the commodities to be dispensed by the selected dispensing means and also for initiating transportation of a receptacle from said predetermined position, means for moving the conveyor at such rate that the commodities will have been prepared and be ready for dispensing by the time the receptacle is in position to receive the same, and means for automatically releasing the receptacle after each of said commodities has been dispensed to permit resumption of transportation.

20. A commodity dispensing apparatus comprising a plurality of commodity dispensing machines, a plurality of receptacles, selecting means carried by each receptacle, means for conveying the receptacles adjacent said machines, means controlled by the selecting means for operating said machines selectively, and means also controlled by the selecting means for by-passing certain of said receptacles ahead of others.

21. A commodity dispensing apparatus comprising a plurality of commodity dispensing machines, a plurality of receptacles, selecting means carried by each receptacle, means for conveying the receptacles adjacent said machines, means controlled by the selecting means for operating said machines selectively, and means also controlled by said selecting means for by-passing certain of said receptacles ahead of others.

22. In a selective commodity dispensing system, a conveyor including a relatively slow section, a shunt there across, receptacles adapted to be transported by the conveyor, machines adjacent said conveyor for dispensing commodities on the receptacles, a controller for each of said machines, certain of said machines being adapted to prepare as well as to dispense commodities, selecting means carried by each receptacle and adapted to actuate the controllers of said machines to cause dispensing of selected commodities, and means controlled by the selecting means for switching through said shunt such receptacles as are not to receive commodities from a commodity preparing machine.

23. A commodity dispensing apparatus comprising a dispensing station, a delivery station, a plurality of receptacles, a conveyor for transporting said receptacles through the dispensing station to the delivery station, said dispensing station including means for dispensing ready commodities and means for preparing commodities on order and thereafter dispensing the same, two groups of selectors on each receptacle, one group being settable to control dispensing of ready commodities and the other being settable to control dispensing of commodities prepared on order, means for setting the selectors on each receptacle and releasing the receptacle for transportation by the conveyor, means actuated simultaneously with the setting of the selectors in the latter group for initiating operation of the corresponding commodity preparing means, and means controlled by the selectors for switching receptacles that are to receive ready commodities only ahead of those which are to receive commodities prepared on order.

24. A commodity dispensing apparatus comprising a plurality of dispensing machines, a receptacle, a conveyor means for transporting the receptacle adjacent said machines and to a delivery station, selectors carried by the receptacle for operating said machines, said selectors being settable to cause dispensing of a commodity upon the receptacle from any selected one of the machines, and means for removing the receptacle from the conveyor means at said delivery station.

25. A commodity dispensing apparatus comprising a conveyor, a receptacle carried thereby, means controlled by the receptacle for depositing a commodity thereon, settable selecting means carried by the receptacle, and means controlled by said selecting means for arresting the receptacle at a selected point on the conveyor.

26. A commodity dispensing apparatus comprising a conveyor, a commodity receptacle carried thereby, selecting means carried by the receptacle, commodity dispensing means controlled by certain of said selecting means for dispensing selected commodities on the receptacle, and means controlled by others of the selecting means for arresting the receptacle at a selected delivery point.

27. A commodity dispensing apparatus comprising a conveyor, a commodity receptacle carried thereby, selecting means carried by the receptacle, commodity dispensing means controlled by certain of said selecting means for dispensing selected commodities on the receptacle, and means controlled by others of the selecting means for removing the receptacle from the conveyor at a selected point.

28. A commodity dispensing apparatus comprising a plurality of dispensing machines, a plurality of delivery stations, a receptacle selecting means carried thereby, means for conveying the receptacle adjacent said machines and thence adjacent the delivery stations, means controlled by certain of the selecting means for dispensing a commodity upon the receptacle from any one of the dispensing machines, and means controlled by others of the selecting means for delivering the receptacle to any one of said delivery stations.

29. A commodity dispensing apparatus comprising a conveyor, a plurality of chambers adjacent the conveyor, a commodity receptacle carried by the conveyor, selectors on the receptacle, means controlled by the selectors for delivering the receptacle from the conveyor into a selected one of said chambers, a serving space adjacent each chamber, and token-controlled means at each serving space for moving the receptacle from the chamber to said space.

30. A commodity dispensing apparatus comprising a conveyor, a plurality of chambers open at one side to the conveyor, a normally closed door at the other side of each chamber, a commodity receptacle carried by the conveyor, selectors on the receptacle, means controlled by the selectors for delivering the receptacle from the conveyor into a selected one of said chambers, token-controlled means for opening each of said doors, and means preventing operation of the token-controlled means unless there is a re-receptacle in the chamber.

31. A commodity dispensing apparatus comprising a conveyor, a plurality of chambers adjacent the conveyor, a commodity receptacle carried by the conveyor, selectors carried by the receptacle, means controlled by the selectors for delivering the receptacle from the conveyor into a selected one of said chambers, a counter adjacent said chambers, each chamber having a normally closed door opening to the counter, and token-controlled means for opening said door and moving the receptacle out upon the counter.

32. A commodity dispensing apparatus comprising a conveyor, a plurality of chambers adjacent the conveyor, a commodity receptacle carried by the conveyor, selective means carried by the receptacle, means controlled by the selective means for delivering the receptacle from the conveyor into a selected one of said chambers, a counter adjacent said chambers, each chamber having a normally closed door opening to the counter, token-controlled means for opening said door and moving the receptacle out upon the counter, and means operating to close the door after the receptacle has been moved out of the chamber.

33. A commodity delivering apparatus comprising a commodity conveyor, a serving station, an antechamber between the conveyor and said station, means for transferring a commodity from the conveyor through the antechamber to said station, means for normally arresting the commodity in the antechamber, and token-controlled means for withdrawing the arresting means.

34. A commodity delivering apparatus comprising a plurality of serving stations, a conveyor running adjacent said stations, a reserve space between the conveyor and said stations, a plurality of commodity receptacles adapted to be transported by the conveyor, transfer mechanism associated with each serving station for transferring a receptacle from the conveyor through the reserve space and to the serving station, means for selectively actuating the transfer means, means at each serving station for normally arresting the receptacle in the reserve space, and token-controlled means for withdrawing each of the arresting means.

35. An apparatus for delivering a commodity to a recipient, comprising a serving station for the recipient, an antechamber, a commodity receptacle, a conveyor therefor, mechanism for transferring the receptacle from the conveyor to said station through said chamber and for returning the receptacle through the chamber to the conveyor, arresting means for normally preventing a carrier from passing out of the chamber to the serving station, token-controlled means for withdrawing the arresting means, and auxiliary control means operated by departure of the recipient from the station for actuating said mechanism to return the receptacle to the conveyor.

36. An apparatus for delivering a commodity to a recipient, comprising a serving station for the recipient, an antechamber, a plurality of commodity receptacles, a conveyor therefor, means for transferring a receptacle from the conveyor through said chamber to said station and for returning the receptacle through the chamber to the conveyor, arresting means normally preventing a receptacle from passing out of the chamber to the serving station, token-controlled means for withdrawing the arresting means, auxiliary control means operated by departure of the recipient from the station for operating said mechanism to return the receptacle from the serving station, and means for preventing the return of a receptacle until there is room therefor on the conveyor.

37. A commodity delivering apparatus comprising a plurality of serving stations, a conveyor running adjacent said stations, a reserve space between the conveyor and said stations, a plurality of commodity receptacles adapted to be transported by the conveyor, transfer mechanism associated with each serving station and operating to transfer a receptacle from the conveyor through the reserve space and to the serving station, means for selectively actuating the transfer means, means at each serving station for normally arresting the receptacle in the reserve space, token-controlled means for withdrawing each of the arresting means, each transfer means including elements operating to return the receptacle from the serving station through the reserve space to the conveyor, and means for detaining the returning receptacle until there is room on the conveyor to receive it.

38. A commodity delivering apparatus comprising a plurality of serving stations, a conveyor running adjacent said stations, a reserve space between the conveyor and said stations, a plurality of commodity receptacles adapted to be transported by the conveyor, transfer mechanism associated with each serving station and operating to transfer a receptacle from the conveyor through the reserve space and to the serving station, means for selectively actuating the transfer means, means at each serving station for normally arresting the receptacle in the reserve space, token-controlled means for withdrawing each of the arresting means, each transfer means including elements operating to return the receptacle from the serving station through the reserve space to the conveyor, and means for detaining the returning receptacle while there is another receptacle on the conveyor within a predetermined range of the returning receptacle.

39. A commodity delivery apparatus comprising a conveyor, a plurality of serving stations located on opposite sides of the conveyor, an antechamber between each station and the conveyor, commodity receptacles adapted to be transported by said conveyor, transfer mechanism associated with each station and operable to transfer a receptacle from the conveyor through the intervening antechamber to the station, means for selectively actuating the transfer means, said transfer mechanism including elements operating to return the receptacle from the serving station to the conveyor, and means for detaining a returning receptacle, while another receptacle is being returned to the conveyor from an opposite station.

40. In combination, a plurality of receptacles each having selectors thereon, means for setting the selectors, means adapted to be actuated selectively by said selectors, means for testing the condition of the selectors, and means for conveying to the setting means only those receptacles whose selectors are in predetermined condition.

41. In combination, a plurality of receptacles, conveying means for conveying the receptacles by more than one route, selectors carried by each receptacle, means for setting the selectors, means for testing the condition of the selectors prior to the setting thereof, and means controlled by the testing means for routing the receptacles in accordance with the condition of the selectors.

42. In a selective commodity dispensing apparatus, a plurality of commodity receptacles, selectors carried by each receptacle, means for setting the selectors to control the dispensing of commodities thereon, means for conveying the receptacles to the selector setting means, means for testing the selectors before reaching said setting means, means for conveying the receptacle from the setting means by more than one route, and means controlled by the testing means for routing the receptacles.

43. In a selective commodity dispensing apparatus, a plurality of commodity receptacles, a magazine therefor, a conveyor for transporting the receptacles from the magazine to commodity receiving position, selectors carried by each receptacle and settable to control the dispensing of commodities on the receptacle, means for depositing the receptacles individually upon the conveyor, and means for rejecting such receptacles as are not in a predetermined orientation with respect to the conveyor.

44. In a selective commodity dispensing apparatus, a plurality of commodity receptacles, a magazine therefor, a conveyor for transporting the receptacles from the magazine to commodity receiving position, selectors carried by each receptacle and settable to control the dispensing of commodities on the receptacle, means for depositing the receptacles individually upon the conveyor, and means for rejecting receptacles whose selectors are not set in predetermined position.

45. In a selective commodity dispensing apparatus, a plurality of commodity receptacles, a magazine therefor, a conveyor for transporting the receptacles from the magazine to commodity receiving position, selectors carried by each receptacle and settable to control the dispensing of commodities on the receptacle, means for depositing the receptacles individually upon the conveyor, and means for rejecting receptacles whose selectors are not set in predetermined position and receptacles that are not in a predetermined orientation with respect to the conveyor.

46. In a selective commodity dispensing apparatus, a dispensing station, a plurality of dispensing machines therein, each of said machines having a characteristic controller, a set-up station, a plurality of commodity receptacles, a magazine for the receptacles, a conveyor running through the set-up station and the dispensing station, means for withdrawing receptacles individually from the magazine and placing them on the conveyor at the set-up station, selector-lugs carried by each receptacle and settable to actuate the controllers to effect dispensing of commodities from said machines to the receptacle, means at the set-up station for selectively setting the lugs, lug-testing means associated with the tray withdrawing means, and means controlled by the lug testing means for preventing deposit on the conveyor of trays whose lugs are not all in normal position.

47. In a selective dispensing apparatus, a plurality of commodity preparing machines, control means therefor, a receptacle movable adjacent said machines, selectors carried by the receptacle and settable to cooperate with said machines to cause dispensing of commodities therefrom upon the receptacle, means for setting the selectors, means for predisposing the control means for actuation of selected preparing machines, and for predisposing the setting means for setting the selectors to cooperate with said machines, and a common means for actuating the selected preparing machines and selected setting of the selectors through said control means and said setting means respectively.

48. In a selective dispensing apparatus, a plurality of commodity preparing machines, control means therefor, a receptacle, a conveyor for transporting the receptacle to receiving positions with respect to said machines, selectors carried by the receptacle and settable to cooperate with said machines to cause dispensing of commodities therefrom upon the receptacle, means for setting the selectors, means for predisposing the control means for actuation of selected preparing machines and for predisposing the setting means for setting the selectors to cooperate with said machines, and a common means for actuating the selected preparing machines and selected setting of the selectors through said control means and said setting means respectively, said machines being timed to the speed of the conveyor whereby commodities will be prepared by each of the selected machines before the receptacle reaches such machine.

49. In a selective dispensing apparatus, a plurality of commodity-dispensing machines, a receptacle for receiving the commodities, selectors carried by the receptacle and settable to control the operation of said machines, and key-controlled means for setting the selectors to effect control of the operation of selected ones of said dispensing machines.

50. In a dispensing and delivering apparatus, a plurality of commodity dispensing means, a receptacle for receiving the commodities, a conveyor for transporting the receptacle adjacent a plurality of delivery points, selectors carried by the receptacle, certain of the selectors being settable to control the operation of selected ones of the dispensing means and others to control the delivery of the receptacle to a selected one of the delivery points, and means for setting the selectors.

51. In a dispensing and delivering apparatus, a plurality of commodity dispensing means, a receptacle for receiving commodities therefrom, a conveyor for transporting the receptacle to a delivery point, selectors carried by the receptacle, means for setting the selectors to control the dispensing of commodities from selected ones of the dispensing means, and a key for controlling the setting means.

52. In a selective dispensing apparatus, a plurality of dispensing machines each having a characteristic dispensing control, a receptacle, a conveyor for transporting said receptacle adjacent said machines, selectors carried by said receptacle and settable to cooperate selectively with said controls to cause dispensing of commodities from the machines to said receptacle, and remote control means for effecting a selected setting of said selectors.

53. In a selective dispensing apparatus, a plurality of dispensing machines each having a characteristic dispensing control, a receptacle, a conveyor for transporting said receptacle adjacent said machines, selectors carried by said receptacle and settable to cooperate selectively with said controls to cause dispensing of commodities from the machines to said receptacle, and key-actuated means for selectively setting said selectors.

54. In a selective dispensing apparatus, a plurality of dispensing machines each having a characteristic dispensing control, a receptacle, a conveyor for transporting said receptacle adjacent said machines, selectors carried by said receptacle and settable to cooperate selectively with said controls to cause dispensing of commodities from the machines to said receptacle, a plurality of keys operable to select a desired setting of the selectors, and manually controlled means for setting the selectors in accordance with such selection.

55. In a selective dispensing apparatus, a plurality of dispensing machines each having a characteristic dispensing control, a receptacle, a conveyor for transporting said receptacle adjacent said machines, selectors carried by said receptacle and settable to cooperate selectively with said controls to cause dispensing of commodities from the machine to said receptacle, a plurality of commodity keys operable to select the desired setting of the selectors, an actuating key, and means controlled thereby for setting the selectors in accordance with such selection.

56. In a selective dispensing apparatus, a plurality of commodity dispensing machines, each having a characteristic dispensing control, a receptacle, a conveyor for transporting said receptacle past said machines from a set-up position, selectors carried by said receptacle and settable selectively to actuate said controls, means at the set-up position for setting said selectors, and means for detaining the receptacle at the set-up position until the selectors have been set.

57. In a selective dispensing apparatus, a plurality of commodity dispensing machines each having a characteristic dispensing control, a receptacle, a conveyor for transporting said receptacle adjacent said machines from a set-up position, selectors carried by said receptacles and settable to actuate said controls, means for detaining the receptacle at the set-up position, remote control means for setting the selectors while the tray is in set-up position, and means for releasing the detaining means as soon as the selectors have been set.

58. In a selective dispensing apparatus, a plurality of commodity dispensing machines each having a characteristic dispensing control, a receptacle, a conveyor for transporting said receptacle adjacent said machines from a set-up position, selectors carried by said receptacle and settable to actuate said controls, means at the set-up position for setting the selectors, operating means for selectively operating the selector setting means, and means for preventing operation of said operating means unless there is a receptacle at the set-up position.

59. In a selective dispensing apparatus, a plurality of commodity dispensing machines each having a characteristic dispensing control, a receptacle, a conveyor for transporting said receptacle adjacent said machines from a set-up position, means for detaining the receptacle at the set-up position, selectors carried by the receptacle, means at the set-up position for setting the selectors to actuate said controls, commodity keys operable to select a desired setting of the selector setting means, an actuating key, and means controlled thereby for actuating said setting means in accordance with the setting of the commodity keys and for releasing the detaining means.

60. In a selective dispensing apparatus, a plurality of commodity dispensing machines each having a characteristic dispensing control, a receptacle, a conveyor for transporting said receptacle adjacent said machines from a set-up position, means for detaining the receptacle at the set-up position, selectors carried by the receptacle, means at the set-up position for setting the selectors to actuate said controls, commodity keys operable to select a desired setting of the selector setting means, an actuating key, means controlled thereby for actuating said setting means in accordance with the setting of the commodity keys and for releasing the detaining means, and means for preventing operation of said actuating key unless there is a receptacle in the set-up position.

61. In a selective dispensing apparatus a plurality of commodity dispensing machines each having a characteristic dispensing control, a receptacle, a conveyor for transporting said receptacle adjacent said machines, selectors carried by said receptacle and settable to cooperate with said controls to cause selective dispensing of commodities on the receptacle, key controlled means for selecting a desired setting of the selectors, each key controlling a characteristic combination of said selectors, an actuating key, and means controlled thereby for setting said selectors in accordance with the setting of the selecting keys.

62. In an apparatus of the character described, commodity dispensing and delivering means including a receptacle for receiving and delivering the commodities, commodity selectors and delivery selectors carried by the receptacle and settable respectively to control the selective dispensing of the commodities on the receptacle and the selective delivery of the receptacle, key-actuated control mechanism including a group of keys individually operable to control the setting of the dispensing selectors and another group of keys individually operable to control the setting of the delivery selectors, and means for preventing operation of the keys in one group unless a key in the other group has been operated.

63. In an apparatus of the character described, commodity dispensing and delivering means including a receptacle for receiving and delivering the commodities, commodity selectors and delivery selectors carried by the receptacle and settable respectively to control selective dispensing of the commodities on the receptacle and the selective delivery of the receptacle, key actuated control mechanism including commodity keys settable to control the dispensing selectors and delivery keys operable to control the setting of the delivery selectors, and means for preventing setting of the commodity selectors until a delivery key is operated.

64. In an apparatus of the character described, commodity dispensing and delivering means including a receptacle for receiving and delivering the commodities, commodity selectors and delivery selectors carried by the receptacle and settable respectively to control selective dispensing of the commodities on the receptacle and selective delivery of the receptacle, key actuated control mechanism including commodity keys settable to control the dispensing selectors and delivery keys operable to control the setting of the delivery selectors, and means controlled by operation of any one of the delivery keys for effecting the setting of the commodity selectors in accordance with the setting of the commodity keys.

65. In an apparatus for selectively dispensing and delivering commodities, dispensing and delivering means including a receptacle for receiving and delivering the commodities, commodity and delivery selectors carried by the receptacle and settable respectively to control selective dispensing of the commodities on the receptacle and selective delivery of the receptacle, key actuated control mechanism including commodity keys settable to control the dispensing selectors and delivery keys operable to control the setting of the delivery selectors, means controlled by operation of any one of the delivery keys for effecting the setting of the selectors in accordance with the setting of the commodity keys, and means for preventing operation of the delivery keys until at least one of the commodity keys has been set.

66. In an apparatus for selectively dispensing and delivering commodities, dispensing and delivering means including a receptacle for receiving commodities, commodity and delivery selectors carried by the receptacle and settable respectively to control selective dispensing of the commodities on the receptacle and selective delivery of the receptacle, key actuated control mechanism including commodity keys settable to control the dispensing selectors and delivery keys operable to control the setting of the delivery selectors, means controlled by operation of any one of the delivery keys for setting of the commodity selectors in accordance with the setting of the commodity keys, the commodity keys being arranged in groups, and means for preventing the setting of more than one key at a time in each of said groups.

67. In an apparatus for selectively dispensing commodities and delivering them to a selected one of a plurality of delivery points, a receptacle, commodity and delivery selectors carried by the receptacle and settable respectively to control the selective dispensing of commodities on the receptacle and the point to which the receptacle will be delivered, key actuated control mechanism including commodity keys settable to control the dispensing selectors and delivery keys operable to control the setting of the delivery selectors, means controlled by operation of any one of the delivery keys for setting the selectors in accordance with the setting of the commodity keys, and means for retaining the commodity keys in set position until a delivery key is operated.

68. In an apparatus for selectively dispensing commodities and delivering them to a selected one of a plurality of delivery points, a receptacle, a conveyor therefor, commodity and delivery selectors carried by the receptacle and settable respectively to control the dispensing of the commodities on the receptacle and the point to which the receptacle will be delivered, key actuated control mechanism including commodity keys settable to control the dispensing selectors and delivery keys operable to control the setting of the delivery selectors, means controlled by operation of any one of the delivery keys for setting the commodity selectors in accordance with the setting of the commodity keys, the commodity keys being arranged in groups, means for preventing the setting of more than one key at a time in each of said groups, and means for retaining the commodity keys in set position until a delivery key is operated.

69. In an apparatus for selectively dispensing commodities and delivering them to a selected one of a plurality of delivery points, a receptacle, a conveyor therefor, commodity and delivery selectors carried by the receptacle and settable respectively to control the dispensing of commodities on the receptacle and the point to which the receptacle will be delivered by the conveyor, control mechanism including commodity keys settable to control the dispensing selectors and delivery keys operable to control the setting of the delivery selectors, means controlled by operation of any one of the delivery keys for effecting the setting of the selectors in accordance with the setting of the commodity keys, the commodity keys being arranged in groups, means for preventing the setting of more than one key at a time in each of said groups, means for retaining the commodity keys in set position until a delivery key is operated, a clearance key for releasing the commodity keys from set position, and means for preventing operation of a delivery key while the clearance key is being operated.

70. In an apparatus for selectively dispensing commodities and delivering them to a selected one of a plurality of delivery points, a receptacle, a conveyor therefor, commodity and delivery selectors carried by the receptacle and settable respectively to control the dispensing of the commodities on the receptacle and the point to which the receptacle will be delivered by the conveyor, key actuated control mechanism including commodity keys settable to control the dispensing selectors and delivery keys operable to control the setting of the delivery selectors, means controlled by operation of any one of the delivery keys for effecting the setting of the selectors in accordance with the setting of the commodity keys, means for retaining the commodity keys in set position until a delivery key is operated, the commodity keys being arranged in groups, and means for releasing a previously set commodity key when another key in the same group is set.

71. In an apparatus for selectively dispensing commodities and delivering them to a selected one of a plurality of delivery points, a receptacle, a conveyor therefor, commodity and delivery selectors carried by the receptacle and settable respectively to control the dispensing of the commodities on the receptacle and the point to which the receptacle will be delivered by the conveyor, key actuated control mechanism including commodity keys settable to control the dispensing selectors and delivery keys operable to control the setting of the delivery selectors, means controlled by operation of any one of the delivery keys for effecting the setting of the selectors in accordance with the setting of the commodity keys and thereafter releasing the commodity keys, means for preventing operation of the delivery keys until at least one of the commodity keys has been set, and means for preventing operation of a second delivery key until the commodity keys have been released by the first delivery key and a commodity key has been set for a new selection.

72. In an apparatus for selectively dispensing commodities and delivering them to a selected one of a plurality of delivery points, a receptacle, a conveyor therefor, commodity and delivery selectors carried by the receptacle and settable respectively to control the dispensing of the commodities on the receptacle and the point to which the receptacle is delivered by the conveyor, key actuated control mechanism including commodity keys settable to control the dispensing selectors and delivery keys operable to control the setting of the delivery selectors, means controlled by operation of any one of the delivery keys for effecting the setting of the selectors in accordance with the setting of the commodity keys, means for preventing operation of the delivery keys until at least one of the commodity keys has been set, and means for preventing the operation of more than one commodity key at a time.

73. In a commodity dispensing apparatus, a serving station, means for delivering a commodity thereto, a key operable to control the delivering means, means operating to clear the serving station after delivery of the commodity thereto, means for preventing a subsequent operation of the key until the station has been cleared and means for releasing the key after the station has been cleared.

74. In a commodity dispensing apparatus, a plurality of serving stations, a key identifying each station, means controlled by the operation of each key to deliver the commodity to the station identified by said key, means for clearing each station after a commodity has been delivered thereto, means for locking each key when operated, and means for releasing each key after the station identified thereby has been cleared.

75. In a commodity dispensing apparatus, a serving station for a commodity recipient, means for delivering a commodity to said station, a key operable to control the delivering means, means for locking the key in operated position, and means controlled by departure of the recipient from the station for releasing said key.

76. The method of dispensing commodities which comprises the steps of selecting a commodity to be dispensed, issuing a token and thereby effecting the dispensing of the selected commodity, and thereafter controlling the delivery of the selected commodity by the token.

77. The method of dispensing commodities which comprises the steps of selecting a commodity to be dispensed, issuing a token and thereby effecting the dispensing of the selected commodity and charging the price thereof against an operator, and thereafter controlling the delivery of the selected commodity by the token.

78. The method of preparing and dispensing commodities which comprises the steps of selecting a commodity to be dispensed, issuing a token and thereby causing instant initiation of the preparation of the selected commodity, dispensing the commodity after it has been prepared, and thereafter controlling the delivery of the commodity by the token.

79. The method of selectively dispensing and delivering commodities which comprises the steps of selecting a commodity to be dispensed, selecting the point of delivery of said commodity, issuing a token identifying said point of delivery and thereby causing dispensing of the selected commodity, and thereafter controlling the delivery of the commodity at said point by the token.

80. The method of selectively dispensing and delivering commodities which comprises the steps of selecting the commodity to be dispensed, selecting the point of delivery of said commodity, issuing a token identifying said point of delivery and thereby causing dispensing of said commodity and initiating delivery thereof, and thereafter controlling the final delivery of a commodity at said point by the token.

81. The method of selectively dispensing and delivering commodities which comprises the steps of selecting a commodity to be dispensed, selecting the point of delivery of said commodity and thereby issuing a token identifying said point of delivery and thereby also causing dispensing of said commodity and delivery thereof to the vicinity of the selected delivery point, and thereafter controlling delivery of the commodity to said selected point by the token.

82. The method of selectively dispensing and delivering commodities which comprises the steps of selecting a commodity to be dispensed, selecting the point of delivery of said commodity and thereby issuing a token identifying said point of delivery and thereby also causing dispensing of said commodity and delivery thereof to an inaccessible space at the selected delivery point, and thereafter rendering the commodity accessible by the token.

HARRY RUSSELL BRAND.